US009001752B2

(12) United States Patent
Miyatake et al.

(10) Patent No.: US 9,001,752 B2
(45) Date of Patent: Apr. 7, 2015

(54) BASE STATION, METHOD FOR ARRANGING SUB BURST REGION IN BASE STATION, METHOD FOR DETERMINING TERMINAL TO BE COMMUNICATED WITH, AND METHOD FOR ALLOCATING DOWNLINK BURST REGION

(75) Inventors: Teruhiko Miyatake, Daito (JP); Yoshizo Sato, Daito (JP)

(73) Assignee: Kyocera Corporation, Kyoto (JP)

( * ) Notice: Subject to any disclaimer, the term of this patent is extended or adjusted under 35 U.S.C. 154(b) by 947 days.

(21) Appl. No.: 13/131,162

(22) PCT Filed: Nov. 19, 2009

(86) PCT No.: PCT/JP2009/069598
§ 371 (c)(1),
(2), (4) Date: Aug. 16, 2011

(87) PCT Pub. No.: WO2010/061768
PCT Pub. Date: Jun. 3, 2010

(65) Prior Publication Data
US 2011/0305212 A1 Dec. 15, 2011

(30) Foreign Application Priority Data

Nov. 26, 2008 (JP) .................................. 2008-301087
Dec. 22, 2008 (JP) .................................. 2008-326054
Dec. 24, 2008 (JP) .................................. 2008-328118

(51) Int. Cl.
*H04W 4/00* (2009.01)
*H04L 5/14* (2006.01)
(Continued)

(52) U.S. Cl.
CPC ............ *H04L 1/1812* (2013.01); *H04L 5/0007* (2013.01); *H04L 5/0037* (2013.01);
(Continued)

(58) Field of Classification Search
None
See application file for complete search history.

(56) References Cited

U.S. PATENT DOCUMENTS 7,457,590 B2 * 11/2008 Frank .............................. 455/69
8,310,995 B2 * 11/2012 Murai et al. .................. 370/329
(Continued)

FOREIGN PATENT DOCUMENTS

JP   A-2005-86216   3/2005
JP   A-2007-36627   2/2007
(Continued)

OTHER PUBLICATIONS

Written Opinion of the International Searching Authority issued in International Patent Application No. PCT/JP2009/069598 dated Feb. 16, 2010.
(Continued)

*Primary Examiner* — Hassan Phillips
*Assistant Examiner* — Hicham Foud
(74) *Attorney, Agent, or Firm* — Oliff PLC

(57) ABSTRACT

A base station including at least one circuit configured to: receive a signal from a communication terminal via an array antenna; calculate a weight to be applied to the array antenna with respect to the communication terminal, based on a known signal supplied from the communication terminal and received by the circuit; transmit a signal to the communication terminal via the array antenna; determine m (m>1) communication terminals among the plurality of communication terminals, based on a first communication quality between base stations and a plurality of communication terminals, as communication-object candidates; cause to transmit control information, which is configured to cause the communication terminal to transmit the known signal, to the m communication terminals. Thus, the circuit may determine, as communication objects, l (1≤l<m) communication terminals among the m communication terminals, based on quality of communication between the base station and the m communication terminals.

4 Claims, 30 Drawing Sheets

(51) Int. Cl.
*H04L 1/18* (2006.01)
*H04L 5/00* (2006.01)
*H04W 28/26* (2009.01)
*H04W 72/04* (2009.01)

(52) U.S. Cl.
CPC .............. *H04L5/0055* (2013.01); *H04L 1/1887* (2013.01); *H04W 28/26* (2013.01); *H04W 72/0446* (2013.01)

(56) References Cited

U.S. PATENT DOCUMENTS

| | | | |
|---|---|---|---|
| 2001/0009861 A1* | 7/2001 | Martin et al. | 455/562 |
| 2004/0009793 A1* | 1/2004 | Yamaguchi et al. | 455/562.1 |
| 2005/0063392 A1 | 3/2005 | Ofuji et al. | |
| 2005/0136841 A1* | 6/2005 | Frank | 455/65 |
| 2006/0195767 A1 | 8/2006 | Ihm et al. | |
| 2007/0274256 A1* | 11/2007 | Murai et al. | 370/328 |
| 2008/0090576 A1 | 4/2008 | Sung et al. | |
| 2009/0196203 A1 | 8/2009 | Taira et al. | |

FOREIGN PATENT DOCUMENTS

| | | |
|---|---|---|
| JP | A-2008-048236 | 2/2008 |
| JP | A-2008-72275 | 3/2008 |
| JP | A-2008-99293 | 4/2008 |
| JP | A-2008-109618 | 5/2008 |
| JP | A-2008-526090 | 7/2008 |
| JP | A-2008-527839 | 7/2008 |
| WO | WO 2008/004609 A1 | 1/2008 |

OTHER PUBLICATIONS

International Preliminary Report on Patentability issued in International Patent Application No. PCT/JP2009/069598 dated Jul. 5, 2011.

* cited by examiner

F I G . 2
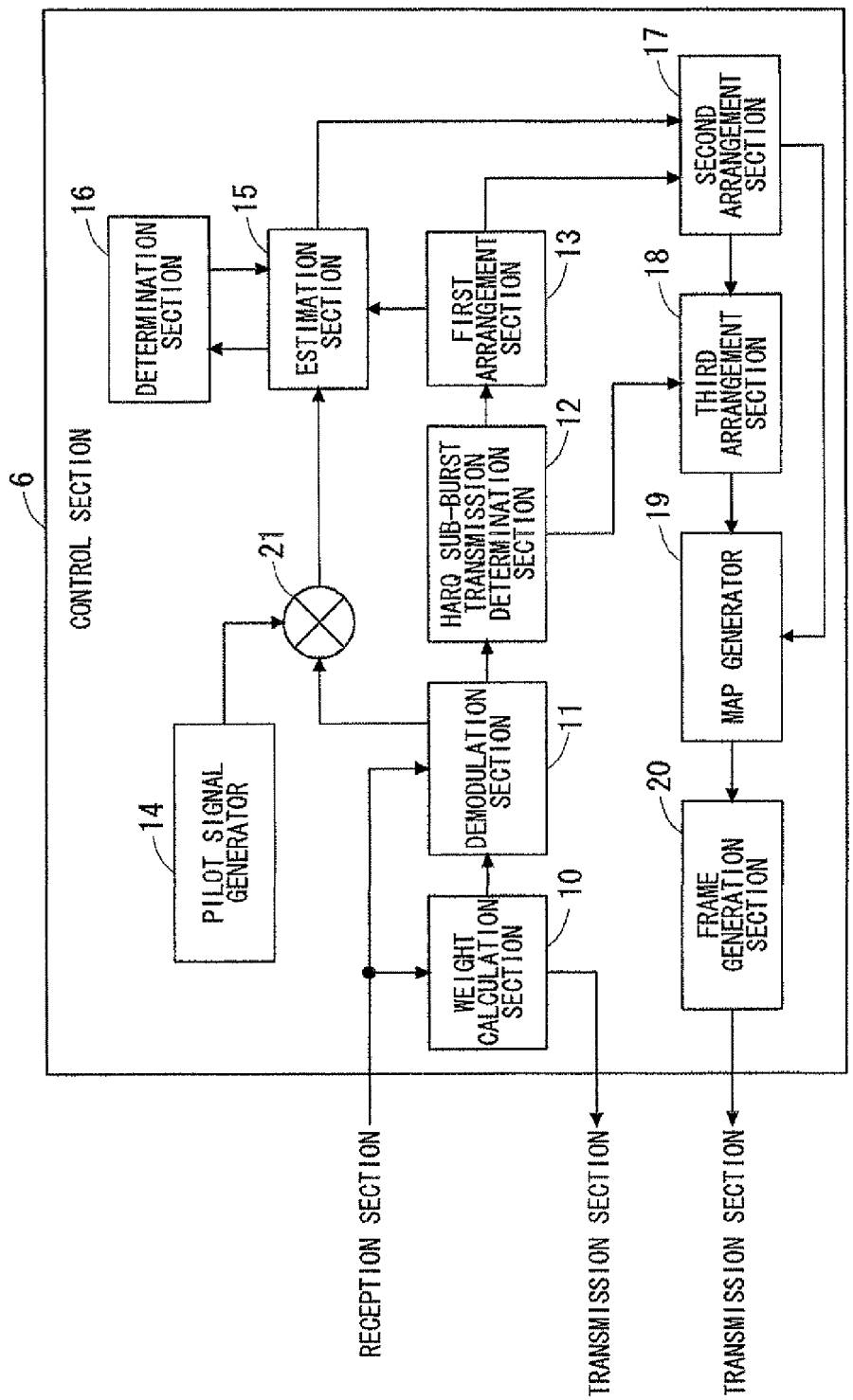

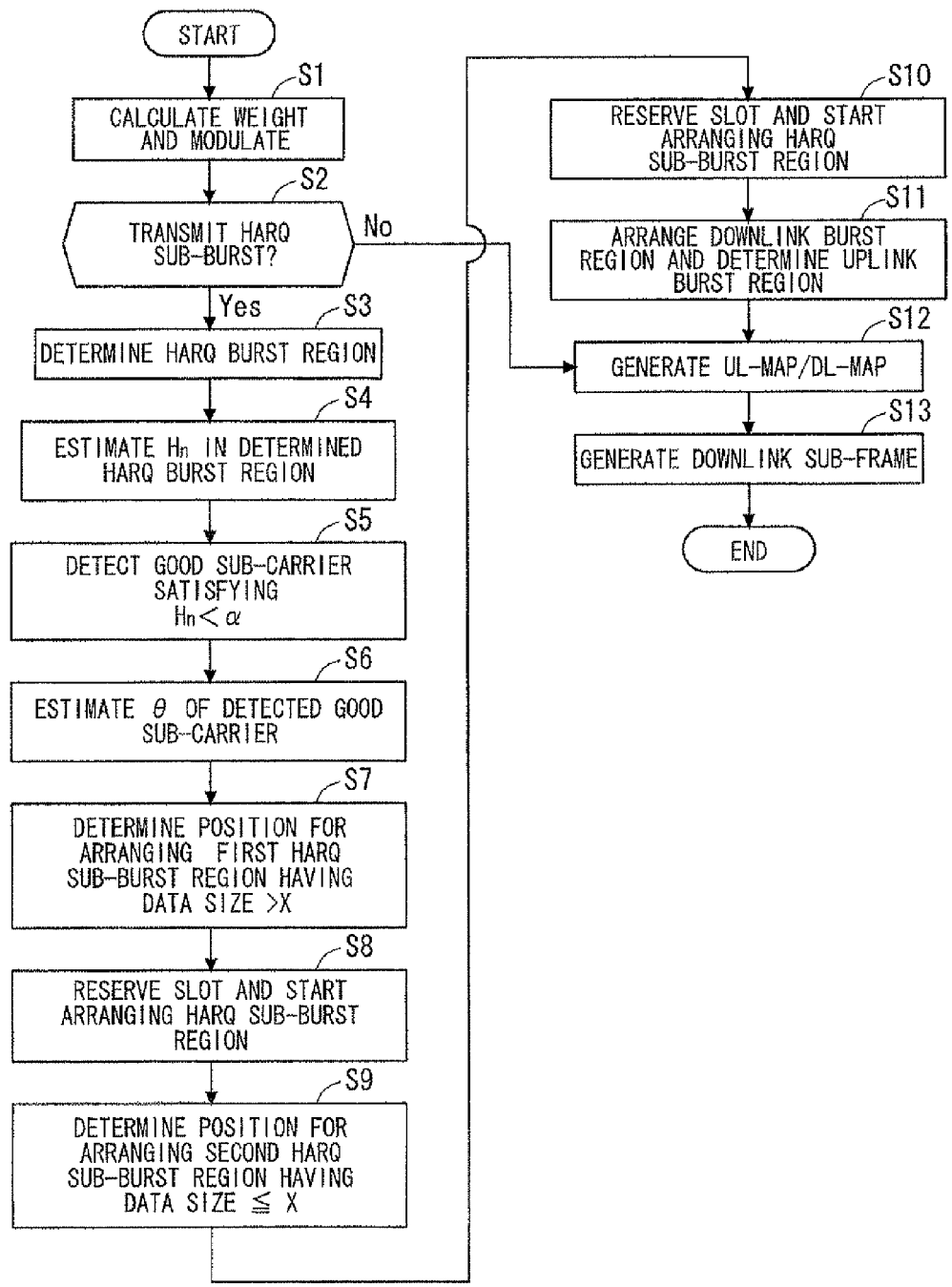

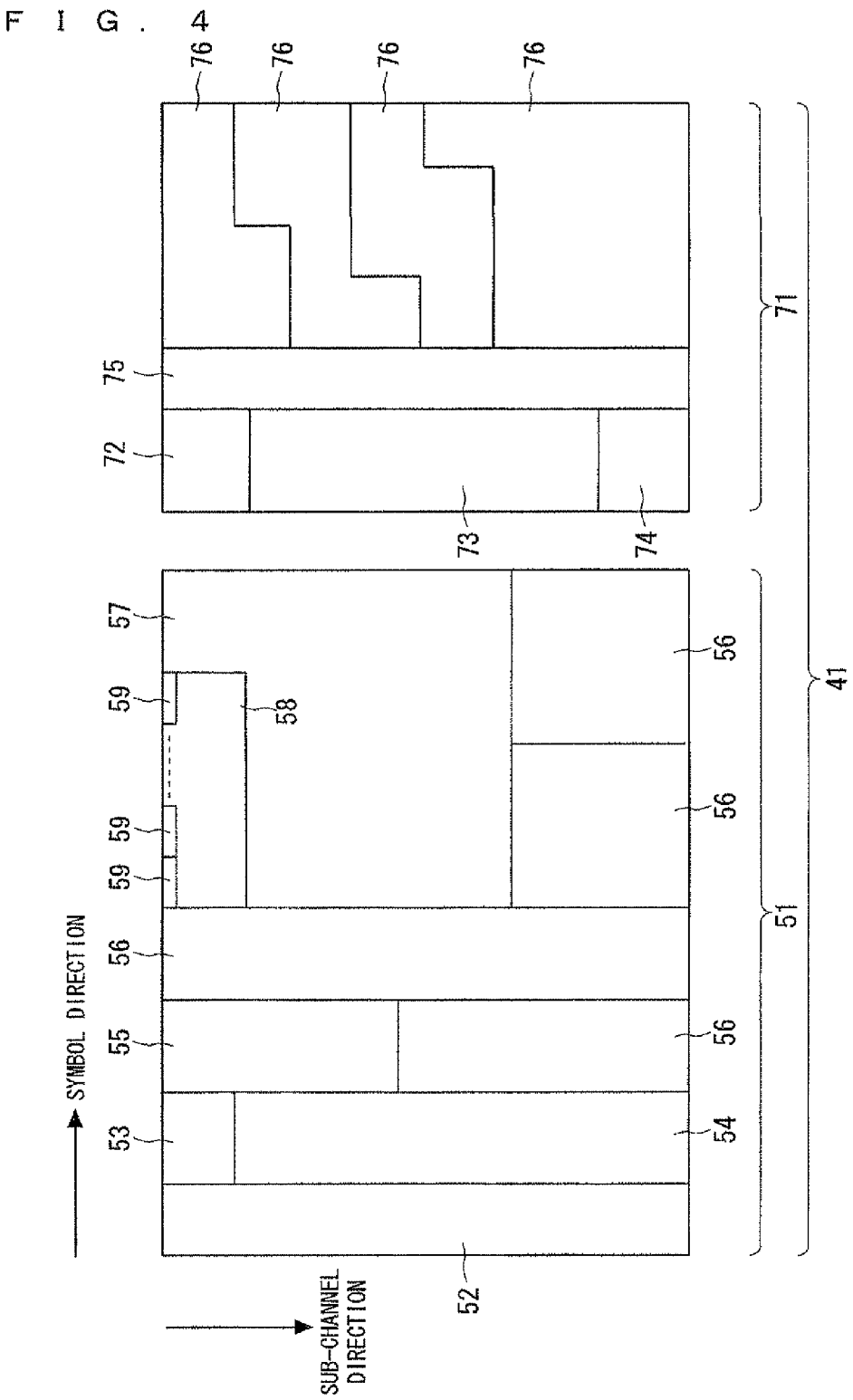

F I G . 1 6
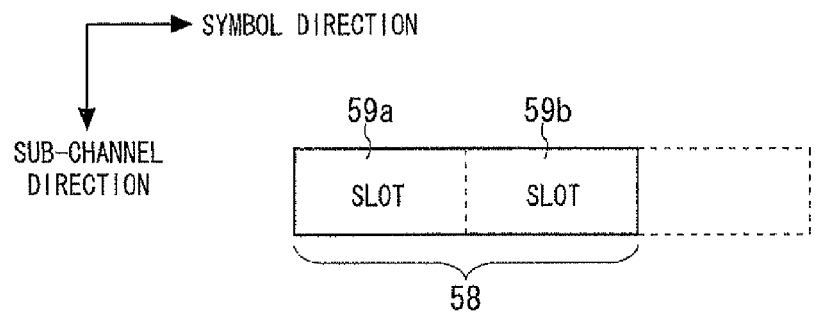
F I G . 1 7
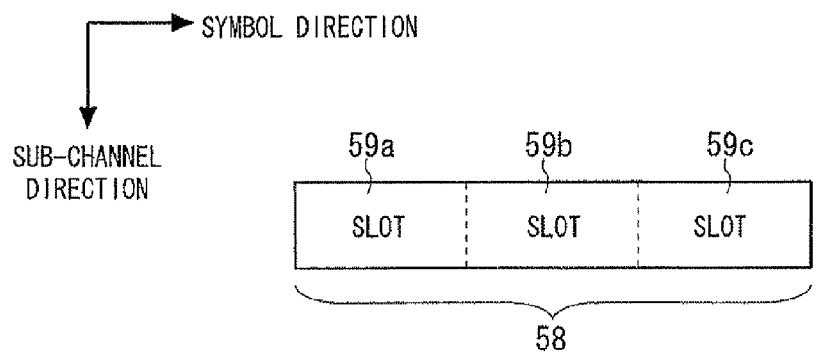
F I G . 1 8
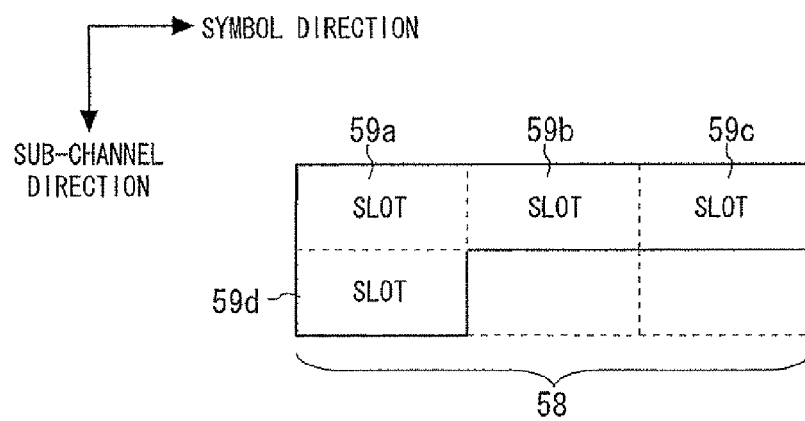

F I G . 2 1
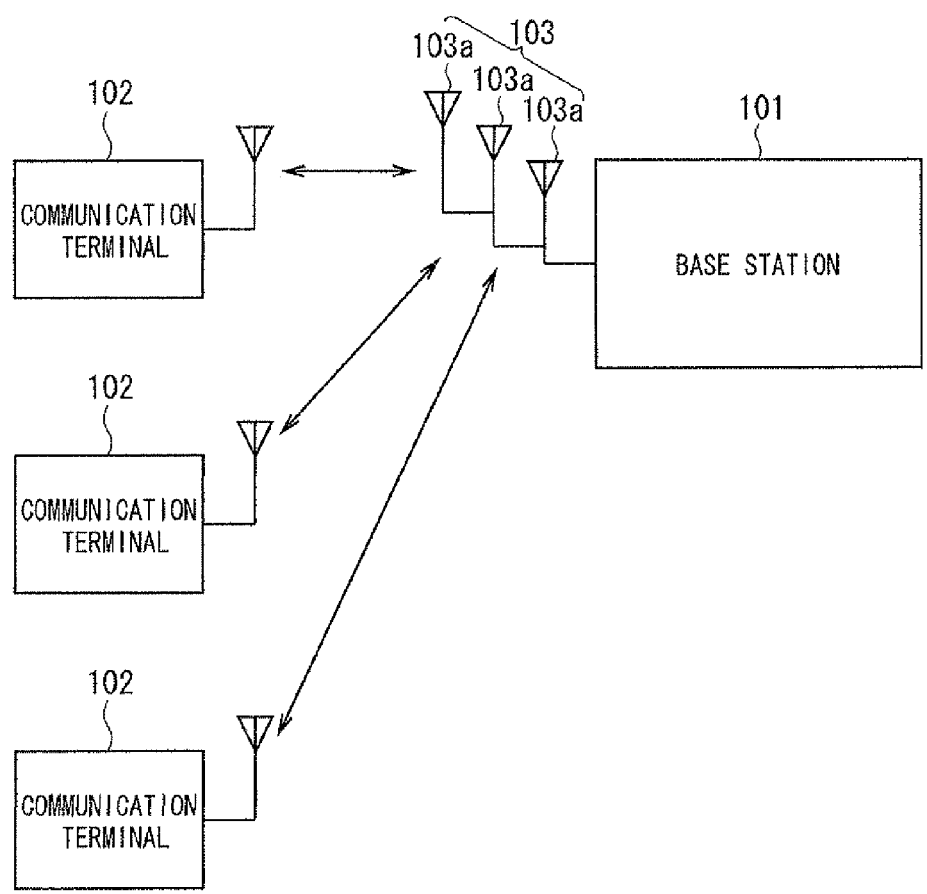

F I G. 3 1
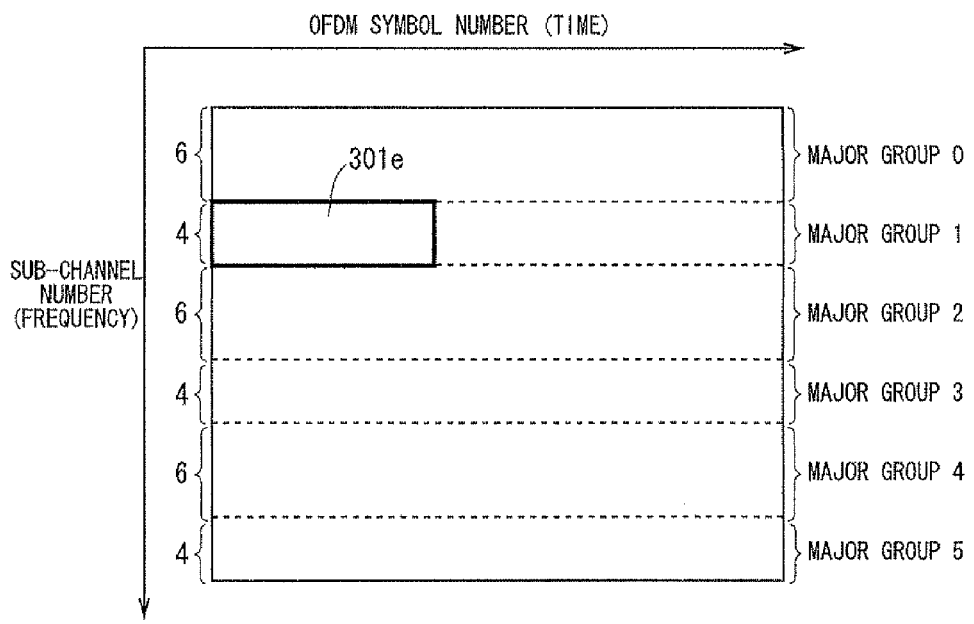
F I G. 3 2
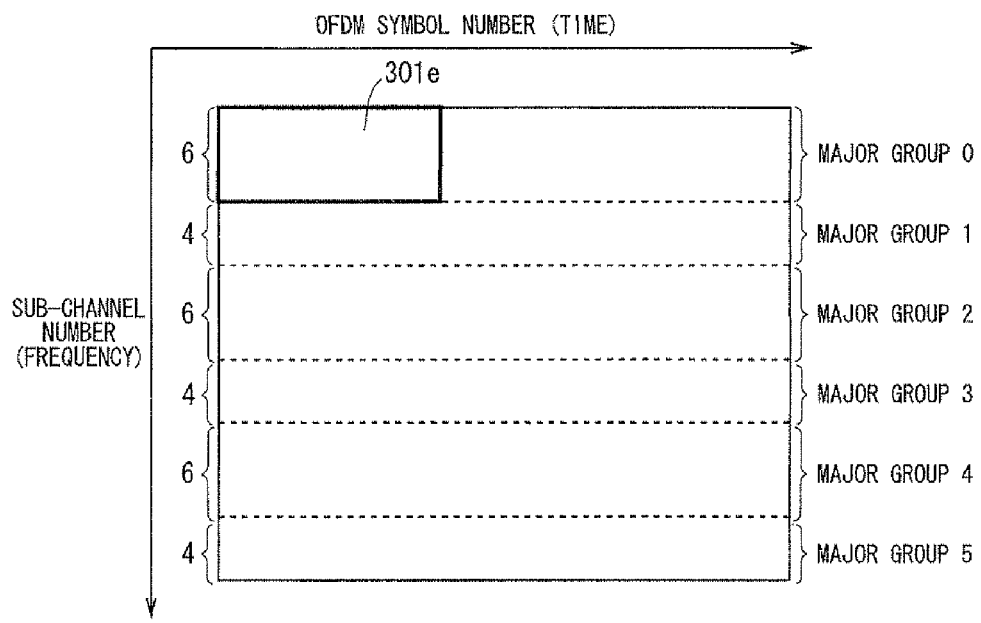

F I G . 3 3
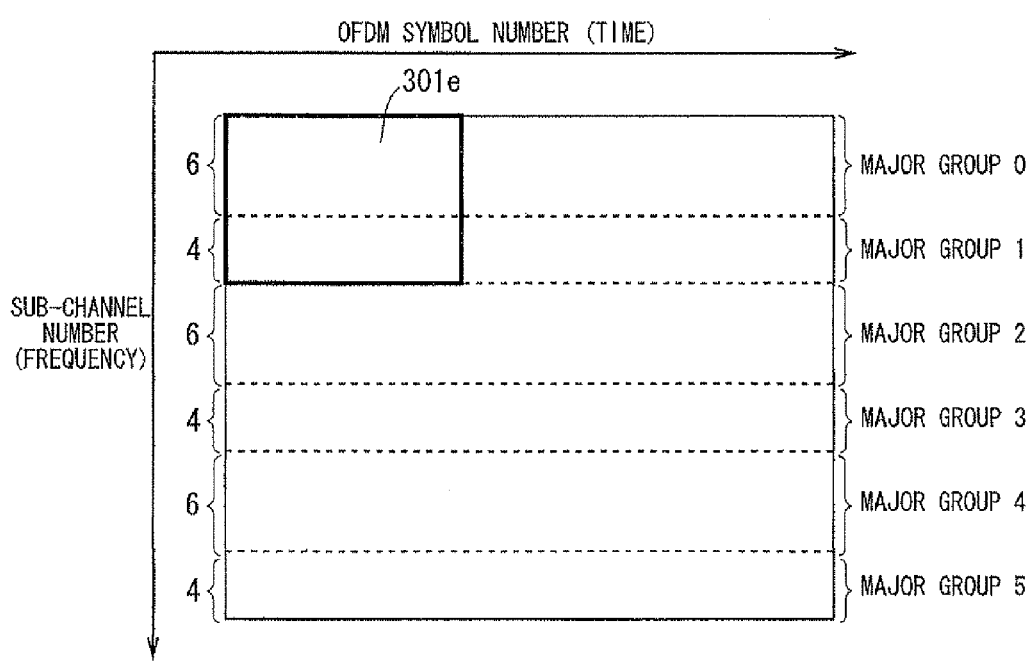

F I G . 3 4

| DOWNLINK BURST REGION #1<br>Nslot=41 | 6 − r 6 = 1 ★<br>4 − r 4 = 3<br>1 0 − r 1 0 = 9 |
|---|---|
| DOWNLINK BURST REGION #2<br>Nslot=42 | r 6 = 0 ★<br>4 − r 4 = 2<br>1 0 − r 1 0 = 8 |
| DOWNLINK BURST REGION #3<br>Nslot=26 | 6 − r 6 = 4<br>4 − r 4 = 2 ★<br>1 0 − r 1 0 = 4 |
| DOWNLINK BURST REGION #4<br>Nslot=32 | 6 − r 6 = 4<br>r 4 = 0 ★<br>1 0 − r 1 0 = 8 |
| DOWNLINK BURST REGION #5<br>Nslot=53 | 6 − r 6 = 1 ★<br>4 − r 4 = 3<br>1 0 − r 1 0 = 7 |
| DOWNLINK BURST REGION #6<br>Nslot=36 | r 6 = 0 ★<br>r 4 = 0<br>1 0 − r 1 0 = 4 |
| DOWNLINK BURST REGION #7<br>Nslot=27 | 6 − r 6 = 3<br>4 − r 4 = 1 ★<br>1 0 − r 1 0 = 3 |
| DOWNLINK BURST REGION #8<br>Nslot=32 | 6 − r 6 = 4<br>r 4 = 0 ★<br>1 0 − r 1 0 = 8 |
| DOWNLINK BURST REGION #9<br>Nslot=140 | 6 − r 6 = 4<br>r 4 = 0<br>r 1 0 = 0 ★ |

F I G. 4 1
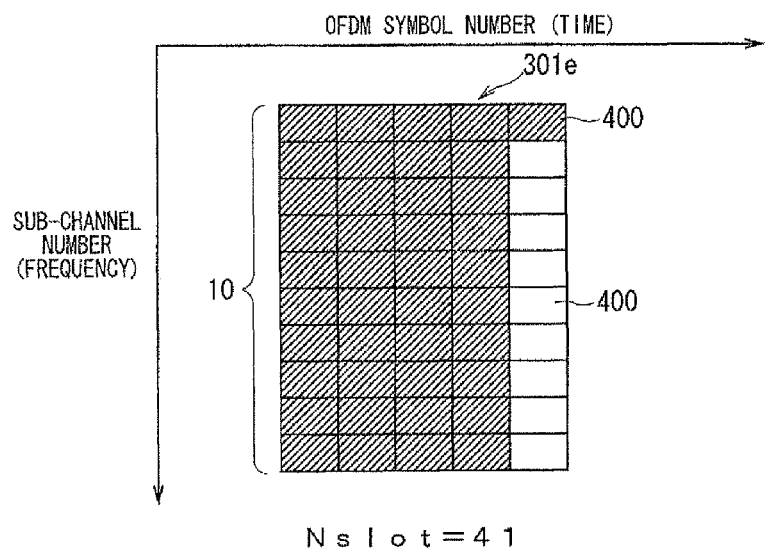
Nslot=41
F I G. 4 2
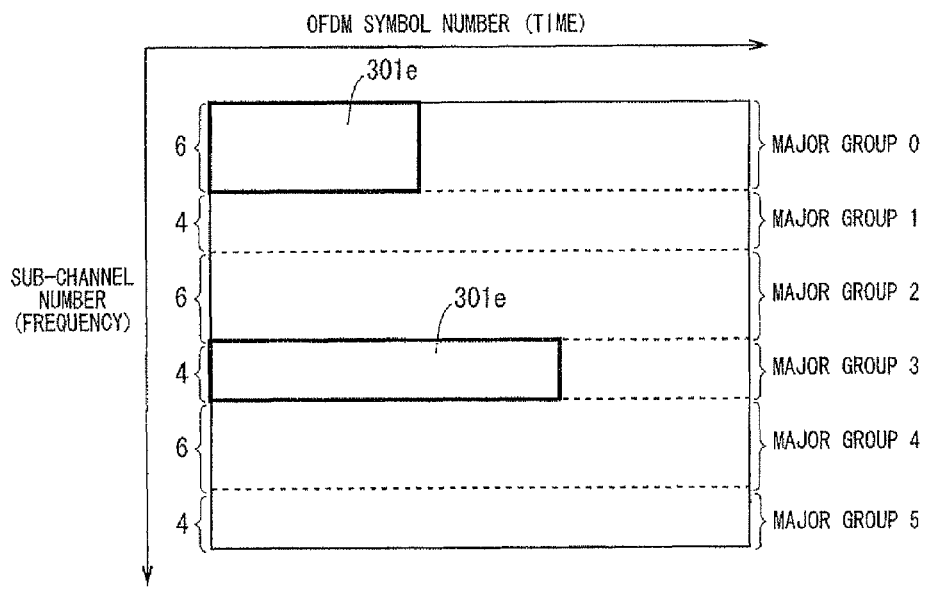

BASE STATION, METHOD FOR ARRANGING SUB BURST REGION IN BASE STATION, METHOD FOR DETERMINING TERMINAL TO BE COMMUNICATED WITH, AND METHOD FOR ALLOCATING DOWNLINK BURST REGION

TECHNICAL FIELD

The present invention relates to a base station communicating with a communication terminal.

BACKGROUND ART

Conventionally, various techniques relating to wireless communication have been proposed. For example, a technique of performing communication using the Automatic Repeat reQuest (ARQ) scheme has been proposed. In the ARQ scheme, a communication terminal receives a downlink frame from a base station, and when finding an error in data of the downlink frame, requests the base station to retransmit the erroneous data.

A wireless communication technique called WiMAX (Worldwide Interoperability for Microwave Access) is also proposed in which communication is performed based on the OFDMA (Orthogonal Frequency Division Multiple Access) scheme. The WiMAX defines the Hybrid Automatic Repeat reQuest (HARQ) scheme in which the ARQ and an error correction code are combined with each other. For example, as shown in Patent Document 1, a sub-burst which is data used in the HARQ is included in a sub-burst region of a downlink sub-frame transmitted from the base station to the communication terminal.

One of the wireless communication techniques is the Proportional Fairness. In the Proportional Fairness, the priority of transmission to each of communication terminals is set such that the communication terminals can transmit a maximum possible number of bits while the communication quality is still good. This can complete the transmission between the base station and the respective communication terminals within a short time period. Here, fairness among a plurality of communication terminals is maintained by lowering the priority of a communication terminal having a large amount of previous data transmission to thereby allow communication of a communication terminal having a small amount of data transmission.

Patent Document 2 discloses a technique in which a base station according to the WiMAX performs wireless communication with a communication terminal by using the adaptive array antenna scheme.

In the WiMAX, various methods for arranging sub-channels are defined. Among them, a downlink PUSC (Partial Usage of Subchannels) applied to downlink communication defines a plurality of major groups each including a plurality of sub-channels.

In the WiMAX, a downlink burst region for transmitting user data is allocated in a downlink sub-frame used in signal transmission from the base station to the communication terminal. In a case where the base station including an array antenna adopts the downlink PUSC as a method for arranging sub-channels in the downlink burst region and performs beam-forming to control the directivity of the array antenna to thereby transmit a signal to the communication terminal, it is necessary to allocate the downlink burst region to the downlink sub-frame on a major-group basis.

In the WiMAX, on the other hand, it is necessary to allocate the downlink burst region to the downlink sub-frame so as to have a rectangular shape on an OFDM symbol (time)/sub-channel plane whose horizontal axis and vertical axis represent an OFDM symbol and a sub-channel, respectively.

In the WiMAX, furthermore, it is necessary to allocate the downlink burst region to the downlink sub-frame on a so-called "slot" basis.

PRIOR-ART DOCUMENTS

Patent Documents

Patent Document 1: National Publication of Translation No. 2008-527839
Patent Document 2: Japanese Patent Application Laid-Open No. 2008-048236

SUMMARY OF THE INVENTION

Problems to be Solved by the Invention

In the WiMAX, at least one slot including one sub-channel and at least one OFDM symbol is reserved in a downlink sub-frame, and thereby a sub-burst region is arranged in the downlink sub-frame. Conventionally, in the procedures for reservation of a slot of an HARQ sub-burst region, a plurality of slots are reserved along a direction in which the sub-channel number increases. Accordingly, the HARQ sub-burst region is arranged in the downlink sub-frame so as to extend over a large number of sub-channels.

In general, the magnitude of frequency selective fading which deteriorates the communication quality is different among sub-channels. Therefore, in a case where one HARQ sub-burst region is arranged over a large number of sub-channels, the magnitude of frequency selective fading largely varies in one HARQ sub-burst region. This consequently causes a problem that a process for correcting the frequency selective fading, such as a gain adjustment process, is complicated.

Thus, a first object of the present invention is to provide a technique capable of preventing a HARQ sub-burst region from being arranged over a plurality of sub-channels.

In a case where a base station of the WiMAX or the like transmits data to a plurality of communication terminals by using a beam-forming technique of the adaptive array antenna scheme or the like, a communication terminal to be communicated with is determined several frames prior to a frame for transmitting the data, and control information for causing the communication terminal to transmit a sounding signal is transmitted to the communication terminal. Then, based on the sounding signal transmitted from the communication terminal to be communicated with, the base station calculates a weight to be applied to an array antenna with respect to the communication terminal. Then, based on the weight obtained as a result of the calculation, the base station transmits the data via the array antenna to the communication terminal having transmitted the sounding signal. In this manner, the base station determines the communication terminal to which data should be transmitted, several frames prior to the frame for transmitting the data.

In the WiMAX, as described above, the communication terminal to be communicated with is determined several frames prior to the frame for transmitting data. Thus, there is a long time lag between a time point when the communication terminal to be communicated with is determined and a time point when data is transmitted from the base station to the communication terminal. During this long time lag, a radio wave condition may vary and thus the communication quality may change. Accordingly, even if a good communication quality is obtained at the time point when the communication terminal to be communicated with is determined using the Proportional Fairness, the communication quality may be deteriorated at the time of data transmission. This consequently raises a problem that the base station cannot communicate with a communication terminal having a good communication quality.

Therefore, a second object of the present invention is to provide a technique allowing the base station to communicate with a communication terminal having a communication quality.

In the WiMAX, as described above, there are various limitations in the allocation of the downlink burst region to the downlink sub-frame. This may cause a lot of slots are not used for transmission of user data, among a plurality of slots included in the downlink burst region.

Therefore, a third object of the present invention is to provide a technique capable of saving the number of slots not used in the downlink burst region.

Means for Solving the Problems

A base station according to the present invention is a base station in WiMAX (Worldwide Interoperability for Microwave Access) including: a transmission section for transmitting a signal to a communication terminal; a reception section for receiving a signal from the communication terminal; a first arrangement section for arranging a predetermined region for a sub-burst, in a downlink sub-frame to be transmitted from the transmission section to the communication terminal; and a second arrangement section for arranging, in the predetermined region, at least one sub-burst region for HARQ (Hybrid Automatic Repeat reQuest) allocated to at least one communication terminal. The second arrangement section sequentially reserves a plurality of sub-burst slots in the predetermined region to thereby arrange a sub-burst region in the predetermined region. With respect to at least initial and next slots reserved in the predetermined region, the second arrangement section reserves these slots along a symbol direction.

In an aspect of the base station according to the present invention: the transmission section and the reception section share an adaptive array; the base station further includes a weight calculation section for calculating a weight for the adaptive array based on a sounding signal received by the reception section; and an estimation section for estimating the amount of phase rotation of a pilot signal received by the reception section; the transmission section transmits a signal through the adaptive array, based on the weight; and when arranging the sub-burst region in the downlink sub-frame, the second arrangement section reserves a first row of slots along the symbol direction until the amount of phase rotation in all symbols included in all the slots starting from the firstly-reserved slot and reserved along the symbol direction reaches a value closest to and less than a predetermined threshold value.

In an aspect of the base station according to the present invention, when reserving second and subsequent row of slots, the second arrangement section sequentially reserves slots in the same symbols as all the symbols included in all the slots in the first row.

In an aspect, the base station according to the present invention further includes: an estimation section for estimating communication quality of a sub-carrier in the predetermined region, based on a pilot signal received by the reception section; and a determination section for determining whether or not the communication quality estimated by the estimation section satisfies predetermined criteria. The second arrangement section arranges, among the at least one sub-burst region, a first sub-burst region containing a first sub-burst whose amount exceeds a predetermined data amount, in the predetermined region such that the first sub-burst region covers a good sub-carrier which is a sub-carrier whose communication quality is determined to satisfy the predetermined criteria by the determination section.

In an aspect of the base station according to the present invention, the second arrangement section arranges, among the at least one sub-burst region, a second sub-burst region containing a second sub-burst whose amount is equal to or less than the predetermined data amount, in the predetermined region such that the second sub-burst region is adjacent to the first sub-burst region.

In an aspect of the base station according to the present invention, the second arrangement section arranges, among the at least one sub-burst region, a second sub-burst region containing a second sub-burst whose amount is equal to or less than the predetermined data amount, in the predetermined region such that the second sub-burst region covers the good sub-carrier.

A method for arranging a sub-burst region in a base station according to the present invention is a method for arranging a sub-burst region in a base station in WiMAX (Worldwide Interoperability for Microwave Access), the method including the steps of: (a) arranging a predetermined region for a sub-burst, in a downlink sub-frame to be transmitted to a communication terminal; and (b) arranging, in the predetermined region, at least one sub-burst region for HARQ (Hybrid Automatic Repeat reQuest) allocated to at least one communication terminal. In the step (b): a plurality of sub-burst slots are sequentially reserved in the predetermined region, and thereby with respect to at least an initial and next slots reserved in the predetermined region, these slots are reserved along a symbol direction.

In an aspect, the method for arranging a sub-burst region in a base station according to the present invention further includes: (c) an adaptive array receiving a sounding signal from the communication terminal; (d) calculating a weight for the adaptive array based on the sounding signal received in the step (c); (e) transmitting a signal to the communication terminal through the adaptive array, based on the weight calculated in the step (d); (f) the adaptive array receiving a pilot signal from the communication terminal; and (g) estimating the amount of phase rotation of the pilot signal received in the step (f). In the step (b), a first row of slots are reserved along the symbol direction until the amount of phase rotation in all symbols included in all the slots starting from the firstly-reserved slot and reserved along the symbol direction reaches a value closest to and less than a predetermined threshold value.

In an aspect, the method for arranging a sub-burst region in a base station according to the present invention further includes: (c) receiving a pilot signal from the communication terminal; (d) estimating communication quality of a sub-carrier in the predetermined region, based on the pilot signal received in the step (c); and (e) determining whether or not the communication quality estimated in the step (d) satisfies predetermined criteria. In the step (b), among the at least one sub-burst region, a first sub-burst region containing a first sub-burst whose amount exceeds a predetermined data amount is arranged in the predetermined region such that the first sub-burst region covers a good sub-carrier which is a sub-carrier whose communication quality is determined to satisfy the predetermined criteria in the step (e).

A base station according to the present invention is a base station that collects a plurality of communication terminals, the base station including: a reception section for receiving a signal from the communication terminal via an array antenna; a weight calculation section for calculating a weight to be applied to the array antenna with respect to the communication terminal, based on a known signal supplied from the communication terminal and received by the reception section; a transmission section for transmitting a signal to the communication terminal via the array antenna; a candidate determination section for determining m (m>1) communication terminals, as communication-object candidates; a control section for causing the transmission section to transmit control information to the m communication terminals, the control information being configured to cause the communication terminal to transmit the known signal; and a communication-object determination section for determining, as communication objects, l (1≤l<m) communication terminals among the m communication terminals, based on quality of communication between the base station and the m communication terminals which is obtained after the candidate determination section determines the m communication terminals. The control section causes the transmission section to transmit data to the l communication terminals, based on the weight calculated by the weight calculation section.

In an aspect of the base station according to the present invention, the communication-object determination section selects the l communication terminals from the m communication terminals based on a value obtained by dividing a CINR (Carrier-to-Interference-plus-Noise Ratio) corresponding to one frame by an average value of CINRs corresponding to a plurality of previous frames, and determines the selected communication terminals as communication objects, the one frame being received by the reception section after the candidate determination section determines the m communication terminals.

A method for determining a communication object terminal according to the present invention is a method for determining a communication object terminal being performed in a base station that collects a plurality of communication terminals, the method including the steps of: (a) a reception section receiving a signal from the communication terminal via an array antenna; (b) calculating a weight to be applied to the array antenna with respect to the communication terminal, based on a known signal supplied from the communication terminal and received by the reception section; (c) determining m (m>1) communication terminals as communication-object candidates; (d) transmitting control information to the m communication terminals via the array antenna, the control information being configured to cause the communication terminal to transmit the known signal; (e) determining, as communication objects, l (1≤l<m) communication terminals from the m communication terminals, based on quality of communication between the base station and the m communication terminals after the step (c); and (f) transmitting data to the l communication terminals via the array antenna, based on the weight calculated in the step (d).

In an aspect of the method for determining a communication object terminal according to the present invention, in the step (e), the l communication terminals are selected from the m communication terminals based on a value obtained by dividing a CINR (Carrier-to-Interference-plus-Noise Ratio) corresponding to one frame by an average value of CINRs corresponding to a plurality of previous frames, and the selected communication terminals are determined as communication objects, the one frame being received by the reception section after the step (c).

A base station according to the present invention is a base station in WiMAX (Worldwide Interoperability for Microwave Access) that performs multiple-access communication with a plurality of communication terminals by using a plurality of sub-carriers in OFDM (Orthogonal Frequency Division Multiplexing), the base station including: a burst-region allocation section for allocating at least one downlink burst region in a downlink sub-frame defined on a time/sub-channel plane; and a transmission section for transmitting data by using the downlink burst region allocated in the downlink sub-frame by the burst-region allocation section. The plurality of sub-carriers are grouped into a plurality of sub-channels. The plurality of sub-channels are grouped into a plurality of major groups. A slot is composed of one sub-channel and at least one OFDM symbol. The burst-region allocation section allocates the downlink burst region in the downlink sub-frame on a slot basis and on a major-group basis such that the downlink burst region has a rectangular shape on the time/sub-channel plane. A plurality of reference values are set, the plurality of reference values being used when the burst-region allocation section allocates the downlink burst region in the downlink sub-frame. The plurality of reference values are set such that each of the plurality of reference values is equal to the number of sub-channels constituting one major group or the number of sub-channels constituting a plurality of major groups having sequential numbers, and such that the plurality of reference values are different from one another. In a case where there is a certain reference value in the plurality of reference values that leaves a remainder of zero as a result of dividing, by the certain reference value, the number of necessary slots necessary for transmitting data in one downlink burst region, the burst-region allocation section allocates the one downlink burst region in the downlink sub-frame so as to occupy, among the plurality of major groups, only at least one major group composed of sub-channels the number of which is equal to the certain reference value that leaves a remainder of zero. In a case where there is no reference value in the plurality of reference values that makes the remainder zero, the burst-region allocation section allocates the one downlink burst region in the downlink sub-frame so as to occupy only at least one major group composed of sub-channels the number of which is equal to one of the plurality of reference values that provides the smallest value among values obtained by subtracting, from the plurality of reference values, the remainders left as a result of dividing the number of necessary slots by the plurality of reference values, respectively.

In an aspect of the base station according to the present invention: in a case where the plurality of reference values include a plurality of certain reference values that leave remainders of zero as a result of dividing, by the certain reference values, the number of necessary slots necessary for transmitting data in one downlink burst region, the burst-region allocation section allocates the downlink burst region in the downlink sub-frame so as to occupy only at least one major group composed of sub-channels the number of which is equal to the greatest one of the certain reference values; and in a case where the plurality of reference values include no reference value that makes the remainder zero and the plurality of reference values include a plurality of certain reference values that provide the smallest value among values obtained by subtracting, from the plurality of reference values, the remainders left as a result of dividing the number of necessary slots by the plurality of reference values, respectively, the burst-region allocation section allocates the one downlink burst region in the downlink sub-frame so as to occupy only at least one major group composed of sub-channels the number of which is equal to the greatest one of the certain reference values that provide the smallest value.

A base station according to the present invention is a base station in WiMAX (Worldwide Interoperability for Microwave Access) that performs multiple-access communication with a plurality of communication terminals by using a plurality of sub-carriers in OFDM (Orthogonal Frequency Division Multiplexing), the base station including: a burst-region allocation section for allocating at least one downlink burst region in a downlink sub-frame defined on a time/sub-channel plane; and a transmission section for transmitting data by using the downlink burst region allocated in the downlink sub-frame by the burst-region allocation section. The plurality of sub-carriers are grouped into a plurality of sub-channels. The plurality of sub-channels are grouped into a plurality of major groups. A slot is composed of one sub-channel and at least one OFDM symbol. The burst-region allocation section allocates the downlink burst region in the downlink sub-frame on a slot basis and on a major-group basis such that the downlink burst region has a rectangular shape on the time/sub-channel plane. A plurality of reference values are set, the plurality of reference values being used when the burst-region allocation section allocates the downlink burst region in the downlink sub-frame. The plurality of reference values are set such that each of the plurality of reference values is equal to the number of sub-channels constituting one major group or the number of sub-channels constituting a plurality of major groups having sequential numbers, and such that the plurality of reference values are different from one another. In a case where the plurality of reference values include a certain reference value whose multiple is equal to the number of necessary slots necessary for transmitting data in one downlink burst region, the burst-region allocation section allocates the one downlink burst region in the downlink sub-frame so as to occupy, among the plurality of major groups, only at least one major group composed of sub-channels the number of which is equal to the certain reference value. In a case where the plurality of reference values do not include the certain reference value whose multiple is equal to the number of necessary slots, the burst-region allocation section allocates the one downlink burst region in the downlink sub-frame so as to occupy only at least one major group composed of sub-channels the number of which is equal to one of the plurality of reference values that provides the smallest difference among differences between the number of necessary slots and multiples of the respective plurality of reference values closest to and greater than the number of necessary slots.

In an aspect of the base station according to the present invention: in a case where the plurality of reference values include a plurality of certain reference values whose multiples are equal to the number of necessary slots necessary for transmitting data in one downlink burst region, the burst-region allocation section allocates the one downlink burst region in the downlink sub-frame so as to occupy only at least one major group composed of sub-channels the number of which is equal to the greatest one of the certain reference values; in a case where the plurality of reference values do not include the certain reference values whose multiples are equal to the number of necessary slots and the plurality of reference values include a plurality of certain reference values that provide the smallest difference among differences between the number of necessary slots and multiples of the respective plurality of reference values closest to and greater than the number of necessary slots, the burst-region allocation section allocates the one downlink burst region in the downlink sub-frame so as to occupy only at least one major group composed of sub-channels the number of which is equal to the greatest one of the certain reference values that provide the smallest difference.

A method for allocating a downlink burst region according to the present invention is a method for allocating a downlink burst region in a base station in WiMAX (Worldwide Interoperability for Microwave Access) that performs multiple-access communication with a plurality of communication terminals by using a plurality of sub-carriers in OFDM (Orthogonal Frequency Division Multiplexing). The plurality of sub-carriers are grouped into a plurality of sub-channels. The plurality of sub-channels are grouped into a plurality of major groups. A slot is composed of one sub-channel and at least one OFDM symbol. The downlink burst region is allocated in a downlink sub-frame on a slot basis and on a major-group basis such that the downlink burst region has a rectangular shape on a time/sub-channel plane. A plurality of reference values are set, the plurality of reference values being used when the downlink burst region is allocated in the downlink sub-frame. The plurality of reference values are set such that each of the plurality of reference values is equal to the number of sub-channels constituting one major group or the number of sub-channels constituting a plurality of major groups having sequential numbers, and such that the plurality of reference values are different from one another. In a case where there is a certain reference value in the plurality of reference values that leaves a remainder of zero as a result of dividing, by the certain reference value, the number of necessary slots necessary for transmitting data in one downlink burst region, the one downlink burst region is allocated in the downlink sub-frame so as to occupy, among the plurality of major groups, only at least one major group composed of sub-channels the number of which is equal to the certain reference value that leaves a remainder of zero. In a case where there is no reference value in the plurality of reference values that makes the remainder zero, the one downlink burst region is allocated in the downlink sub-frame so as to occupy only at least one major group composed of sub-channels the number of which is equal to one of the plurality of reference values that provides the smallest value among values obtained by subtracting, from the plurality of reference values, the remainders left as a result of dividing the number of necessary slots by the plurality of reference values, respectively.

A method for allocating a downlink burst region according to the present invention is a method for allocating a downlink burst region in a base station in WiMAX (Worldwide Interoperability for Microwave Access) that performs multiple-access communication with a plurality of communication terminals by using a plurality of sub-carriers in OFDM (Orthogonal Frequency Division Multiplexing). The plurality of sub-carriers are grouped into a plurality of sub-channels. The plurality of sub-channels are grouped into a plurality of major groups. A slot is composed of one sub-channel and at least one OFDM symbol. The downlink burst region is allocated in a downlink sub-frame on a slot basis and on a major-group basis such that the downlink burst region has a rectangular shape on a time/sub-channel plane. A plurality of reference values are set, the plurality of reference values being used when the downlink burst region is allocated in the downlink sub-frame. The plurality of reference values are set such that each of the plurality of reference values is equal to the number of sub-channels constituting one major group or the number of sub-channels constituting a plurality of major groups having sequential numbers, and such that the plurality of reference values are different from one another. In a case where the plurality of reference values include a certain reference value whose multiple is equal to the number of necessary slots necessary for transmitting data in one downlink burst region, the one downlink burst region is allocated in the downlink sub-frame so as to occupy, among the plurality of major groups, only at least one major group composed of sub-channels the number of which is equal to the certain reference value. In a case where the plurality of reference values do not include the certain reference value whose multiple is equal to the number of necessary slots, the one downlink burst region is allocated in the downlink sub-frame so as to occupy only at least one major group composed of sub-channels the number of which is equal to one of the plurality of reference values that provides the smallest difference among differences between the number of necessary slots and multiples of the respective plurality of reference values closest to and greater than the number of necessary slots.

Effects of the Invention

According to the present invention, while a sub-burst region for HARQ is arranged in a predetermined region, reservation is made along a symbol direction with respect to at least initial and next slots. This can prevent the sub-burst region for HARQ from being arranged over a large number of sub-channels. As a result, the magnitude of frequency selective fading can be prevented from largely varying in the sub-burst region. Therefore, a process for correction thereof can be simplified.

In an aspect of the present invention, a first row of slots are reserved along the symbol direction until the amount of phase rotation in all symbols included in all the slots starting from the firstly-reserved slot and so far reserved along the symbol direction reaches a value closest to and less than a predetermined threshold value. This can ensure that a sub-burst is transmitted to the communication terminal.

In an aspect of the present invention, a first sub-burst region containing a first sub-burst whose amount exceeds a predetermined data amount is arranged in a good sub-carrier. This can reduce an erroneous data amount of the first sub-burst having a large data amount.

In an aspect of the present invention, a second sub-burst region containing a second sub-burst whose amount is equal to or less than the predetermined data amount is arranged in the predetermined region so as to be adjacent to the first sub-burst region arranged so as to cover the good sub-carrier. This can reduce an erroneous data amount of the second sub-burst.

In an aspect of the present invention, the second sub-burst region containing the second sub-burst whose data is equal to or less than the predetermined data amount is arranged in the predetermined region so as to cover the good sub-carrier. This can reduce an erroneous data amount of the second sub-burst.

According to the present invention, a base station determines m (m>1) communication terminals as communication-object candidates, and determines l (1≤l<m) communication terminals from the m communication terminals based on quality of communication between the base station and the m communication terminals after the determination. Then, the base station transmits data to each of the determined l communication terminals. This can shorten a time lag between a time point when the l communication terminals to which data should be transmitted are determined and a time point when the data is transmitted from the base station to the l communication terminals. This can suppress a change in the communication quality during an interval between these time points, thus enabling the base station to communicate with a communication terminal having a good communication quality.

According to the present invention, a plurality of reference values that are set such that each of said plurality of reference values is equal to the number of sub-channels constituting one major group or the number of sub-channels constituting a plurality of major groups having sequential numbers and such that the plurality of reference values are different from one another include a certain reference value that leaves a remainder of zero as a result of dividing, by the certain reference value, the number of necessary slots necessary for transmitting data in one downlink burst region; the one downlink burst region is allocated in the downlink sub-frame so as to occupy, among the plurality of major groups, only at least one major group composed of sub-channels the number of which is equal to the certain reference value that leaves a remainder of zero. In a case where there is no reference value that makes the remainder zero, the one downlink burst region is allocated in the downlink sub-frame so as to occupy only at least one major group composed of sub-channels the number of which is equal to one of the plurality of reference values that provides the smallest value among values obtained by subtracting, from the plurality of reference values, the remainders left as a result of dividing the number of necessary slots by the plurality of reference values, respectively. This can save the number of slots not used for data transmission in the plurality of slots constituting one downlink burst region.

In an aspect of the present invention, in a case where the plurality of reference values include a plurality of certain reference values that leave remainders of zero as a result of dividing, by the certain reference values, the number of necessary slots necessary for transmitting data in one downlink burst region, the downlink burst region is allocated in the downlink sub-frame so as to occupy only at least one major group composed of sub-channels the number of which is equal to the greatest one of the certain reference values. In a case where the plurality of reference values include no reference value that makes the remainder zero and the plurality of reference values include a plurality of certain reference values that provide the smallest value among values obtained by subtracting, from the plurality of reference values, the remainders left as a result of dividing the number of necessary slots by the plurality of reference values, respectively, the one downlink burst region is allocated in the downlink sub-frame so as to occupy only at least one major group composed of sub-channels the number of which is equal to the greatest one of the plurality of certain reference values that provide the smallest value. This can save the length of one downlink burst region in the time direction, and make it easy to arrange another downlink burst region so as to be adjacent to the one downlink burst region in the time direction. As a result, a plurality of downlink burst regions can be efficiently arranged in one downlink sub-frame.

According to the present invention, a plurality of reference values that are set such that each of said plurality of reference values is equal to the number of sub-channels constituting one major group or the number of sub-channels constituting a plurality of major groups having sequential numbers and such that the plurality of reference values are different from one another include a certain reference value whose multiple is equal to the number of necessary slots necessary for transmitting data in one downlink burst region; the one downlink burst region is allocated in the downlink sub-frame so as to occupy, among the plurality of major groups, only at least one major group composed of sub-channels the number of which is equal to the certain reference value. In a case where the plurality of reference values do not include the certain reference value whose multiple is equal to the number of necessary slots, the one downlink burst region is allocated in the downlink sub-frame so as to occupy only at least one major group composed of sub-channels the number of which is equal to one of the plurality of reference values that provides the smallest difference among differences between the number of necessary slots and multiples of the respective plurality of reference values closest to and greater than the number of necessary slots. This can save the number of slots not used for data transmission in the plurality of slots constituting one downlink burst region.

In an aspect of the present invention, in a case where the plurality of reference values include a plurality of certain reference values whose multiples are equal to the number of necessary slots necessary for transmitting data in one downlink burst region; the one downlink burst region is allocated in the downlink sub-frame so as to occupy only at least one major group composed of sub-channels the number of which is equal to the greatest one of the certain reference values. In a case where the plurality of reference values do not include the certain reference values whose multiples are equal to the number of necessary slots and the plurality of reference values include a plurality of certain reference values that provide the smallest difference among differences between the number of necessary slots and multiples of the respective plurality of reference values closest to and greater than the number of necessary slots; the one downlink burst region is allocated in the downlink sub-frame so as to occupy only at least one major group composed of sub-channels the number of which is equal to the greatest one of the certain reference values that provide the smallest difference. This can save the length of one downlink burst region in the time direction, and make it easy to arrange another downlink burst region so as to be adjacent to the one downlink burst region in the time direction. As a result, a plurality of downlink burst regions can be efficiently arranged in one downlink sub-frame.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a block diagram showing a configuration of a control section according to the embodiment 1 of the present invention.

FIG. 3 is a flowchart showing an operation of the control section according to the embodiment 1 of the present invention.

FIG. 4 is a diagram showing an example of a frame configuration in a mobile WiMAX.

FIG. 16 is a diagram showing the slot-reserving operation according to the embodiment 1 of the present invention.

FIG. 17 is a diagram showing the slot-reserving operation according to the embodiment 1 of the present invention.

FIG. 18 is a diagram showing the slot-reserving operation according to the embodiment 1 of the present invention.

FIG. 21 is a diagram showing a configuration of a wireless communication system according to an embodiment 2 of the present invention.

FIG. 31 is a diagram showing an example of allocation of a downlink burst region.

FIG. 32 is a diagram showing an example of the allocation of the downlink burst region.

FIG. 33 is a diagram showing an example of the allocation of the downlink burst region.

FIG. 34 is a diagram showing calculated values in the allocation of nine downlink burst regions.

FIG. 41 is a diagram illustrating a state of slots included in the downlink burst region.

FIG. 42 is a diagram showing an example of allocation of downlink burst regions.

EMBODIMENT FOR CARRYING OUT THE INVENTION

Embodiment 1

Figure 1:
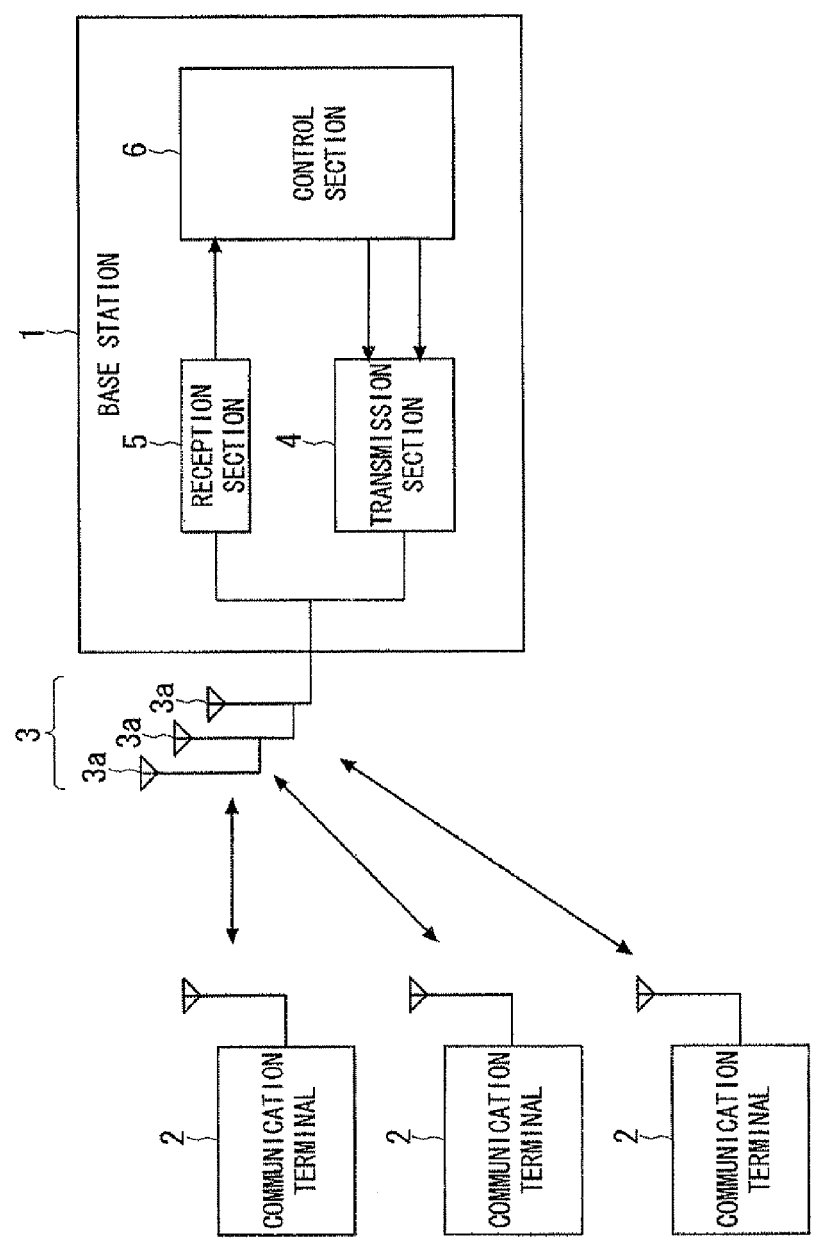
FIG. 1 is a block diagram showing a configuration of a wireless communication system according to an embodiment 1 of the present invention.

FIG. 1 is a diagram showing a configuration of a wireless communication system according to an embodiment 1 of the present invention. The wireless communication system includes a base station 1 and a plurality of communication terminals 2. The base station 1 of this embodiment is a base station according to the mobile WiMAX defined in IEEE 802.16e.

As shown in FIG. 1, the base station 1 includes an adaptive array 3, a transmission section 4, a reception section 5, and a control section 6. The transmission section 4 and the reception section 5 share the adaptive array 3 having a plurality of antenna elements 3a. Thus, the adaptive array 3 is an array antenna functioning as a transmission antenna for transmitting a radio signal to the communication terminal 2 and a reception antenna for receiving a radio signal from the communication terminal 2. The reception section 5 performs an amplification process and a down-conversion process on each of signals received by the plurality of antenna elements 3a of the adaptive array 3, and outputs the signal having subjected to these processes to the control section 6.

The control section 6 outputs a transmission weight and a downlink sub-frame to the transmission section 4, as a result of an operation which will be described later. Based on the transmission weight supplied from the control section 6, the transmission section 4 transmits the downlink sub-frame supplied from the control section 6, through the adaptive array 3. This operation will be described later.

FIG. 2 is a diagram showing a configuration of the control section 6 included in the base station 1 according to this embodiment. FIG. 3 is a flowchart showing an operation of the control section 6 included in the base station 1. As shown in FIG. 2, the control section 6 includes a weight calculation section 10, a demodulation section 11, a HARQ sub-burst transmission determination section 12, a first arrangement section 13, a pilot signal generator 14, an estimation section 15, a determination section 16, a second arrangement section 17, a third arrangement section 18, a MAP generator 19, a frame generation section 20, and a comparison section 21.

Based on a sounding signal received by the reception section 5, the weight calculation section 10 calculates a reception weight and a transmission weight of each of the antenna elements 3a of the adaptive array 3 with respect to each of a plurality of sub-carriers (carrier waves) used for communication with the communication terminals 2. The sounding signal is contained in an uplink sub-frame used in the WiMAX.

Here, a frame 41 of this embodiment which is used in the WiMAX will be described with reference to FIG. 4. The frame 41 of this embodiment is composed of a downlink sub-frame 51 and an uplink sub-frame 71. The downlink sub-frame 51 is transmitted from the base station 1 to the communication terminal 2. The uplink sub-frame 71 is transmitted from the communication terminal 2 to the base station 1. Each of the downlink sub-frame 51 and the uplink sub-frame 71 is expressed in a two-dimensional manner based on a time axis represented by an OFDM symbol (unit time) and a frequency axis represented by a sub-channel. The sub-channel is composed of a plurality of sub-carriers. Hereinafter, a time-axis direction represented by the symbol and a frequency-axis direction represented by the sub-channel may be referred to as a symbol direction and a sub-channel direction, respectively.

In the uplink sub-frame 71, a ranging region 72, a CQICH region 73, an ACK region 74, a sounding zone 75, and at least one uplink burst region 76 are arranged. The ranging region 72 contains a signal for bandwidth requirements and ranging. The CQICH region 73 contains channel quality information. The ACK region 74 contains ACK (ACKnowledgement) or NACK (Negative ACKnowledgement). The ACK indicates that the communication terminal 2 does not request the base station 1 to transmit a HARQ, and the NACK indicates that the communication terminal 2 requests the base station 1 to transmit the HARQ. The sounding zone 75 contains the sounding signal used for the weight calculation section 10 of the base station 1 to calculate the weight of the adaptive array 3. Each uplink burst region 76 is allocated in the uplink sub-frame 71 by a UL-MAP message contained in a UL (UpLink)-MAP region 55 of the downlink sub-frame 51. Each uplink burst region 76 contains a data signal transmitted from at least one communication terminal 2 to the base station 1.

The UL-MAP message contained in the UL-MAP region 55 has an UL-MAP IE (Information Element; hereinafter, the same applies to IE). The UL-MAP IE is information for arranging the uplink burst region 76 in the uplink sub-frame 71. More specifically, the UL-MAP IE is information for identifying a burst position (a symbol position and a sub-channel position) and an allocation resource (the number of symbols and the number of sub-channels). Each of the communication terminals 2 analyzes the information in the UL-MAP region 55, and thereby can recognize at which time data addressed to the base station 1 should be transmitted and which of the sub-channels should be used for transmitting the data. The other regions of the downlink sub-frame 51 will be described later.

The weight calculation section 10 output s, in the reception weight and the transmission weight obtained by the calculation based on the sounding signal received by the reception section 5, the reception weight to the demodulation section 11, and the transmission weight to the transmission section 4. Subsequent operations of the transmission section 4 will be described later.

In step S1, the demodulation section 11 of FIG. 2 performs an FFT (Fast Fourier Transform) process on each of a plurality of baseband signals outputted from the reception section 5, to obtain a plurality of sub-carriers included in each of the plurality of baseband signals by separating them therefrom. The number of the baseband signals is identical to the number of the antenna elements 3a. For each set of the plurality of identical sub-carriers included in each of the plurality of baseband signals, the demodulation section 11 sets a corresponding reception weight, which has been obtained by the calculation in the weight calculation section 10, to each of the plurality of identical sub-carriers, and controls the phase and the amplitude of each sub-carrier. For each set of the plurality of identical sub-carriers included in each of the plurality of baseband signals, the demodulation section 11 combines the plurality of identical sub-carriers after the weight is set thereto. Thereby, a beam of the adaptive array 3 can be directed to a desired wave.

As a result of the demodulation in the demodulation section 11, the ACK or the NACK contained in the ACK region 74 received by the reception section 5 is obtained. In a case where the ACK is obtained as a result of the demodulation process in the demodulation section 11, the HARQ sub-burst transmission determination section 12 does not start an operation for transmitting a HARQ sub-burst to the communication terminal 2, and advances to step S12 which will be described later (step S2). In a case where the NACK is obtained in the weight calculation section 10, the HARQ sub-burst transmission determination section 12 determines to start the operation for transmitting the HARQ sub-burst.

In a case where the HARQ sub-burst transmission determination section 12 determines to start the HARQ sub-burst transmission operation, the first arrangement section 13 arranges the HARQ burst region 57, which is a predetermined region for the HARQ sub-burst, in the downlink sub-frame 51 transmitted from the transmission section 4 to the communication terminal 2 (step S3).

Here, referring to FIG. 4 again, the downlink sub-frame 51 constituting the frame 41 of this embodiment will be described. In the downlink sub-frame 51 transmitted from the base station 1 to the communication terminal 2, not only the above-mentioned UL-MAP region 55 but also a preamble region 52, an FCH region 53, a DL (DownLink)-MAP region 54, at least one downlink burst region 56, and a HARQ burst region 57 arranged by the first arrangement section 13 are arranged.

The preamble region 52 contains a signal for synchronizing the communication terminal 2 with the base station 1. The FCH region 53 contains a DLFP (DownLink Frame Prefix) and the like. The DLFP indicates the length of a DL-MAP region 54, a scheme of an error correction code used therein, and the number of repetition of a repetition code used therein. Each downlink burst region 56 is allocated in the downlink sub-frame 51 by a DL-MAP message contained in the DL-MAP region 54. Each downlink burst region 56 contains a data signal transmitted to one communication terminal.

The DL-MAP message contained in the DL-MAP region 54 has a DL-MAP IE, a HARQ DL-MAP IE, and a HAQR sub-burst IE. The DL-MAP IE is information for arranging the downlink burst region 56 in the downlink sub-frame 51 with respect to each communication terminal 2. More specifically, the DL-MAP IE is information for identifying a burst position and an allocation resource for each downlink burst region 56. The HARQ DL-MAP IE is information for arranging the HARQ burst region 57 in the downlink sub-frame 51. More specifically, the HARQ DL-MAP IE is information for identifying a burst position and an allocation resource for the HARQ burst region 57.

The HARQ sub-burst IE is information for arranging a HARQ sub-burst region 58 in the HARQ burst region 57. The HARQ sub-burst region 58 includes a plurality of slots 59. The slot 59 is a unit region including one sub-channel on the frequency axis and one symbol on the time axis, or a unit region including one sub-channel on the frequency axis and a plurality of symbols on the time axis. The size of one HARQ sub-burst region 58 is determined in accordance with the data amount of the HARQ sub-burst contained in the HARQ sub-burst region 58. Therefore, the number of slots 59 included in one HARQ sub-burst region 58 is determined in accordance with the data amount of the HARQ sub-burst contained in the HARQ sub-burst region 58. Since one HARQ sub-burst region 58 is allocated to one communication terminal 2, the number of HARQ sub-bursts IE contained in the DL-MAP region 54 is equal to the number of communication terminals 2. Each of the communication terminals 2 analyzes the information in the DL-MAP region, and thereby can recognize in which time slot the data addressed to itself is transmitted from the base station 1 and which sub-channel is used for the transmission.

In the above, the operations of the demodulation section 11, the HARQ sub-burst transmission determination section 12, and the first arrangement section 13 have been described. After a pilot signal included in the signals received by the reception section 5 is obtained as a result of the demodulation in the demodulation section 11 of FIG. 2, the comparison section 21 compares the pilot signal with a known pilot signal generated by the pilot signal generator 14. Based on a result of the comparison in the comparison section 21, the estimation section 15 estimates a frequency selective fading of the pilot signal included in the signals received by the reception section 5.

Figure 5:
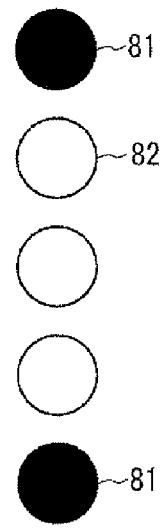
FIG. 5 is a diagram for explaining the operation of the control section according to the embodiment 1 of the present invention.

FIGS. 5 to 8 are diagrams showing an operation of the estimation section 15 of this embodiment estimating a frequency selective fading of a pilot signal 81 included in the signals received by the reception section 5. FIG. 5 shows signals received by the reception section, and one circle represents one sub-carrier. As shown in FIG. 5, in general, the pilot signal 81 is included in the signals received by the reception section 5, at the rate of one to a plurality of sub-carriers, for example, to four sub-carriers. In an example shown in FIG. 5, the three sub-carriers interposed between the pilot signals 81 contain data 82.

Figure 6:
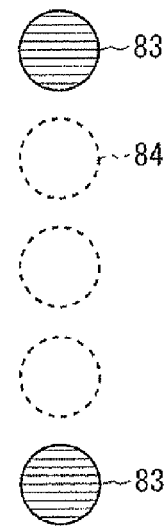
FIG. 6 is a diagram for explaining the operation of the control section according to the embodiment 1 of the present invention.

As described above, the pilot signal 81 received by the reception section 5 is compared with a known pilot signal 83 generated by the pilot signal generator 14. FIG. 6 is a diagram showing the known pilot signal 83 to be compared with the pilot signal 81. In an example shown in FIG. 6, the three sub-carriers interposed between the known pilot signals 83 contain null data 84.

Figure 7:
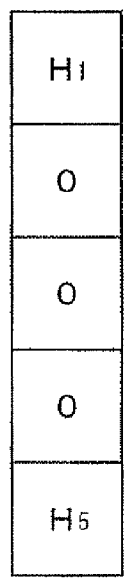
FIG. 7 is a diagram for explaining the operation of the control section according to the embodiment 1 of the present invention.

In this manner, the pilot signal 81 is included in the signals received by the reception section 5 at the rate of one to a plurality of sub-carriers. Therefore, the frequency selective fading estimated based on the pilot signal 81 is estimated at the rate of only one to the plurality of sub-carriers. For example, in a case where the pilot signal 81 is included in the signals received by the reception section 5 at the rate of one to four sub-carriers as shown in FIG. 5, the frequency selective fading is also estimated at the rate of one to four sub-carriers as shown in FIG. 7.

Figure 8:
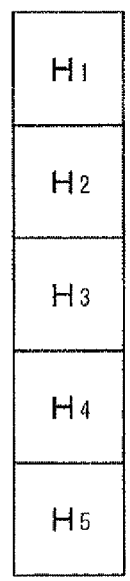
FIG. 8 is a diagram for explaining the operation of the control section according to the embodiment 1 of the present invention.

Then, the estimation section 15 of this embodiment performs a linear interpolation process on the frequency selective fadings estimated with respect to the previous two sub-carriers, thereby estimating a frequency selective fading between the two sub-carriers. For example, in a case where frequency selective fadings $H_1$ and $H_5$ have been previously estimated as shown in FIG. 7, frequency selective fadings $H_2$ to $H_4$ therebetween are also estimated as shown in FIG. 8.

Figure 9:
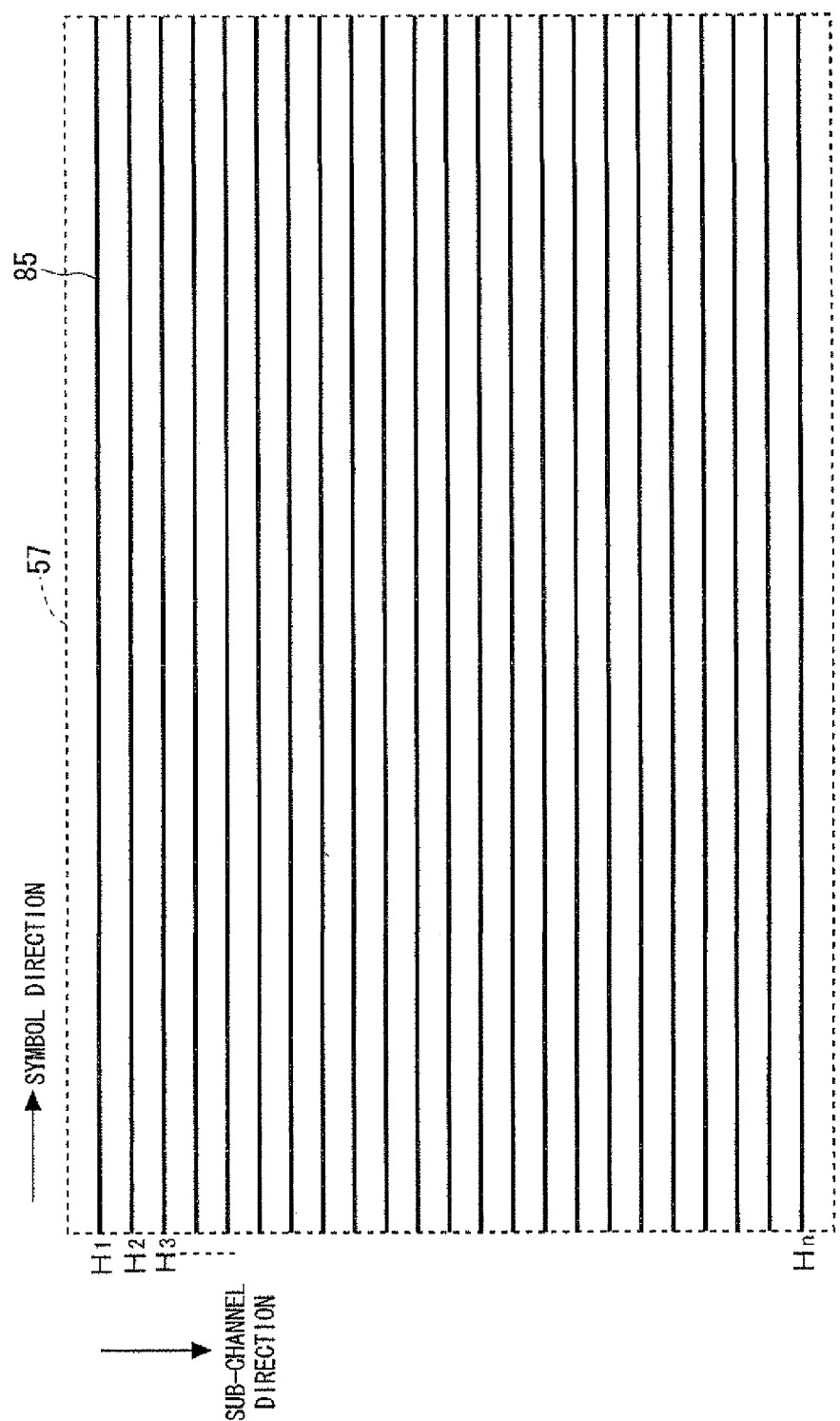
FIG. 9 is a diagram showing the operation of the control section according to the embodiment 1 of the present invention.

By using this method, the estimation section 15 of this embodiment estimates the communication qualities, that is, frequency selective fadings $H_n$, of all the sub-carriers in the HARQ burst region 57 arranged by the first arrangement section 13 (step S4). Here, n represents a natural number, and the frequency selective fading estimated by the estimation section 15 is indicated as $H_1, H_2, H_3, \ldots$ in the sub-channel direction. In FIG. 9, as illustrated with the solid lines, the frequency selective fading $H_n$ is estimated with respect to all the sub-carriers 85 in the HARQ burst region 57 arranged by the first arrangement section 13.

Figure 10:
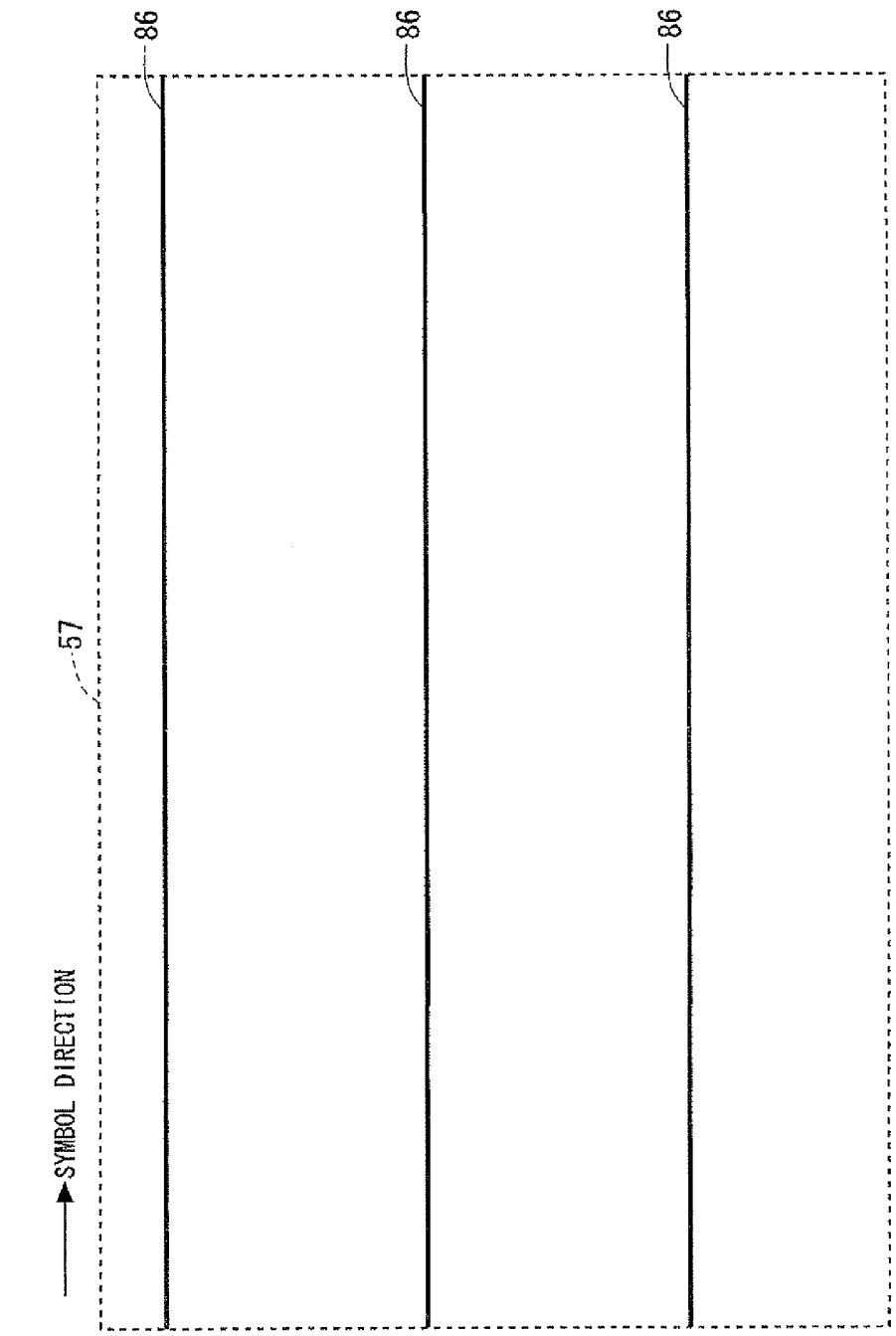
FIG. 10 is a diagram showing the operation of the control section according to the embodiment 1 of the present invention.

The determination section 16 determines whether or not the frequency selective fading $H_n$ estimated by the estimation section 15 satisfies predetermined criteria (step S5). In this embodiment, the determination section 16 determines whether or not the frequency selective fading $H_n$ estimated by the estimation section 15 is smaller than a predetermined value α, with respect to all the sub-carriers 85 in the HARQ burst region 57 arranged by the first arrangement section 13. The predetermined value a used for the determination is set by, for example, a user of the base station 1. As a result of the determination in the determination section 16, a sub-carrier (hereinafter also referred to as good sub-carrier) 86 corresponding to the frequency selective fading $H_n$ smaller than the predetermined value α is detected. In FIG. 10, among the plurality of sub-carriers 85 in the HARQ burst region 57, only the good sub-carriers 86 are illustrated with the solid lines.

Then, the estimation section 15 estimates the amount of phase rotation of the pilot signal 81 received by the reception section 5 (step S6). The estimation section 15 of this embodiment estimates the amount of phase rotation of, among the pilot signals 81 received by the reception section 5, the pilot signal 81 in the good sub-carrier 86 detected in step S5. As shown in FIG. 5, in general, the pilot signal 81 is included in the signals received by the reception section 5, at the rate of one to a plurality of sub-carriers. Accordingly, the pilot signal 81 is not always included in the good sub-carrier 86. Therefore, in a case where the pilot signal 81 is not included in the good sub-carrier 86, the estimation section 15 of this embodiment performs the linear interpolation process on the amounts of phase rotation of the pilot signals 81 included in the two sub-carriers closest to this good sub-carrier 86, in the same manner as shown in FIG. 8. Thereby, the estimation section 15 estimates the amount of phase rotation of this good sub-carrier 86.

After step S6, the second arrangement section 17 determines a position where, in the HARQ sub-burst region 58, a first HARQ sub-burst region 58a containing a first HARQ sub-burst exceeding a predetermined data amount X is to be arranged (step S7). In this embodiment, the second arrangement section 17 determines the arrangement position of the first HARQ sub-burst region 58a such that the first HARQ sub-burst region 58a can cover the good sub-carrier 86. An arrangement position of, in the HARQ sub-burst region 58, a second HARQ sub-burst region 58b containing a second HARQ sub-burst which is equal to or less than the predetermined data amount X is determined in step S9 which will be described later.

Figure 11:
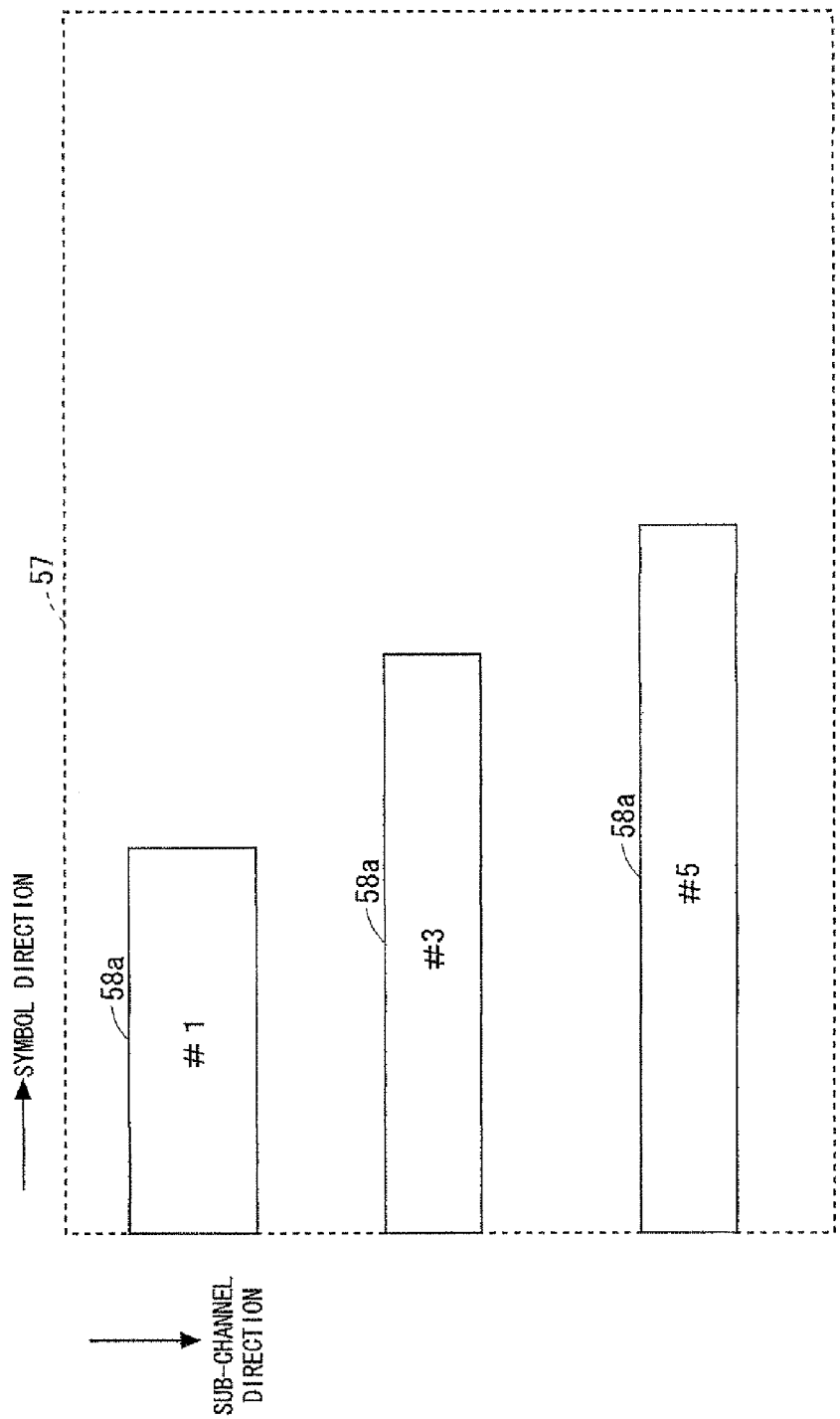
FIG. 11 is a diagram showing the operation of the control section according to the embodiment 1 of the present invention.

FIG. 11 is a diagram showing a state where the second arrangement section 17 arranges the first HARQ sub-burst region 58a in the good sub-carrier 86 in step S8 which will be described later. In FIG. 11, the first HARQ sub-bursts exceeding the predetermined data amount X are allocated to the communication terminals 2 of #1, 3, and 5.

After step S7, the second arrangement section 17 starts arranging at least one first HARQ sub-burst region 58a in the HARQ burst region 57 in accordance with the number of communication terminals 2 intended to receive the HARQ sub-burst (step S8). The second arrangement section 17 sequentially reserves a plurality of slots 59 for the HARQ sub-bursts in the HARQ burst region 57 of the downlink sub-frame 51, and thereby arranges the HARQ sub-burst region 58 in the HARQ burst region 57.

Here, prior to a description of procedures for the reservation of the slots by the second arrangement section 17 in this embodiment, slot reservation procedures (hereinafter called "comparative procedures") to be compared with the present invention will be described with reference to FIGS. 12 to 14.

Figure 12:
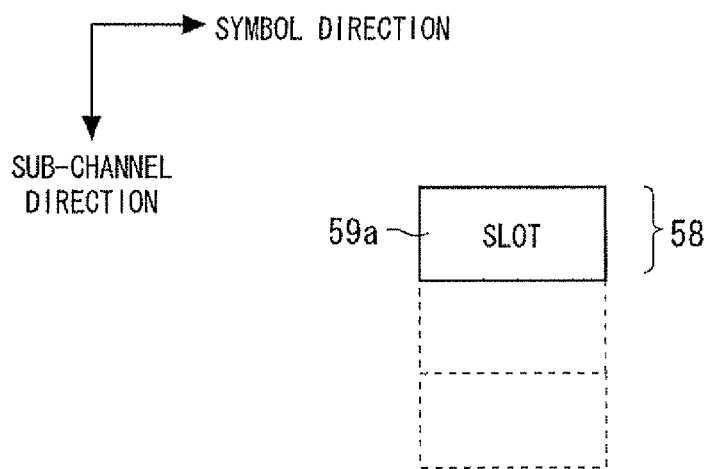
FIG. 12 is a diagram showing a slot-reserving operation to be compared with the present invention.
Figure 13:
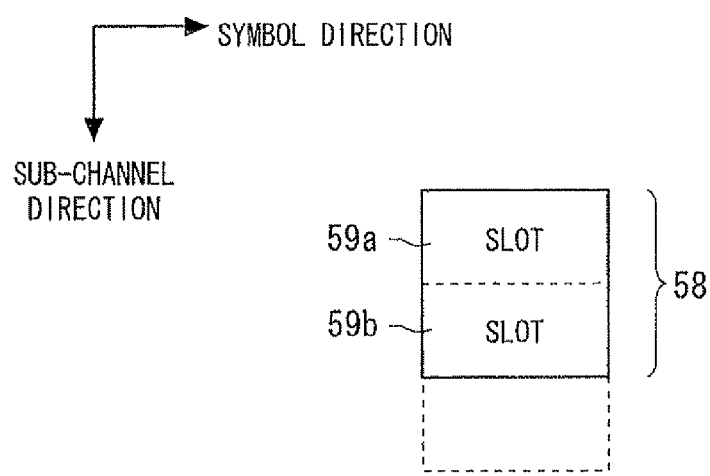
FIG. 13 is a diagram showing the slot-reserving operation to be compared with the present invention.
Figure 14:
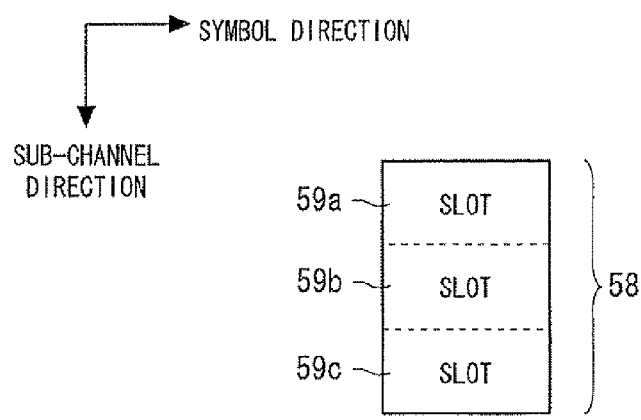
FIG. 14 is a diagram showing the slot-reserving operation to be compared with the present invention.

In the comparative procedures, the slots 59 are reserved in an order of FIGS. 12 to 14. In the following, the plurality of slots 59 reserved in the HARQ burst region 57 are, for the distinction therebetween, sometimes indicated as a first slot 59a, a second slot 59b, . . . along the order of reservation in the HARQ burst region 57.

As shown in FIGS. 12 and 13, in the comparative procedures, the first slot 59a which is first reserved and the second slot 59b which is next reserved are reserved along the sub-channel direction. The second slot 59b and a third slot 59c which is next reserved are normally reserved along the sub-channel direction, too, as shown in FIG. 14. Consequently, one HARQ sub-burst region 58 is arranged over a large number of sub-channels. Therefore, the magnitude of the frequency selective fading largely varies in one HARQ sub-burst region 58, which causes a problem that a process for the correction thereof is complicated.

The slot reservation procedures of the second arrangement section 17 of this embodiment to solve the problem will be described with reference to FIGS. 15 to 18. The slot reservation procedures for arranging the first HARQ sub-burst region 58a and the slot reservation procedures for arranging the second HARQ sub-burst region 58b are substantially identical to each other. Therefore, in the following, in a case where no distinction between the first HARQ sub-burst region 58a and the second HARQ sub-burst region 58b is required, the slot reservation procedures will be described by using the "HARQ sub-burst region 58".

Figure 15:
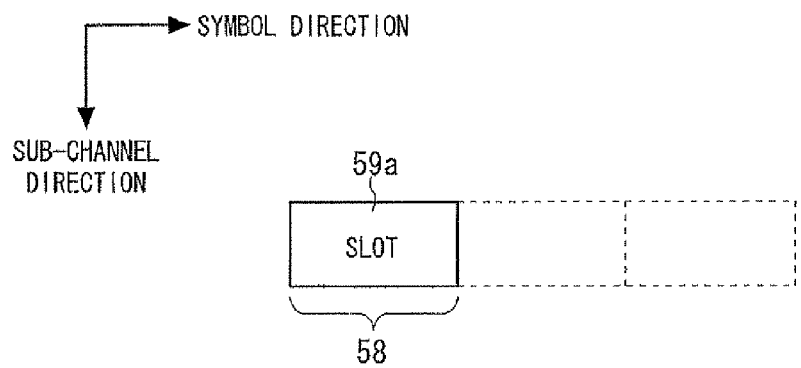
FIG. 15 is a diagram showing the slot-reserving operation according to the embodiment 1 of the present invention.

The second arrangement section 17 of this embodiment reserves the slots 59 in an order of FIGS. 15 to 18. As shown in FIGS. 15 and 16, the second arrangement section 17 reserves the slots 59 along the symbol direction, at least with respect to the first slot 59a and the second slot 59b which are reserved in the HARQ burst region 57. This can prevent the HARQ sub-burst region 58 from being arranged over a plurality of sub-channels. The second arrangement section 17 of this embodiment arranges the first HARQ sub-burst region 58a in the HARQ burst region 57 such that the first slot 59a included in the first HARQ sub-burst region 58a can cover the good sub-carrier 86 detected in FIG. 7.

Figure 19:
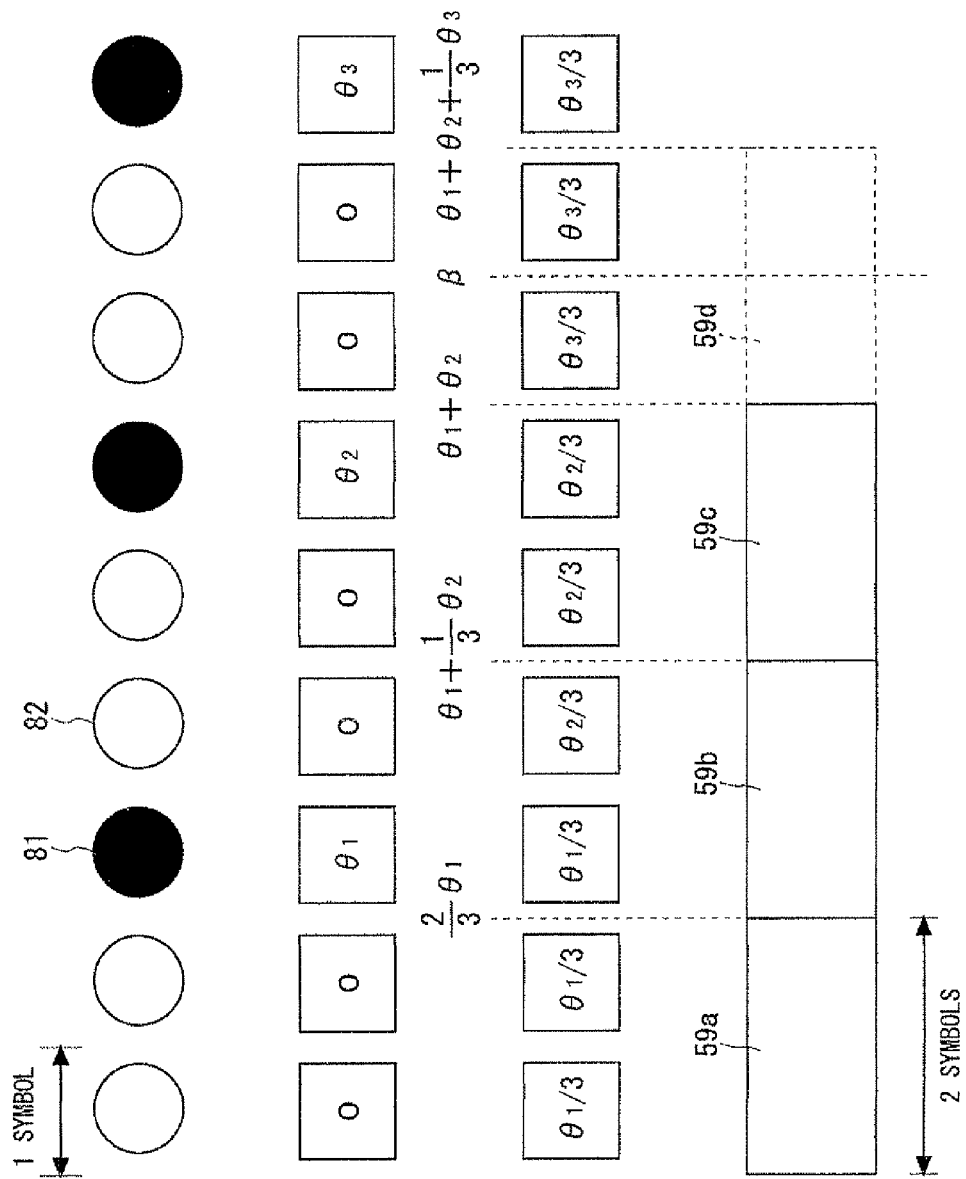
FIG. 19 is a diagram showing the operation of the control section according to the embodiment 1 of the present invention.

Next, an operation of the second arrangement section 17 of this embodiment reserving the third and subsequent slots 59 will be described with reference to FIG. 19. The second arrangement section 17 reserves a first row of slots along the symbol direction until the amount of phase rotation in all symbols included in all slots reserved in the symbol direction starting from the firstly-reserved first slot 59a reaches a value closest to and less than a predetermined threshold value β. Here, the first row of slots means a plurality of slots 59 reserved along the symbol direction starting from the first slot 59a.

To perform this operation, in step S6, the second arrangement section 17 uses the amount of phase rotation estimated by the estimation section 15. Here, as shown in the uppermost part of FIG. 19, in general, the pilot signal 81 is included in the signals received by the reception section 5, at the rate of only one to a plurality of symbols (hereinafter indicated as L symbols, where L represents a natural number equal to or more than 2). FIG. 19 shows the signals received by the reception section 5 in a case of L=3. Since the pilot signal 81 is included in the signals received by the reception section 5 at the rate of one to the L symbols, the estimation section 15 estimates a total amount of phase rotation θ of the L symbols. For example, in a case of L=3, the estimation section 15 estimates, for each set of three symbols, a total amount of phase rotation θ of the three symbols, in a manner shown in the second uppermost part of FIG. 19. In the following, the amount of phase rotation θ estimated in this manner is indicated as $\theta_1, \theta_2, \theta_3, \ldots$ along the symbol direction.

Then, the second arrangement section 17 calculates the amount of phase rotation per one symbol. In this embodiment, as the amount of phase rotation per one symbol, a value obtained by dividing the amount of phase rotation corresponding to L symbols including the one symbol by L, namely, the value $\theta_1/L, \theta_2/L, \theta_3/L, \ldots$, is calculated. For example, as shown in the third uppermost part of FIG. 19, the value $\theta_1/3$ is calculated as the amount of phase rotation per one symbol of the first three symbols, and the value $\theta_2/3$ is calculated as the amount of phase rotation per one symbol of the next three symbols.

Then, each time the slot 59 is reserved, the second arrangement section 17 determines whether or not a total amount of phase rotation of all the symbols included in all the slots 59 reserved so far along the symbol direction exceeds the predetermined threshold value β.

In FIG. 16, the second slot 59b is reserved along the symbol direction starting from the firstly-reserved first slot 59a. In this state, the second arrangement section 17 determines whether or not a total amount of phase rotation of the symbols included in the two slots 59a and 59b reserved so far along the symbol direction starting from the firstly-reserved first slot 59a and included in the third slot 59c attempted to be newly reserved adjacent to the two slots 59a and 59b in the symbol direction exceeds the predetermined threshold value β. For example, as shown in the lowermost part of FIG. 19, in a case where the number of symbols included in one slot is two, the number of symbols included in three slots is six. As the amount of phase rotation of these six symbols, the second arrangement section 17 uses the sum of the amounts of phase rotation per one symbol of the six symbols, namely, a value of $\theta_1/3+\theta_1/3+\theta_1/3+\theta_2/3+\theta_2/3+\theta_2/3=\theta_1+\theta_2$.

The second arrangement section 17 determines whether or not the total amount of phase rotation of the six symbols, namely, the value $\theta_1+\theta_2$, exceeds the predetermined threshold value β. In a case of FIG. 19, the value $\theta_1+\theta_2$ does not exceed the predetermined threshold value β. In this case, the second arrangement section 17 reserves the third slot 59c so as to be adjacent to the second slot 59b in the symbol direction.

Then, the second arrangement section 17 determines whether or not a total amount of phase rotation of symbols included in the three slots 59a, 59b, and 59c reserved so far along the symbol direction starting from the firstly-reserved first slot 59a and included in a fourth slot 59d attempted to be newly reserved adjacent to the three slots 59a, 59b, and 59c in the symbol direction exceeds the predetermined threshold value β. For example, in a case where the number of symbols included in one slot is two, the number of symbols included in three slots is eight. As the amount of phase rotation of these eight symbols, the second arrangement section 17 uses the sum of the amounts of phase rotation per one symbol of the eight symbols, namely, a value of $\theta_1/3+\theta_1/3+\theta_1/3+\theta_2/3+\theta_2/3+\theta_2/3+\theta_3/3+\theta_3/3=\theta_1+\theta_2+2\cdot\theta_3/3$.

The second arrangement section 17 determines whether or not the total amount of phase rotation of the eight symbols, namely, the value $\theta_1+\theta_2+2\cdot\theta_3/3$, exceeds the predetermined threshold value β. In a case of FIG. 19, the value $\theta_1+\theta_2+2\cdot\theta_3/3$ exceeds the predetermined threshold value β. In this case, as shown in FIG. 18, the second arrangement section 17 newly reserves the fourth slot 59d in a sub-channel adjacent to the sub-channel included in the three slots 59a to 59c, in the same symbols as those of the above-mentioned six symbols. In this embodiment, as shown in FIG. 18, the second arrangement section 17 reserves the fourth slot 59d so as to be adjacent to the first slot 59a in the sub-channel direction.

Thus, the second arrangement section 17 of this embodiment reserves the first row of slots along the symbol direction until the amount of phase rotation of all the symbols included in all the slots reserved along the symbol direction starting from the firstly-reserved first slot 59a reaches a value closest to and less than the predetermined threshold value β. The second arrangement section 17 of this embodiment reserves a fifth slot to the right of the fourth slot 59d so as to be adjacent to the fourth slot 59d in the symbol direction, and reserves a sixth slot to the right of the fifth slot so as to be adjacent to the fifth slot in the symbol direction, though not shown. Thereby, the second arrangement section 17 of this embodiment inevitably arranges the HARQ sub-burst region 58 having a rectangular shape.

To reserve the second and subsequent rows of slots, the second arrangement section 17 of this embodiment sequentially reserves slots in the same symbols as all the symbols included in all the slots of the first row. As a result, the second arrangement section 17 arranges the first HARQ sub-burst region 58a having a rectangular shape in the HARQ burst region 57, as shown in FIG. 11.

The second arrangement section 17 of this embodiment arranges the first HARQ sub-burst region 58a in the HARQ burst region 57 such that the first slot 59a of the first HARQ sub-burst region 58a can cover the good sub-carrier 86. Therefore, as shown in FIG. 11, the first row of slots included in the first HARQ sub-burst region 58a arranged by the second arrangement section 17 cover the good sub-carrier 86.

After step S8, the second arrangement section 17 determines an arrangement position of, in the HARQ sub-burst region 58, the second HARQ sub-burst region 58b containing the second HARQ sub-burst which is equal to or less than the predetermined data amount (step S9). Similarly to step S8, the second arrangement section 17 starts arranging at least one second HARQ sub-burst region 58b in the HARQ burst region 57 in accordance with the number of communication terminals 2 intended to receive the HARQ sub-burst (step S10).

Figure 20:
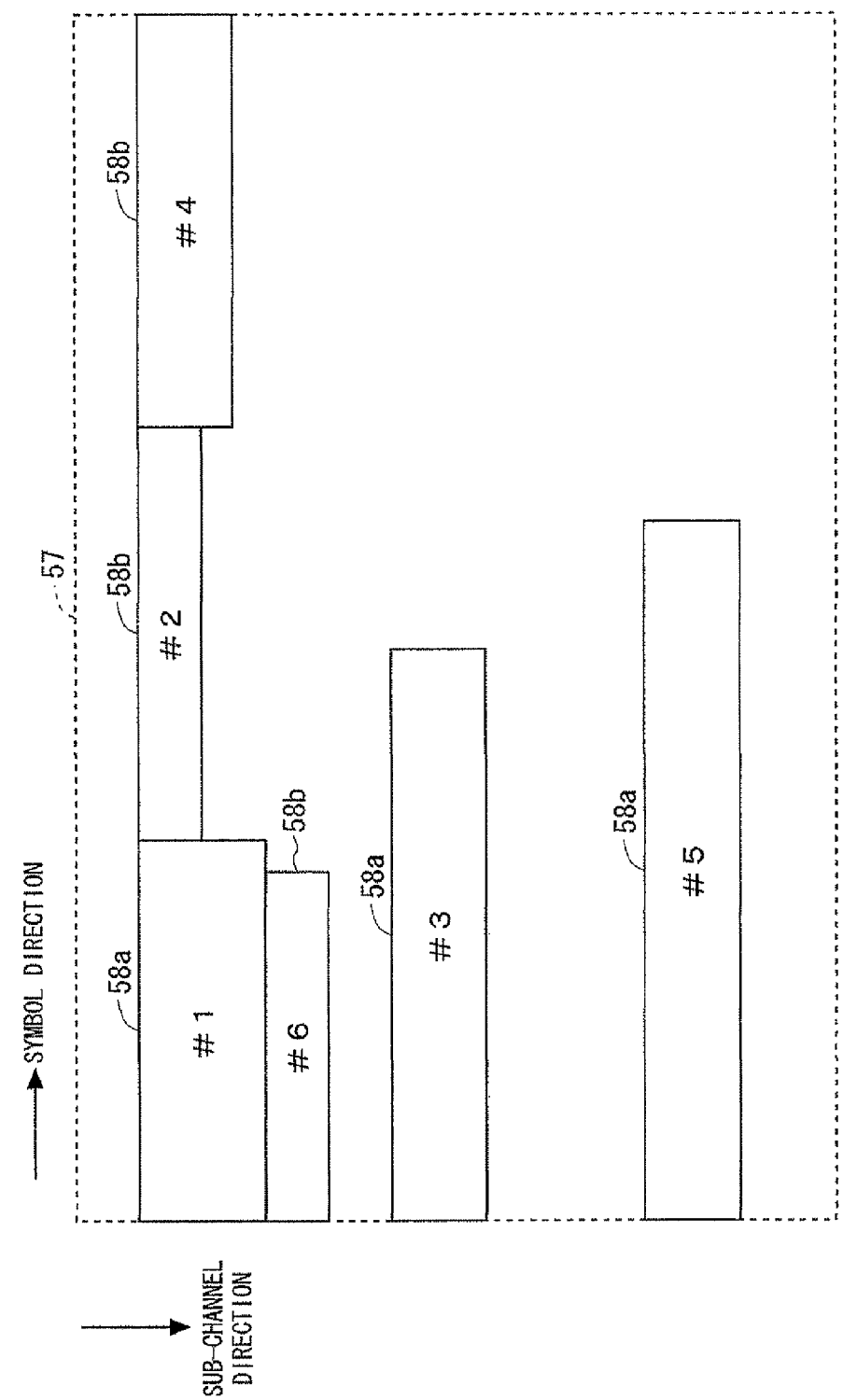
FIG. 20 is a diagram showing the operation of the control section according to the embodiment 1 of the present invention.

FIG. 20 is a diagram showing a situation where the second arrangement section 17 arranges the second HARQ sub-burst region 58b in the HARQ burst region 57 of FIG. 11 in step S10. Here, the second HARQ sub-bursts equal to or less than the predetermined data amount X are allocated to the communication terminals 2 of #2, 4, and 6.

In FIG. 20, the second arrangement section 17 arranges the second HARQ sub-burst region 58b allocated to the communication terminal 2 of #2 in the HARQ burst region 57 so as to be adjacent in the symbol direction to the first HARQ sub-burst region 58a allocated to the communication terminal 2 of #1. The second arrangement section 17 arranges the second HARQ sub-burst region 58b allocated to the communication terminal 2 of #4 in the HARQ burst region 57 so as to cover the good sub-carrier 86 included in the first HARQ sub-burst region 58a allocated to the communication terminal 2 of #1. The second arrangement section 17 arranges the second HARQ sub-burst region 58b allocated to the communication terminal 2 of #6 in the HARQ burst region 57 so as to adjacent in the sub-channel direction to the first HARQ sub-burst region 58a allocated to the communication terminal 2 of #1.

After the HARQ sub-burst regions 58 corresponding to all the communication terminals 2 are arranged in the HARQ burst region 57 through steps S7 to S10, the third arrangement section 18 arranges the downlink burst regions 56 in the downlink sub-frame 51, and determines the uplink burst regions 76 in the uplink sub-frame 71 (step S11). In a case where it is determined in step S2 that the ACK is obtained in the HARQ sub-burst transmission determination section 12, the third arrangement section 18 similarly arranges the downlink burst region 56 in the downlink sub-frame 51, and determines the uplink burst regions 76 in the uplink sub-frame 71.

After step S11, the MAP generator 19 generates the HARQ DL-MAP IE based on the arrangement of the HARQ burst region 57 in the downlink sub-frame 51 (step S12). Although information for identifying the HARQ burst region 57 arranged by the first arrangement section 13 is inputted from the first arrangement section 13 to the MAP generator 19, the information is not shown in FIG. 2.

The MAP generator 19 generates the HARQ sub-burst IE based on the arrangement of the HARQ sub-burst regions 58 in the HARQ burst region 57. The MAP generator 19 generates the DL-MAP IE based on the arrangement of the downlink burst regions 56 in the downlink sub-frame 51. In this manner, the MAP generator 19 generates the DL-MAP message including the DL-MAP IE, the HARQ DL-MAP IE, and the HAQR sub-burst IE.

The MAP generator 19 generates the UL-MAP IE based on the determination of the uplink burst regions 76 in the uplink sub-frame 71. In this manner the MAP generator 19 generates the UL-MAP message including the UL-MAP IE.

After step S12, the frame generation section 20 puts the HARQ sub-burst into the HARQ sub-burst region 58, and puts data to be transmitted to the communication terminal 2 into each of the downlink burst regions 56, thereby generating the downlink sub-frame 51 (step S13).

Through the above, the operation of the control section 6 included in the base station 1 is completed. As a result of the operation of the control section 6, as shown in FIG. 2, the transmission weight calculated by the weight calculation section 10 and the downlink sub-frame 51 generated by the frame generation section 20 are outputted to the transmission section 4. For each set of the plurality of identical sub-carriers included in a plurality of sub-carrier groups, the transmission section 4 sets a corresponding transmission weight, which has been calculated by the weight calculation section 10, to each of the plurality of identical sub-carriers. Then, for each of the plurality of sub-carrier groups, the transmission section 4 combines the plurality of sub-carriers included in the sub-carrier group after the weight is set thereto, to thereby generate baseband signals. Then, the transmission section 4 performs an up-conversion process and an amplification process on the plurality of baseband signals thus generated, and then inputs resultant signals to the plurality of antenna elements 3a.

In this manner, the transmission section 4 transmits the downlink sub-frame 51 generated by the frame generation section 20 from the adaptive array 3, based on the transmission weight calculated by the weight calculation section 10. Thereby, a radio signal is transmitted from the adaptive array 3 to the communication terminal 2 to be communicated with.

In the above-described base station 1, to arrange the HARQ sub-burst region 58 in the HARQ burst region 57, the reservation of at least the first slot 59a and the second slot 59b is performed along the symbol direction. This can prevent the HARQ sub-burst region 58 from being arranged over a plurality of sub-channels. As a result, the process for the correction of the frequency selective fading can be simplified.

In general, as the amount of movement of the communication terminal 2 increases, the amount of phase rotation also increases. Thus, in a case where the amount of phase rotation increases, the beam of the adaptive array 3 cannot accurately be directed to the position of the communication terminal 2 positioned at a timing when the base station 1 attempts the transmission. However, in the base station 1 according to this embodiment, the first row of slots 59 are reserved along the symbol direction until the amount of phase rotation of all the symbols included in all the slots 59 reserved so far along the symbol direction starting from the firstly-reserved first slot 59a reaches a value closest to and less than the predetermined threshold value β. Therefore, the beam of the adaptive array 3 can be accurately directed to the communication terminal 2. This consequently ensure the transmission of the HARQ sub-burst to the communication terminal 2.

In the base station 1 according to this embodiment, the second row of slots are reserved in a sub-channel adjacent to the sub-channel included in the first row of slots, in the same symbols as those included in the first row of slots. In general, the amount of phase rotation corresponding to a certain sub-channel and the amount of phase rotation corresponding to a sub-channel adjacent to the certain sub-channel are not largely different from each other. Therefore, by reserving the second row of slots in the above-described manner, the communication terminal 2 can receive the second row of slots similarly to the first row of slots, without detecting the amount of phase rotation in the second row of slots or comparing the total amount of phase rotation with the predetermined threshold value β.

In general, in a case where data having a large data amount is arranged in a sub-carrier largely influenced by the frequency selective fading, an erroneous data amount is increased as compared with data having a small data amount. However, in the base station 1 according to this embodiment, the first HARQ sub-burst region 58a containing the first HARQ sub-burst that exceeds the predetermined data amount X is arranged in the good sub-carrier 86 whose frequency selective fading has been determined to be smaller than the predetermined α. This can reduce the erroneous data amount of the first HARQ sub-burst having a large data amount which may otherwise tend to cause a large erroneous data amount.

In the base station 1 according to this embodiment, the second HARQ sub-burst region 58b containing the second HARQ sub-burst that is equal to or less than the predetermined data amount X is arranged in the HARQ burst region 57 so as to cover the good sub-carrier 86. This can reduce an erroneous data amount of the second HARQ sub-burst having a small data amount which tends to cause a small erroneous data amount, too.

In the base station 1 according to this embodiment, the second HARQ sub-burst region 58b containing the second HARQ sub-burst that is equal to or less than the predetermined data amount X is arranged in the HARQ burst region 57 so as to be adjacent to at least the first HARQ sub-burst region 58a. As a result, the second HARQ sub-burst having a small data amount is arranged in the HARQ burst region 57 so as to cover the good sub-carrier 86, or arranged in a sub-carrier having a frequency selective fading similar to the frequency selective fading of the good sub-carrier 86. Thus, the erroneous data amount of the second HARQ sub-burst having a small data amount can also be reduced to a certain extent.

In this embodiment, as shown in FIG. 18, the second arrangement section 17 reserves the fourth slot 59 so as to be adjacent to the first slot 59, and reserves the fifth slot 59 and the sixth slot 59 to the right of the fourth slot 59 along the symbol direction. However, this is not limitative. It may also acceptable that the second arrangement section 17 reserves the fourth slot 59 so as to be adjacent to the third slot 59 and reserves the fifth slot 59 and the sixth slot 59 to the left of the fourth slot 59 along the symbol direction, to thereby reserve the second row of slots 59.

In the above description, the second arrangement section 17 arranges the first HARQ sub-burst region 58 in the HARQ burst region 57 such that the first row of slots 59 of the HARQ sub-burst region 58 can cover the good sub-carrier 86. However, this is not limitative, and the second arrangement section 17 may arrange the first HARQ sub-burst region 58 in the HARQ burst region 57 such that the slots 59 other than the first row of slots 59 can cover the good sub-carrier 86.

In the above description, the first arrangement section 13 arranges, in one downlink sub-frame 51, the HARQ burst region 57 in which the HARQ sub-burst region 58 is arranged by using the slot reservation procedures according to FIGS. 15 to 18. However, this is not limitative, and the first arrangement section 13 may arrange the HARQ burst region 57 in which the HARQ sub-burst region 58 is arranged by using the slot reservation procedures of this embodiment shown in FIGS. 15 to 18, and arrange the HARQ burst region 57 in which the HARQ sub-burst region 58 is arranged by using the comparative procedures shown in FIGS. 12 to 14, such that they can coexist in one downlink sub-frame 51.

Embodiment 2

Figure 22:
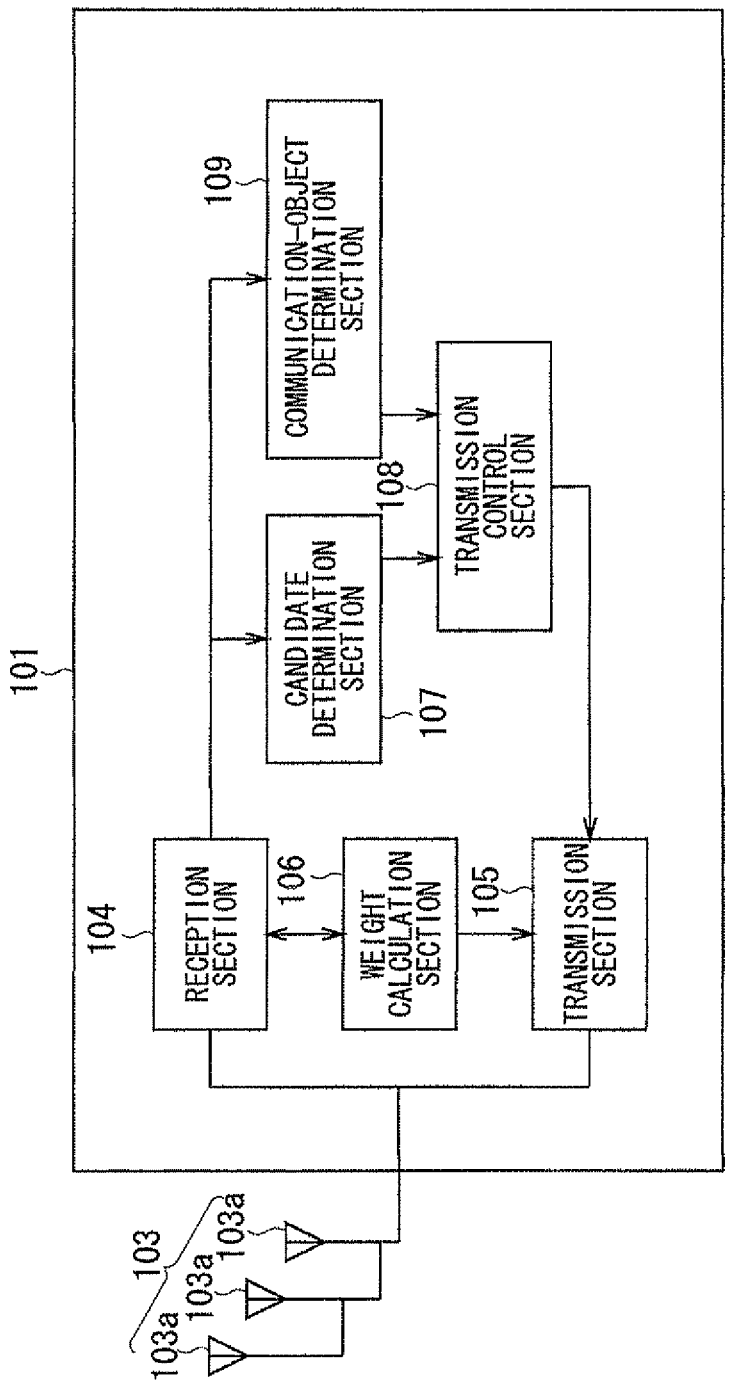
FIG. 22 is a block diagram showing a configuration of a base station according to the embodiment 2 of the present invention.

FIG. 21 is a diagram showing a configuration of a wireless communication system according to an embodiment 2 of the present invention. The wireless communication system includes a base station 101 and a plurality of communication terminals 102. The base station 101 of this embodiment is a base station according to the mobile WiMAX defined in IEEE 802.16e. FIG. 22 is a block diagram showing a configuration of the base station 101. As shown in FIG. 22, the base station 101 includes an array antenna 103, a reception section 104, a transmission section 105, a weight calculation section 106, a candidate determination section 107, a transmission control section 108, and a communication-object determination section 109.

The reception section 104 and the transmission section 105 share the array antenna 103 having a plurality of antenna elements 103a. The reception section 104 receives signals from the plurality of communication terminals 102 via the array antenna 103. The reception section 104 performs an amplification process and a down-conversion process on each of the signals received by the plurality of antenna elements 103a of the array antenna 103, and converts the signals received by the plurality of antenna elements 103a into baseband signals.

The reception section 104 sets a weight (weights) to each of the plurality of baseband signals, and controls the phase and the amplitude of each baseband signal. The reception section 104 combines the plurality of baseband signals to one another after the weights are set thereto. Thereby, a beam of the array antenna 103 can be directed to a desired wave, so that an interference wave can be removed. The reception section 104 performs a demodulation process, and the like, on a signal (hereinafter referred to as a "combined baseband signal") obtained as a result of combination of the baseband signals after the weights are set thereto, and reproduces various data from each communication terminal 102.

Based on sounding signals received by the reception section 104 which are known signals from the plurality of communication terminals 102, the weight calculation section 106 calculates a reception weight and a transmission weight to be applied to the array antenna 103 with respect to each of the plurality of communication terminals 102. Here, since the sounding signal is a known signal, the weight calculation section 106 recognizes what kind of signal the sounding signal transmitted from the communication terminal 102 is.

The weight calculation section 106 calculates the reception weight such that the reception section 104 can perform the demodulation process on the combined baseband signal to appropriately reproduce the sounding signal supplied from the communication terminal 102. The reception section 104 sets the calculated reception weight to each of the plurality of baseband signals obtained as a result of the conversion in the reception section 104. The weight calculation section 106 calculates the transmission weight based on the calculated reception weight.

The transmission section 105 is controlled by the transmission control section 108 to generate serial transmission data. Then, the transmission section 105 converts the serial transmission data into parallel transmission data, and modulates a plurality of sub-carriers used for the transmission by the parallel transmission data. The transmission section 105 combines the plurality of modulated sub-carriers to one another, to generate a baseband signal. The number of the baseband signals provided is equal to the number of antenna elements 103a. The transmission section 105 sets the transmission weight calculated by the weight calculation section 106, to the generated baseband signal. Then, the transmission section 105 performs an up-conversion and amplification process on the plurality of baseband signals, and then inputs them to the plurality of antenna elements 103a, respectively. In this manner, the transmission section 105 transmits signals via the array antenna 103 to the plurality of communication terminals 102 having transmitted the sounding signals, based on the transmission weight calculated by the weight calculation section 106.

A frame used in the WiMAX is composed of a downlink sub-frame and an uplink sub-frame. The downlink sub-frame is transmitted from the base station 101 to the communication terminal 102. The uplink sub-frame is transmitted from the communication terminal 102 to the base station 101. An FF (FastFeedback) region is arranged in the uplink sub-frame. The communication terminal 102 transmits a CINR (Carrier-to-Interference-plus-Noise Ratio) by using a CQICH (Channel Quality Information CHannel) arranged in the FF region. The CINR represents the quality of communication between the base station 101 and each communication terminal 102. As the value thereof is larger, a better communication quality is represented. The CINR is measured in each communication terminal 102, and contained in the uplink sub-frame transmitted from each communication terminal 102 to the base station 101.

The candidate determination section 107 determines a communication-object candidate from communication terminals 102 capable of communication, that is, determines m communication terminals 102 (m>1). Hereinafter, the m communication terminals 102 determine d by the candidate determination section 107 are sometimes indicated as a "candidate terminal group". With respect to each of the communication terminals 102, the candidate determination section 107 of this embodiment computes a value (hereinafter sometimes indicated as an "evaluation value") obtained by dividing the CINR included in one frame received by the reception section 104 by the average value of the CINRs included in a plurality of previous frames. In one communication terminal 102, the evaluation value increases when the CINR (communication quality) in a certain frame is better than the average. It can be considered that the frequency of increase of the evaluation value is constant in both of a communication terminal 102 having a good average CINR and a communication terminal 102 having a bad average CINR. That is, the frequency of increase of the evaluation value is equal in all the communication terminals 102.

The candidate determination section 107 selects m communication terminals 102 from all the communication terminals 102 capable of communication with the base station 101, sequentially from the communication terminal 102 having the greatest evaluation value. As a result, in the long term, each of all the communication terminals 102 capable of communication with the base station 101 is selected with equal opportunities at a time when the communication quality thereof becomes better than the average. The candidate determination section 107 determines the m selected communication terminals 102, as the candidate terminal group. In this manner, the candidate determination section 107 determines the candidate terminal group (m communication terminals 102) based on the evaluation value, thereby performing the Proportional Fairness.

In the WiMAX, the UL (UpLink)-MAP region and the DL (DownLink)-MAP region are arranged in the downlink sub-frame transmitted from the base station 101 to the communication terminal 102. The UL-MAP region contains the UL-MAP message. The UL-MAP message includes, for example, information for identifying regions such as the sounding region and the uplink burst region arranged in the uplink sub-frame, information for identifying in which region each communication terminal 102 is allocated, and control information for causing each of the communication terminals 102 in the candidate terminal group determined by the candidate determination section 107 to transmit the sounding signal. The DL-MAP region contains the DL-MAP message. The DL-MAP message includes, for example, information for identifying regions such as the downlink burst region in the downlink sub-frame, and information for identifying in which region each communication terminal 102 is allocated.

The transmission control section 108 causes the transmission section 105 to transmit the above-described UL-MAP message. Thereby, the control information for causing the candidate terminal group determined by the candidate determination section 107 to transmit the sounding signal is transmitted from the transmission section 105 to the candidate terminal group. When each communication terminal 102 in the candidate terminal group receives the downlink sub-frame including the control information from the base station 101, the communication terminal 102 transmits a sounding signal through a sub-channel specified for itself by the control information. The sub-channel is composed of a plurality of particular sub-carriers.

The sub-carriers for the sounding signals, the number of which is fixed, are allocated to the plurality of communication terminals 102. Accordingly, when the number of communication terminals 102 to which the sounding signals should be transmitted in one frame increases, the number of sub-carriers for the sounding signals which are allocated to one communication terminal 102 decreases. Such a decrease in the number of sub-carriers (information) for the sounding signals deteriorates a weight accuracy obtained from the information. Therefore, in general, to ensure the weight accuracy, the upper limit of the number of communication terminals 102 to which the sounding signals should be transmitted in one frame is set to be an appropriate value X1, based on the system performance. In this embodiment, the number of communication terminals 102 caused to transmit the sounding signals in a certain frame, in other words, the number m of the communication terminals 102 determined by the candidate determination section 107 described above, is set equal to or less than the appropriate value X1 which has been set based on the system performance.

The communication-object determination section 109 determines l (1≤l<m) communication terminals 102 from the candidate terminal group, based on the quality of communication (CINR) between the base station 101 and the candidate terminal group obtained after the candidate determination section 107 determines the candidate terminal group. The communication-object determination section 109 of this embodiment calculates, with respect to each communication terminal 102, a value obtained by dividing the CINR in one frame received by the reception section 104 after the candidate determination section 107 determines the candidate terminal group by the average value of the CINRs in the plurality of previous frames. The value calculated by the communication-object determination section 109 and the evaluation value calculated by the candidate determination section 7 are different from each other in that the CINR used in the calculation in the communication-object determination section 109 is received by the reception section 104 after the candidate determination section 107 determines the candidate terminal group. In other words, the communication-object determination section 109 uses the CINR newly received by the reception section 104, to calculate the evaluation value. Therefore, in the following, the evaluation value calculated by the communication-object determination section 109 is sometimes referred to as a "new evaluation value".

The communication-object determination section 109 selects l communication terminals 102 from the candidate terminal group (m communication terminals 102), sequentially from the one having the greatest new evaluation value. The number l is less than the number m. As a result, in the long term, each of all the communication terminals 102 in the candidate terminal group is selected with equal opportunities at a time when the communication quality thereof becomes better than the average. The communication-object determination section 109 of this embodiment determines the selected l communication terminals 102 to be the communication objects. In this manner, the communication-object determination section 109 of this embodiment determines the l communication terminals 102 based on the new evaluation values, thereby performing the Proportional Fairness.

At least one downlink burst region is arranged in the downlink sub-frame transmitted from the base station 101 to the communication terminal 102. The downlink burst region is a region identified by the DL-MAP message, and each downlink burst region contains data to be transmitted to at least one communication terminal 102. The transmission control section 108 generates the DL-MAP message such that each of the l communication terminals 102 can be allocated to the downlink burst region arranged in the downlink sub-frame. With respect to each of the l communication terminals 102 determined by the communication-object determination section 109, the transmission control section 108 causes the transmission section 105 to transmit the data based on the weight calculated by the weight calculation section 106.

As the number of communication terminals 102 to which data should be transmitted in one frame is increased, the UL-MAP region becomes larger in the frame, to consequently reduce the region where the downlink burst region can be arranged. Accordingly, as the number of communication terminals 102 to which data should be transmitted is increased, a data amount transmitted from the base station 101 to each communication terminal 102 in one downlink sub-frame is reduced. Therefore, in general, to ensure a data amount transmitted to the communication terminal 102 in one frame, the upper limit of the number of communication terminals 102 to which data can be transmitted in one frame is set to be an appropriate value Y, based on the system performance. In this embodiment, the number of communication terminals 102 to which data should be transmitted in one frame, in other words, the number l of the communication terminals 102 determined by the communication-object determination section 109 described above, is set equal to or less than the appropriate value Y which has been set based on the system performance.

Figure 23:
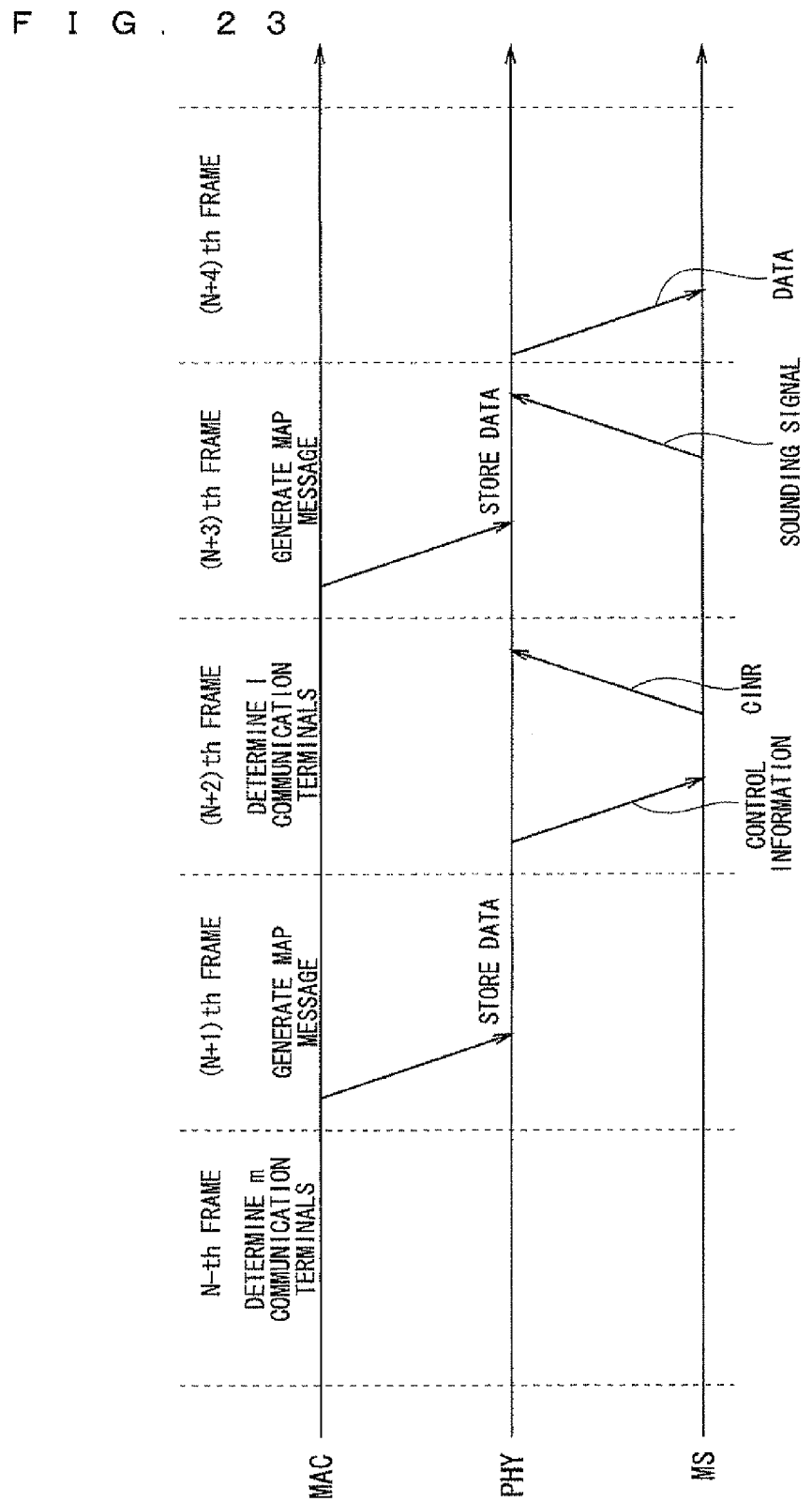
FIG. 23 is a diagram showing an operation of the base station according to the embodiment 2 of the present invention.

FIG. 23 is a diagram showing an operation in each one of frames of the wireless communication system of this embodiment. For simplification of the drawing, FIG. 23 does not show all operations, but shows only an operation for transmitting data from the base station 101 to the communication terminal 102 in a (N+4)th frame based on the Proportional Fairness.

A process in MAC shown in FIG. 23 means a process performed in a MAC layer by the base station 101, in other words, a process of the base station 101 generating the DL-MAP message and the UL-MAP message, and the like. A process in PHY shown in FIG. 23 means a process performed in a physical layer by the base station 101, in other words, a process of the base station 101 putting (storing) corresponding data into each downlink burst region identified by the DL-MAP message. A process in MS shown in FIG. 23 means a process performed in the communication terminal 102. The arrows between the PHY and the MS indicate communication of signals between the base station 101 and the communication terminal 102. In FIG. 23, the horizontal axis represents time, on which the operations of the wireless communication system in a N-th frame to the (N+4)th frame are sequentially shown. Next, the operation of this wireless communication system in each frame will be described.

Firstly, in the N-th frame, the base station 101 performs the process in the MAC layer. In this embodiment, the candidate determination section 107 calculates the above-described evaluation values by using the CINRs transmitted from a plurality of communication terminals 102 prior to the N-th frame, and determines a candidate terminal group (m communication terminals 102) based on the evaluation value. Then, the transmission control section 108 generates a DL-MAP message for identifying a plurality of downlink burst regions and the like in a downlink sub-frame of a (N+2)th frame. The transmission control section 108 also generates an UL-MAP message for identifying a plurality of uplink burst regions and the like in an uplink sub-frame. In this embodiment, the transmission control section 108 generates the UL-MAP message such that the UL-MAP message can contain the control information for causing each communication terminal 102 in the candidate terminal group to transmit the sounding signal. Then, the transmission control section 108 puts the DL-MAP message into the DL-MAP region of the downlink sub-frame, and puts the UL-MAP message into the UL-MAP region of the downlink sub-frame.

After the above-described process is completed, the base station 101 performs the process in the physical layer, as indicated by the arrow directed from the MAC to the PHY in a (N+1)th frame shown in FIG. 23. Here, the transmission control section 108 performs, for example, a process of putting (storing) data to be transmitted in the (N+2)th frame into the downlink burst region of the downlink sub-frame identified by the DL-MAP message. Thus, the downlink sub-frame of the (N+2)th frame is completed.

The transmission control section 108 causes the transmission section 105 to transmit the downlink sub-frame of the (N+2)th frame. Thereby, the downlink sub-frame is transmitted from the base station 101 to the candidate terminal group, as indicated by the arrow directed from the PHY to the MS in the (N+2)th frame shown in FIG. 23. As a result of the operation in the (N+1)th frame, the control information for causing the candidate terminal group to transmit the sounding signals are contained in the downlink sub-frame of the (N+2)th frame. Thus, the transmission control section 108 causes the transmission section 105 to transmit, to the candidate terminal group, the control information for causing each communication terminal 102 in the candidate terminal group to transmit the sounding signal.

The reception section 104 of the base station 101 receives an uplink sub-frame including a CINR from the candidate terminal group, as indicated by the arrow directed from the MS to the PHY in the (N+2)th frame shown in FIG. 23. Triggered by this reception, the base station 101 performs the process in the MAC layer by using the communication-object determination section 109 and the transmission control section 108.

Figure 24:
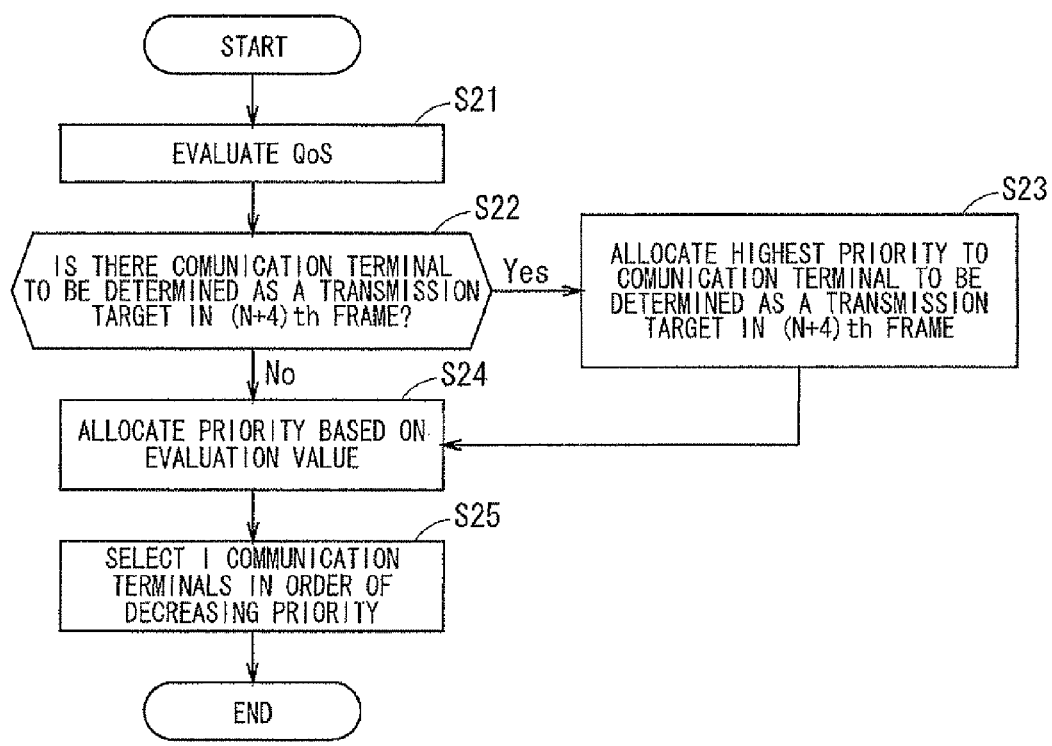
FIG. 24 is a flowchart showing the operation of the base station according to the embodiment 2 of the present invention.

FIG. 24 is a flowchart showing an operation that is performed by the communication-object determination section 109 of this embodiment at a time when the reception section 104 receives the CINR in the (N+2)th frame. The communication-object determination section 109 evaluates the QoS (Quality of Service) of each communication terminal 102 (step S21). In this embodiment, the QoS is determined by the base station 101 at a time when a service flow is established between the communication terminal 102 and the base station 101. Then, based on a result of the evaluation, the communication-object determination section 109 determines whether or not the candidate terminal group includes a communication terminal 102 (hereinafter also referred to as an "essential communication terminal") to which data must be transmitted in the (N+4)th frame (step S22).

In a case where it is determined in step S22 that there is the communication terminal 102 to which data must be transmitted in the (N+4)th frame, the communication-object determination section 109 allocates the highest priority to the communication terminal 102 (step S23).

In a case where it is not determined in step S22 that there is the communication terminal 102 to which data must be transmitted in the (N+4)th frame, the communication-object determination section 109 calculates new evaluation values for all the communication terminal 102 in the candidate terminal group, by using the CINRs of the candidate terminal group which have been received by the reception section 104 after the candidate determination section 107 determined the candidate terminal group. In a case where, in step S23, the highest priority is allocated to the communication terminal 102 to which data must be transmitted in the (N+4)th frame, the candidate determination section 107 calculates new evaluation values for the candidate terminal group except the communication terminal 102 to which the highest priority is allocated in step S23, by using the CINRs of the candidate terminal group which have been received by the reception section 104 after the candidate terminal group was determined.

In an example shown in FIG. 23, the CINRs used for calculating the new evaluation values are CINRs received by the reception section 104 in the (N+2)th frame. The communication-object determination section 109 sequentially allocates priorities to a plurality of communication terminals 102 such that a higher priority can be allocated to the one having a greater evaluation value calculated (step S24). In a case where the highest priority is allocated to the essential communication terminal in step S23, the priorities that are allocated in step S24 to the candidate terminal group except the essential communication terminal are lower than the highest priority allocated to the essential communication terminal.

After step S24, the communication-object determination section 109 selects l communication terminals 102 from the candidate terminal group (m communication terminal 102), sequentially from the one having a higher priority (step S25). The number l is less than the number m (l<m). Since the priority allocated to the essential communication terminal in step S23 is the highest, the essential communication terminal is inevitably selected to be one of the l communication terminals 102.

In a (N+3)th frame shown in FIG. 23, the transmission control section 108 generates a DL-MAP message for identifying a plurality of downlink burst regions, and the like, in a downlink sub-frame of the (N+4)th frame. The transmission control section 108 generates an UL-MAP message for identifying a plurality of uplink burst regions, and the like, in an uplink sub-frame. In this embodiment, the transmission control section 108 generates the DL-MAP message such that downlink burst regions of the l communication terminals 102 determined by the communication-object determination section 109 can be arranged in the downlink sub-frame of the (N+4)th frame. Then, the transmission control section 108 puts the DL-MAP message into the DL-MAP region of the downlink sub-frame, and puts the UL-MAP message into the UL-MAP region of the downlink sub-frame.

After the above-described process is completed, the base station 101 performs the process in the physical layer, as indicated by the arrow directed from the MAC to the PHY in the (N+3)th frame shown in FIG. 23. Here, the transmission control section 108 performs a process of putting (storing) data to be transmitted in the (N+4)th frame into the downlink burst region of the downlink sub-frame identified by the DL-MAP message. Thus, the downlink sub-frame of the (N+4)th frame is completed.

As indicated by the arrow directed from the MS to the PHY in the (N+3)th frame shown in FIG. 23, each communication terminal 102 in the candidate terminal group transmits the sounding signal through a sub-channel specified for itself by the control information received in the (N+2)th frame. The reception section 104 receives the sounding signals from the candidate terminal group. Based on the sounding signals received by the reception section 104, the weight calculation section 106 calculates a reception weight and a transmission weight of each of the l communication terminals 102.

The transmission control section 108 causes the transmission section 105 to transmit the downlink sub-frame of the (N+4)th frame to each of the l communication terminal 102. Based on the transmission weight calculated by the weight calculation section 106, the transmission section 105 transmits the downlink sub-frame of the (N+4)th frame to each of the l communication terminals 102 via the array antenna 103. Thereby, as indicated by the arrow directed from the PHY to the MS in the (N+4)th frame shown in FIG. 23, the downlink sub-frame is transmitted to the l communication terminals 102. In this manner, the transmission control section 108 transmits the data to each of the l communication terminals 102 determined by the communication-object determination section 109.

Next, to describe advantageous effects of the wireless communication system according to the embodiment described above, a wireless communication system to be compared with the present invention will be described. Here, a case where communication terminals 102 to be communicated with are determined from a plurality of communication terminals 102 in the N-th frame and data is transmitted to the determined communication terminals 102 in the (N+4)th frame, will be described with reference to FIG. 25.

Figure 25:
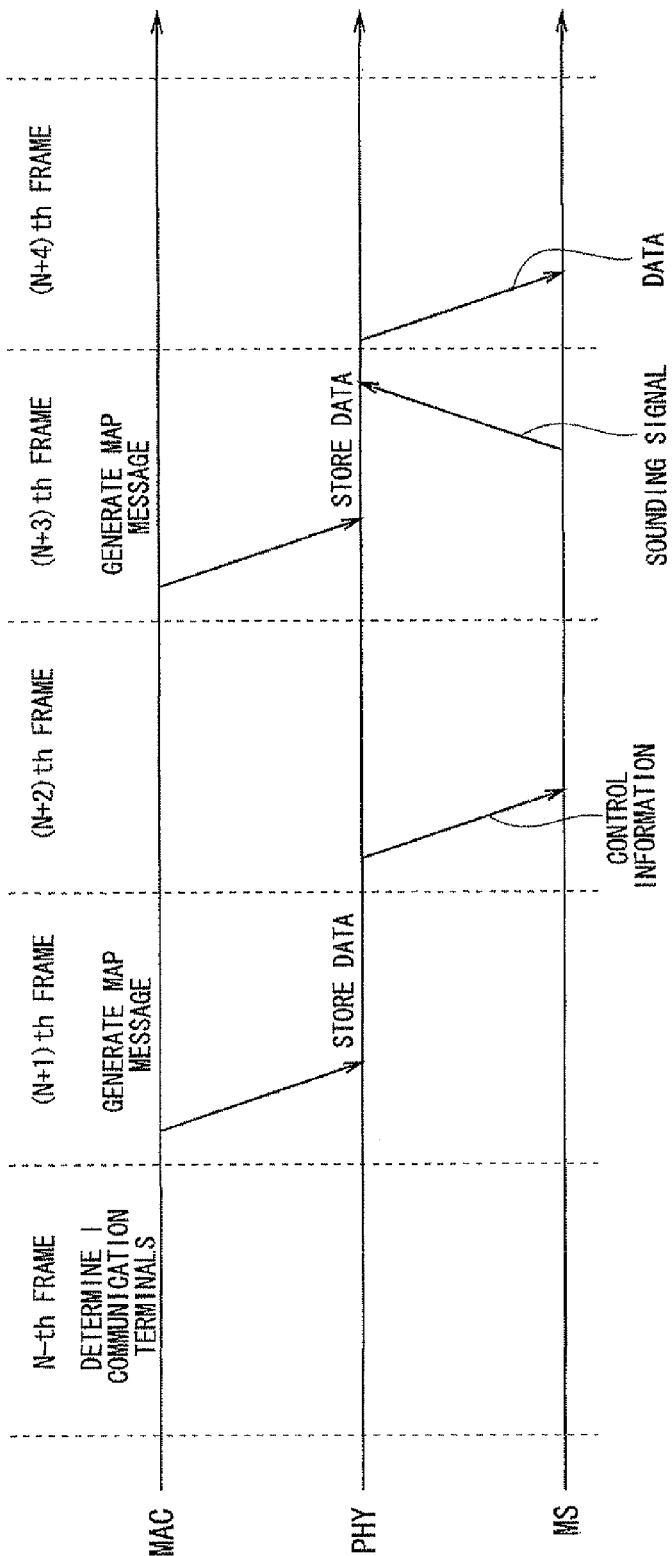
FIG. 25 is a diagram showing an operation of a base station to be compared with the present invention.

As shown in FIG. 25, in the base station 101, to transmit data to the communication terminals 102 by using the array antenna 103, l communication terminals 102 to which data should be transmitted in the (N+4)th frame are determined in the N-th frame. Here, it is assumed that the base station 101 determines, in the N-th frame, the communication terminals 102 to which data should be transmitted in the (N+4)th frame, by using the Proportional Fairness. In this case, there is a long time lag between a time point (in the N-th frame) when the l communication terminals 102 to which data should be transmitted are determined and a time point (in the (N+4)th frame) when the data is transmitted from the base station 101 to the l communication terminals 102. During this long time lag, a radio wave condition may vary and the communication quality may change. As a result, even if a good communication quality is obtained at the time point when the communication terminal 102 is determined as the communication object, the communication quality may be deteriorated at the time of data transmission. This consequently raises a problem that the base station 101 cannot communicate with a communication terminal 102 having a good communication quality.

On the other hand, the base station 101 of this embodiment determines m (m>1) communication terminals 102 as the candidate terminal group in the N-th frame. Based on the new evaluation values, the base station 101 determines l (1≤l<m) communication terminals 102 from the candidate terminal group. Then, the base station 101 transmits the data to each of the determined l communication terminals 102 in the (N+4)th frame. This can shorten the time lag between the time point (in the (N+2)th frame) when the l communication terminals 102 to which data should be transmitted are determined and the time point (in the (N+4)th frame) when the data is transmitted from the base station 101 to the l communication terminals 102. Therefore, a change in the communication quality during an interval between these time points is suppressed, thus enabling the base station 101 to communicate with a communication terminal 102 having a good communication quality.

In this embodiment, the candidate determination section 107 calculates the above-described evaluation values by using the CINRs transmitted from the plurality of communication terminals 102 prior to the N-th frame, and determines the candidate terminal group (m communication terminals 102) based on the evaluation values. However, this is not limitative, and the candidate determination section 107 may determine the candidate terminal group based on the QoS.

In this embodiment, the communication-object determination section 9 determines the l communication terminals 102 based on the QoS and the new evaluation values. However, this is not limitative, and the communication-object determination section 109 may determine the l communication terminals 102 based on the new evaluation values only.

In this embodiment, the CINRs received in the (N+2)th frame are used for the evaluation values that are used to determine the l communication terminals 102. However, this is not limitative, and CINRs received in the (N+1)th frame may be used as long as they are received after the candidate determination section 107 determines the candidate terminal group.

Embodiment 3

Figure 26:
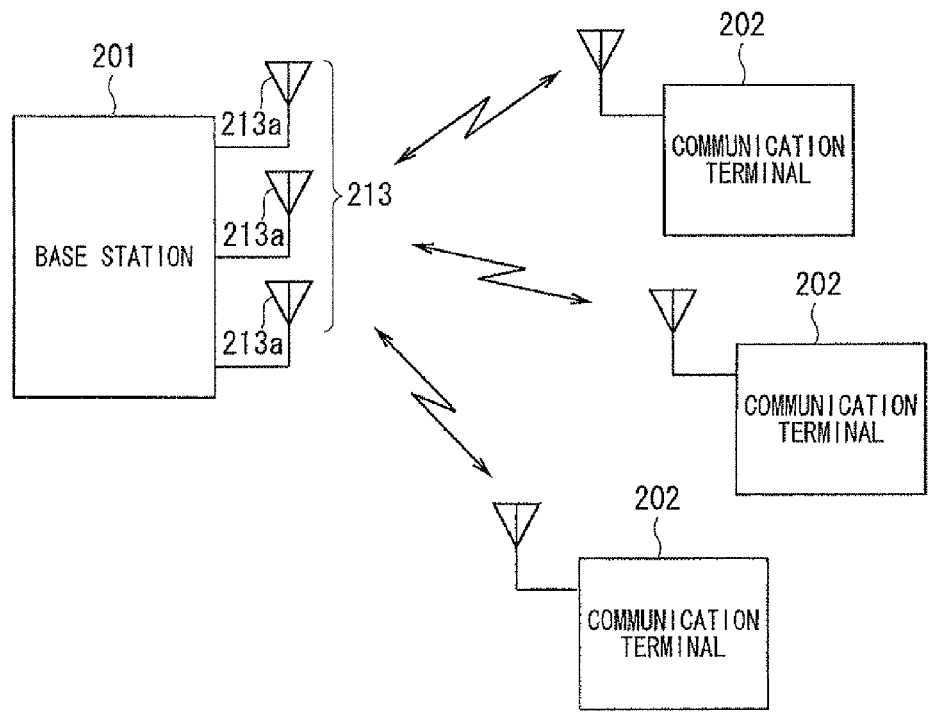
FIG. 26 is a diagram showing a configuration of a wireless communication system according to an embodiment 3 of the present invention.
Figure 27:
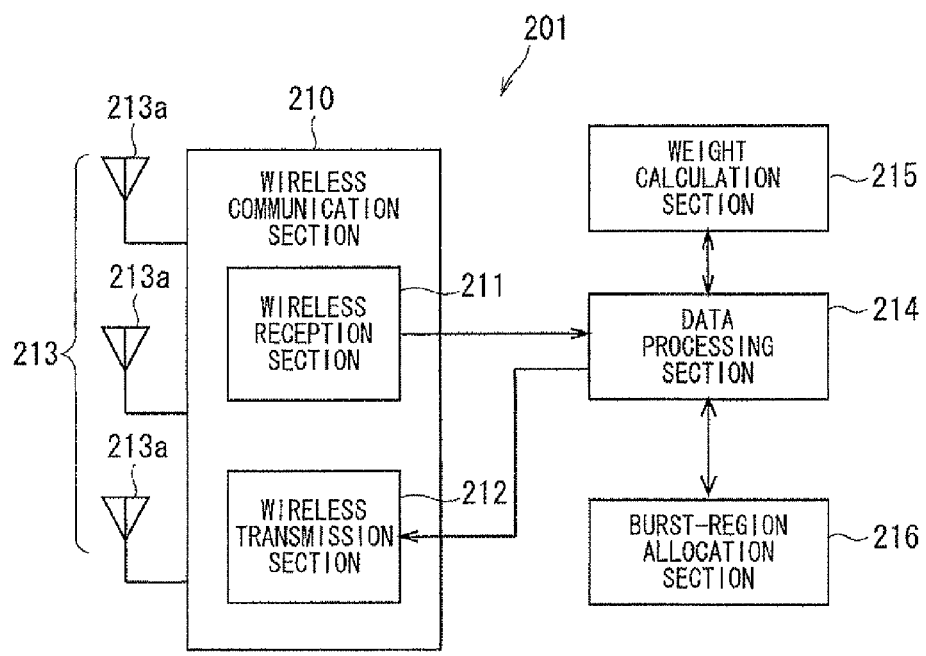
FIG. 27 is a diagram showing a configuration of a base station according to the embodiment 3 of the present invention.

FIG. 26 is a diagram showing a configuration of a wireless communication system according to an embodiment 3 of the present invention. FIG. 27 is a diagram showing a configuration of a base station 201 included in the wireless communication system of this embodiment. The wireless communication system of this embodiment is a system according to the mobile WiMAX defined in IEEE 802.16e, for example. The base station 201 performs bi-directional wireless communication with a plurality of communication terminals 202 through the OFDMA scheme. The base station 201 that performs the OFDMA communication individually allocates a radio resource identified by a sub-channel and an OFDM symbol to each of the plurality of communication terminals 202, and thereby can simultaneously communicate with the plurality of communication terminals 202.

As shown in FIG. 27, the base station 201 includes a wireless communication section 210, a data processing section 214, a weight calculation section 215, and a burst-region allocation section 216. The wireless communication section 210 includes a wireless reception section 211 and a wireless transmission section 212. The wireless reception section 211 and the wireless transmission section 212 share, as an antenna, an array antenna 213 having a plurality of antenna elements 213a. That is, the array antenna 213 functions as a transmission antenna for transmitting a radio signal to the communication terminal 202 and a reception antenna for receiving a radio signal from the communication terminal 202. The base station 201 sets a weight (weights) to each of the plurality of antenna elements 213a of the array antenna 213, and thereby perform beam-forming, so that the directivity of the array antenna 213 can be directed to a communication terminal 202 to be communicated with.

The wireless reception section 211 performs an amplification process and a down-conversion on each of signals received by the plurality of antenna elements 213a of the array antenna 213, to convert the signals received by the plurality of antenna elements 213a into baseband signals, and outputs them.

Based on a known sounding signal transmitted from each of the communication terminals 202 to be communicated with, the weight calculation section 215 estimates the quality of a transmission channel of each sub-carrier allocated to the communication terminal 202. The sounding signal supplied from the communication terminal 202 is obtained by the data processing section 214. Based on a result of the estimation, the weight calculation section 215 calculates a reception weight and a transmission weight to be applied to the array antenna 213 with respect to the sub-carrier allocated to each of the communication terminals 202 to be communicated with. The weight calculation section 215 calculates the reception and transmission weights through a convergence calculation using an LMS (Least Mean Square) algorithm, for example.

In a case where, for example, 100 sub-carriers are allocated as the sub carriers that are used for data transmission from a certain communication terminal 202 to the base station 201, the weight calculation section 215 calculates (100×3) reception weights with respect to this communication terminal 202, because the array antenna 213 of this embodiment is composed of three antenna elements 213a. In a case where 150 sub-carriers are allocated as the sub-carriers that are used for data transmission from the base station 201 to a certain communication terminal 202, the weight calculation section 215 calculates (150×3) transmission weights with respect to this communication terminal 202.

In this manner, the number of each of the reception weight and the transmission weight obtained by the weight calculation section 215 with respect to each communication terminal 202 is the value obtained by multiplying the number of antenna elements 213a of the array antenna 213 by the number of sub-carriers allocated to the communication terminal 202.

The data processing section 214 performs an FFT (Fast Fourier Transform) process on each of the plurality of baseband signals outputted from the wireless reception section 211, to obtain a plurality of sub-carriers included in each of the plurality of baseband signals by separating them therefrom. For each set of the plurality of sub-carriers included in the plurality of baseband signals and having the same frequency, the data processing section 214 sets a corresponding reception weight, which has been obtained by the calculation in the weight calculation section 215, to each of the plurality of sub-carriers having the same frequency, and controls the phase and the amplitude of each sub-carrier. For each set of the plurality of sub-carriers included in the plurality of baseband signals and having the same frequency, the data processing section 214 combines the plurality of sub-carriers having the same frequency after the weight is set thereto. Thereby, a beam of the array antenna 213 can be directed to a desired wave, so that an interference wave can be removed. The data processing section 214 performs a demodulation process, and the like, on each signal (hereinafter referred to as a "combined sub-carrier") obtained as a result of the combination of the plurality of sub-carriers having the frequency after the weight is set thereto, to reproduce various data supplied from the communication terminal 202, such as the sounding signal.

Additionally, the data processing section 214 generates serial transmission data. The data processing section 214 converts the generated serial transmission data into parallel transmission data, and modulates a plurality of sub-carriers used for the transmission by the parallel transmission data. The number of prepared sub-carrier groups each including the plurality of modulated sub-carriers is equal to the number of antenna elements 213a. In this embodiment, three identical sub-carrier groups are prepared. For each set of the plurality of sub-carriers included in each of the plurality of sub-carrier groups and having the same frequency, the data processing section 214 sets a corresponding transmission weight, which has been obtained by the calculation in the weight calculation section 215, to each of the plurality of sub-carriers having the same frequency. Then, the data processing section 214 combines the plurality of sub-carriers included in each of the plurality of sub-carrier groups after the weight is set thereto, to thereby generate a baseband signal. As a result, baseband signals, the number of which is equal to the number of antenna elements 213a of the array antenna 213, are generated. The data processing section 214 outputs the plurality of generated baseband signals to the wireless transmission section 212.

The burst-region allocation section 216 allocates at least one downlink burst region used for downlink transmission of user data, in the downlink sub-frame for transmitting a signal from the base station 201 to the communication terminal 202. The downlink burst region is identified based on the OFDM symbol and the sub-channel, and one downlink burst region contains user data addressed to at least one communication terminal 202. By the allocation of the downlink burst region in the downlink sub-frame, a radio resource used for transmission of user data to the communication terminal 202 to be communicated with is determined in the base station 201.

The burst-region allocation section 216 also allocates an uplink burst region used for uplink transmission of user data, in the uplink sub-frame for transmitting a signal from the communication terminal 202 to the base station 201. The uplink burst region is identified based on the OFDM symbol and the sub-channel, and one uplink burst region contains user data supplied from one communication terminal 202. By the allocation of the uplink burst region in the uplink sub-frame, a radio resource used for transmission of user data by the communication terminal 202 to be communicated with is determined in the base station 201.

The wireless transmission section 212 performs an up-conversion and an amplification process on the plurality of baseband signals inputted from the data processing section 214, and then inputs them to the plurality of antenna elements 213a. As a result, a radio signal is transmitted from the array antenna 213 to the communication terminal 202 to be communicated with.

Figure 28:
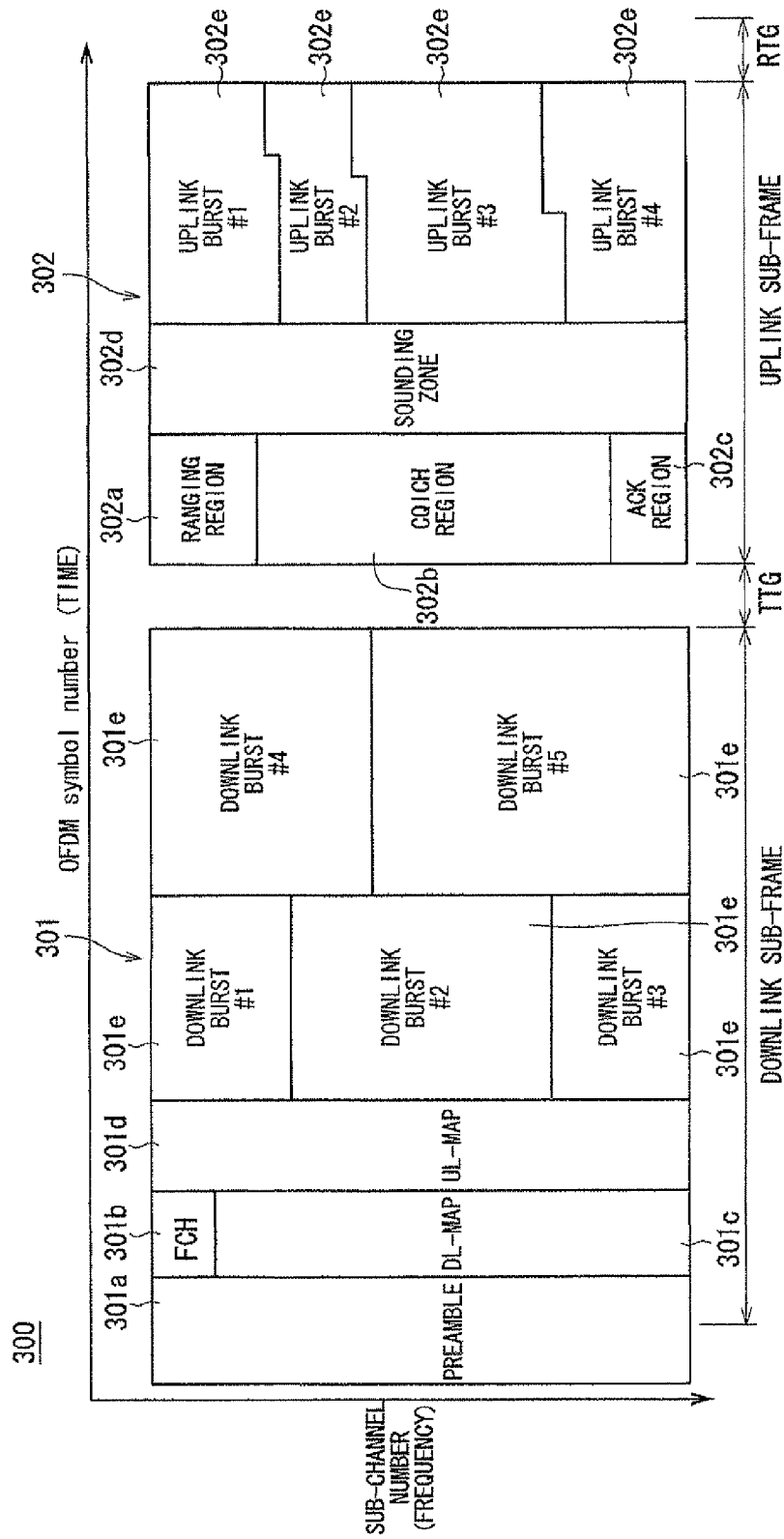
FIG. 28 is a diagram showing an example of the frame configuration in the mobile WIMAX.

Next, a configuration of a frame 300 in the mobile WiMAX will be described. FIG. 28 is a diagram showing an exemplary configuration of the frame 300. A duplex system adopted in the mobile WiMAX for communication between the base station 201 and the communication terminal 202 is a TDD (Time Division Duplexing). As shown in FIG. 28, one frame 300 is composed of a downlink sub-frame 301 for transmitting a signal from the base station 201 to the communication terminal 202, and an uplink sub-frame 302 for transmitting a signal from the communication terminal 202 to the base station 201. In the frame 300, a TTG (Transmit Transition Gap) and an RTG (Receive Transition Gap) are provided. The TTG is a guard time for switching the base station 201 from transmission to reception. The RTG is a guard time for switching the base station 201 from reception to transmission.

As shown in FIG. 28, each of the downlink sub-frame 301 and the uplink sub-frame 302 is expressed in a two-dimensional manner based on a time axis represented by an OFDM symbol number and a frequency axis represented by a sub-channel number. In other words, each of the downlink sub-frame 301 and the uplink sub-frame 302 is defined on a time/sub-channel plane. In the OFDMA scheme, a plurality of sub-carriers are grouped into a plurality of sub-channels, and the sub-carriers are allocated to the communication terminals 202 on a sub-channel basis. In the OFDMA scheme, a radio resource is allocated to each communication terminal 202 in a two-dimensional manner expressed by the frequency axis and the time axis.

In the downlink sub-frame 301, for example, a preamble region 301a, an FCH (Frame Control Header) region 301b, a DL-MAP (Downlink Map) region 301c, an UL-MAP (Uplink Map) region 301d, and a plurality of downlink burst regions 301e are allocated. The range of each region in the downlink sub-frame 301, such as the preamble region 301a, is determined based on the number of sub-channels and the number of OFDM symbols.

In the uplink sub-frame 302, for example, a ranging region 302a, a CQICH region 302b, an ACK region 302c, a sounding zone 302d, and a plurality of uplink burst regions 302e are allocated. Similarly to the downlink sub-frame 301, the range of each region in the uplink sub-frame 302, such as the ranging region 302a, is determined based on the number of sub-channels and the number of OFDM symbols.

The preamble region 301a contains a signal necessary for synchronizing the communication terminal 202 with the base station 201. The FCH region 301b contains a DLFP (Down-Link Frame Prefix) and the like. The DLFP indicates the length of a DL-MAP message in the DL-MAP region 301c which will be described later, a scheme of an error correction code used therein, and the number of repetition of a repetition code used therein. The communication terminal 202 demodulates the DL-MAP message in accordance with the contents of the DLFP.

At least one communication terminal 202 can be allocated to each of the plurality of downlink burst regions 301e by the DL-MAP message 301c, and each downlink burst region 301e contains user data addressed to a corresponding communication terminal 202. In the downlink sub-frame 301 shown in FIG. 28, five downlink burst regions 301e of #1 to #5 are arranged. A time slot (OFDM symbol) and a sub-channel on the time/sub-channel plane which are occupied by a downlink burst region 301e serve as a radio resource allocated to a communication terminal 202 corresponding to this downlink burst region 301e.

The DL-MAP region 301c contains the DL-MAP message indicating allocation of a radio resource to each communication terminal 202 serving as a communication object of the downlink sub-frame 301 including this DL-MAP region 301c. The DL-MAP message includes information of, for example, which region in the downlink sub-frame 301 is allocated as each downlink burst region 301e and which communication terminal 202 is allocated to each downlink burst region 301e. Accordingly, the DL-MAP message identifies a communication terminal 202 serving as a communication object of the downlink sub-frame 301 including this DL-MAP message, a sub-channel used for the communication with the communication terminal 202, and a time slot for communicating with the communication terminal 202. Each of the communication terminals 202 analyzes the contents of the UL-MAP message, and thereby can recognize in which time slot (OFDM symbol) data addressed to the communication terminal 202 itself is transmitted from the base station 1 and which of the sub-channels is used for the transmission. This consequently enables each of the communication terminals 202 to appropriately receive the data addressed to itself from the base station 201.

The UL-MAP region 301d contains an UL-MAP message indicating allocation of a radio resource to each communication terminal 202 serving as a communication object of an uplink sub-frame 302 which will follow the downlink sub-frame 301 including this UL-MAP message. The UL-MAP message includes information of, for example, which region in the uplink sub-frame 302 is allocated as each uplink burst region 302e and which communication terminal 202 is allocated to each uplink burst region 302e of the uplink sub-frame 302. Accordingly, the UL-MAP message identifies a communication terminal 202 serving as a communication object of the uplink sub-frame 302 which will follow the downlink sub-frame 301 including this UL-MAP message, a sub-channel used for the communication with the communication terminal 202, and a time slot for communicating with the communication terminal 202. Each of the communication terminals 202 analyzes the contents of the UL-MAP message, and thereby can recognize in which time slot data addressed to the base station 201 should be transmitted and which of the sub-channels should be used for the transmission.

By the UL-MAP message, different communication terminals 202 are allocated to a plurality of uplink burst regions 302e of the uplink sub-frame 302, respectively. Each uplink burst region 302e contains user data transmitted by a corresponding communication terminal 202. In the uplink sub-frame 302 shown in FIG. 28, four uplink burst regions 302e of #1 to #4 are allocated. A time slot (OFDM symbol) and a sub-channel on the time/sub-channel plane which are occupied by an uplink burst region 302e serve as a radio resource allocated to a communication terminal 202 corresponding to this uplink burst region 302e.

The ranging region 302a a signal for bandwidth requirements and ranging. The CQICH region 302b contains channel quality information. The ACK region 302c contains ACK (Acknowledgement) or NACK (Negative Acknowledgement) to a HARQ (Hybrid Automatic Repeat reQuest) from the base station 201.

The sounding zone 302d contains a known sounding signal which is used for the weight calculation section 215 of the base station 201 to calculate a weight applied to the array antenna 213. All the sub-channels, that is, all the sub-carriers are allocated to the sounding zone 302d. A plurality of subchannels allocated to the sounding zone 302d are allocated, with no overlap, to a plurality of communication terminals 202 that communicate with the base station 201 in the uplink sub-frame 302 including this sounding zone 302d. Each of the communication terminals 202 that communicate with the base station 201 in the uplink sub-frame 302 transmits a sounding signal to the base station 201 by using a sub-channel allocated thereto. In a case where the number of communication terminals 202 that communicate with the base station 201 in the uplink sub-frame 302 is one, all the sub-channels are allocated to the one communication terminal 202, and the one communication terminal 202 transmits a sounding signal by using all the sub-channels.

The UL-MAP message contained in the UL-MAP region 301d allocates the sub-carriers for the sounding signals to the communication terminals 202. The UL-MAP message defines which sub-channel is to be used for transmission of the sounding signal by each of the communication terminals 202 that communicate with the base station 201 in an uplink sub-frame 302 which will follow the downlink sub-frame 301 including the UL-MAP message. Each of the communication terminals 202 that communicate with the base station 201 in the uplink sub-frame 302 following the downlink sub-frame 301 that carries the UL-MAP message transmits the sounding signal to the base station 201 by using a sub-channel specified for itself by the UL-MAP message. More specifically, the communication terminal 202 modulates a plurality of specified sub-carriers by the sounding signal, and transmits to the base station 201 a signal obtained by superimposing a plurality of modulated sub-carriers on one another.

Figure 29:
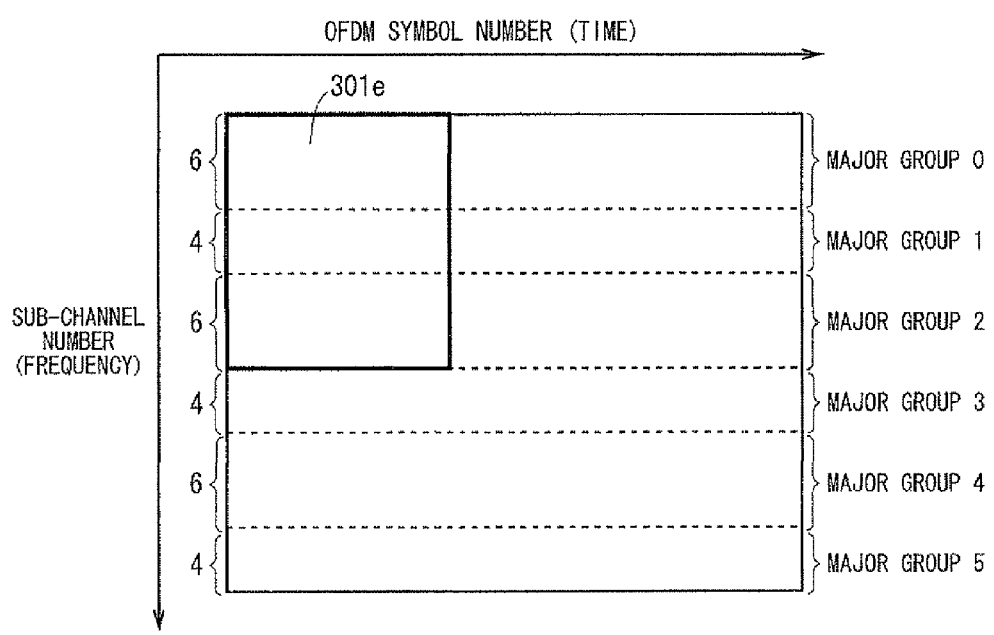
FIG. 29 is a diagram showing an exemplary configuration of a major group.

In the mobile WiMAX, various methods are defined as a method for arranging sub-channels. Among them, the PUSC (Partial Usage of Subchannels) has a downlink PUSC applied in downlink communication and an uplink PUSC applied in uplink communication. In the downlink PUSC, a plurality of major groups each composed of a plurality of sub-channels are defined. FIG. 29 is a diagram showing a configuration of six major groups 0 to 5 defined by the downlink PUSC in a case where the FFT size is 1024.

As shown in FIG. 29, each of the major groups 0, 2, and 4 is composed of six sub-channels, and each of the major groups 1, 3, and 5 is composed of four sub-channels. In a case where the base station 201 adopts the downlink PUSC as a method for arranging sub-channels in the downlink burst region 301e and transmits user data to the communication terminals 202 while performing beam-forming as in this embodiment, it is necessary to allocate the downlink burst regions 301e in the downlink sub-frame 301 on a major group basis. In other words, the base station 201 has to allocate the sub-channels to the communication terminals 202 to which user data is to be transmitted, on a major group basis. One downlink burst region 301e may be allocated so as to occupy one major group, or may be allocated so as to occupy a plurality of major groups. The downlink burst region 301e illustrated with the bold line in FIG. 29 are allocated so as to occupy three major groups 0 to 2. In the following, it is assumed that the downlink PUSC be adopted as the method for arranging sub-channels in the downlink burst region 301e.

In the mobile WiMAX, it is necessary that the downlink burst region 301e has a rectangular shape on an OFDM symbol (time)/sub-channel plane whose horizontal axis represents the OFDM symbol and vertical axis represents the sub-channel as shown in FIGS. 28 and 29. In a case where one downlink burst region 301e occupies a plurality of major groups, the downlink burst region 301e is allocated so as to occupy a plurality of major groups having sequential numbers so as to have a rectangular shape.

Moreover, in the mobile WiMAX, allocation of each region such as the downlink burst region 301e in the downlink sub-frame 301 and allocation of each region such as the uplink burst region 302e in the uplink sub-frame 302 are performed on a so-called "slot" basis. In a case where the downlink PUSC is adopted as the method for arranging sub-channels, one slot is composed of one sub-channel and two OFDM symbols. In the uplink PUSC, one slot is composed of one sub-channel and three OFDM symbols. In the FUSC (Full Usage of Subchannels), one slot is composed of one sub-channel and one OFDM symbol.

In the base station 201 according to this embodiment, based on the number (hereinafter referred to as "the number of necessary slots") of slots necessary for transmitting user data by one downlink burst region 302e, the one downlink burst region 302e is appropriately allocated in the downlink sub-frame 301, thereby reducing the number of slots not used for the transmission of the user data in a plurality of slots constituting the downlink burst region 302e. In other words, a difference between the number of necessary slots for transmitting the user data in one downlink burst region 302e and the number of the plurality of slots included in the one downlink burst region 302e can be reduced. This enables an efficient use of the radio resources. Details thereof will be described below.

Figure 30:
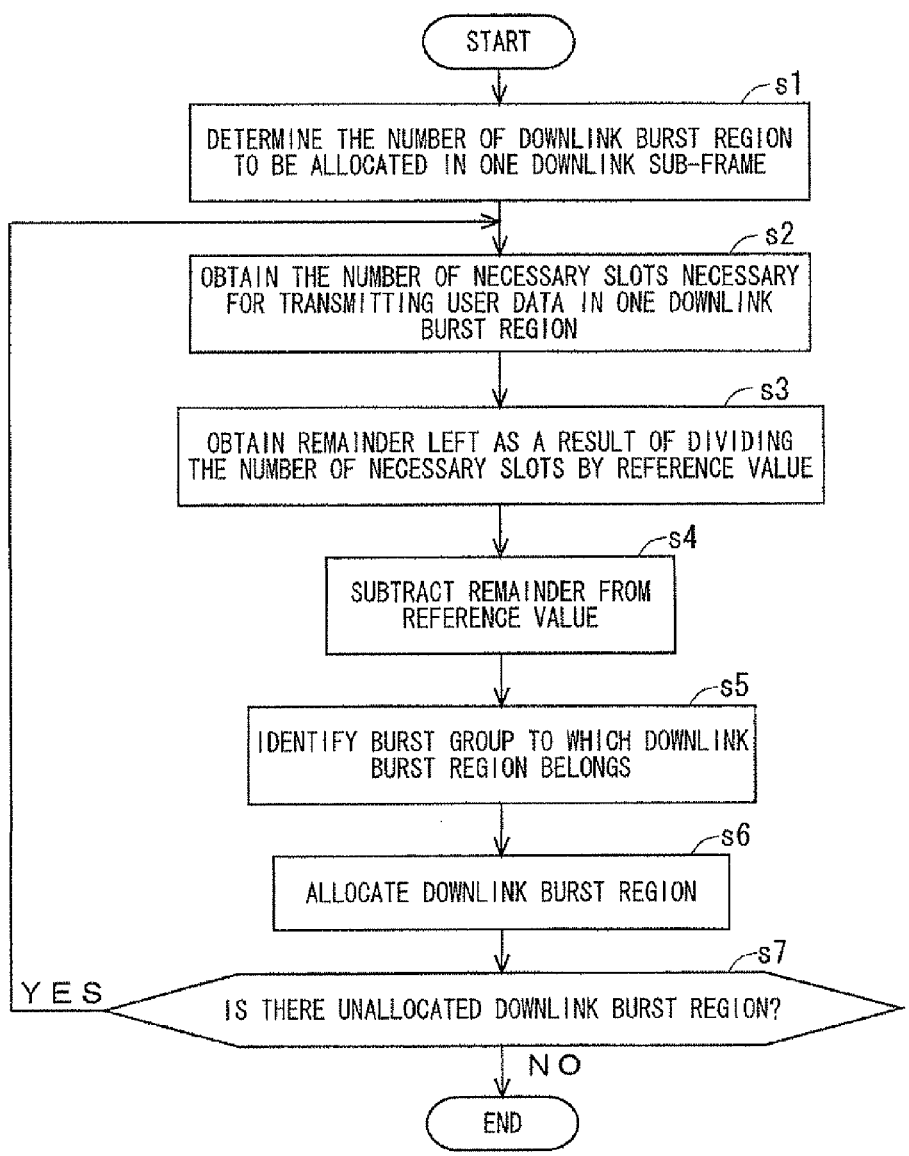
FIG. 30 is a flowchart showing an operation of a burst-region allocation section according to the embodiment 3 of the present invention.

FIG. 30 is a flowchart showing an operation of the burst-region allocation section 216 when the burst-region allocation section 216 allocates the downlink burst regions 301e in the downlink sub-frame 301. In the wireless communication system according to this embodiment, a plurality of reference values are defined which are, used when the burst-region allocation section 216 allocates the downlink burst regions 301e in the downlink sub-frame 301. The plurality of reference values are set such that each of the plurality of reference values can be equal to the number of sub-channels constituting one major group or sub-channels constituting a plurality of major groups having sequential numbers, and such that the plurality of reference values can be different from one another. In this embodiment, for example, three reference values of "4", "6", and "10" are preliminary stored in the burst-region allocation section 216. The reference value "4" is, for example, coincident with the number of sub-channels constituting the major group 1. The reference value "6" is, for example, coincident with the number of sub-channels constituting the major group 0. The reference value "10" is, for example, coincident with the number of sub-channels constituting the major groups 0 and 1.

In a case where the FFT size is 128 or 512, no major group has an odd-number. Accordingly, in this case, "the plurality of major groups having sequential numbers" mean any of the two major groups 0 and 2, two major groups 2 and 4, and three major groups of 0, 2, and 4.

As shown in FIG. 30, firstly, in step s1, the burst-region allocation section 216 determines the number of downlink burst regions 301e to be allocated in one downlink sub-frame 301 (hereinafter referred to as an "object downlink sub-frame 301") several frames after the current. Here, the number of downlink burst regions 301e determined in step s1 is defined as A (≥1). The burst-region allocation section 216 determines the number of downlink burst regions 301e to be allocated in the object downlink sub-frame 301, based on the number of communication terminals 202 to which user data should be transmitted in the object downlink sub-frame 301, the quality of communication between these communication terminals 202 and the base station 201, and the like. The quality of communication between the communication terminals 202 and the base station 201 can be determined by the data processing section 214, based on signals transmitted from the communication terminals 202.

Then, in step s2, the burst-region allocation section 216 defines one of the A downlink burst regions 301e determined in step s1 as an object downlink burst region 301e, and obtains the number of necessary slots Nslot necessary for transmitting user data in this object downlink burst region 301e. In step s2, the burst-region allocation section 216 firstly determines a communication terminal 202 to which user data is intended to be transmitted in the object downlink burst region 301e. That is, the burst-region allocation section 216 determined a communication terminal 202 to be associated with the object downlink burst region 301e. Then, the burst-region allocation section 216 determines a data amount of user data to be included in the object downlink burst region 301e, based on the QoS (Quality of Service) and a previous transmission data amount with respect to the determined communication terminal 202. Based on this data amount, the burst-region allocation section 216 obtains the number of necessary slots Nslot.

Then, in step s3, the burst-region allocation section 216 obtains a remainder left as a result of dividing the number of necessary slots Nslot obtained in step s2 by each of a plurality of reference values that are preliminary stored. For example, in a case where the number of necessary slots Nslot is "41", the value "41" is divided by the reference values "4", "6", and "10", with remainders of "1", "5", and "1", respectively. Hereinafter, the remainders left as a result of dividing the number of necessary slots Nslot by the reference values "4", "6", and "10" will be indicated as "r4", "r6", and "r10", respectively.

Then, in step s4, the burst-region allocation section 216 subtracts the remainder obtained in step s3 and corresponding to each reference value from the reference value. Thus, the values "4-r4", "6-r6", and "10-r10" are obtained in step s4.

Then, in step s5, the burst-region allocation section 216 identifies which burst group the object downlink burst region 301e belongs to. Here, in the base station 201 of this embodiment, a plurality of burst groups are set, and a region in the downlink sub-frame 301 to be allocated as a downlink burst region 301e is determined in accordance with the burst group to which the downlink burst region 301e belongs. In this embodiment, three burst groups, namely, a burst group G4 associated with the reference value "4", a burst group G6 associated with the reference value "6", and a burst group G10 associated with the reference value "10" are defined. The downlink burst region 301e corresponding to r4=0 and the downlink burst region 301e for which the value "4-r4" is the smallest among the values "4-r4", "6-r6", and "10-r10", belong to the burst group G4. The downlink burst region 301e corresponding to r6=0 and the downlink burst region 301e for which the value "6-r6" is the smallest among the values "4-r4", "6-r6", and "10-r10", belong to the burst group G6. The downlink burst region 301e corresponding to r10=0 and the downlink burst region 301e for which the value "10-r10" is the smallest among the values "4-r4", "6-r6", and "10-r10", belong to the burst group G10.

The burst-region allocation section 216 identifies the burst group to which the object downlink burst region 301e belongs, based on the values r4, r6, and r10 obtained in step s3 and the values "4-r4", "6-r6", and "10-r10" obtained in step s4. In cases of r4=0, r6=0, and r10=0, the burst-region allocation section 216 determines that the object downlink burst region 301e belongs to the burst group G4, the burst group G6, and the burst group G10, respectively. In a case of none of the values r4, r6, and r10 is zero, the burst-region allocation section 216 identifies the smallest one of the values "4-r4", "6-r6", and "10-r10". In cases where the value "4-r4" is the smallest, where the value "6-r6" is the smallest, and where the value "10-r10" is the smallest, the burst-region allocation section 216 determines that the object downlink burst region 301e belongs to the burst group G4, the burst group G6, and the burst group G10, respectively.

After the burst group to which the object downlink burst region 301e belongs is identified in step s5, then in step s6, the burst-region allocation section 216 allocates the object downlink burst region 301e in the object downlink sub-frame 301 in accordance with the burst group to which the object downlink burst region 301e belongs.

In a case where the object downlink burst region 301e belongs to the burst group G4, the burst-region allocation section 216 allocates the object downlink burst region 301e in the object downlink sub-frame 301 so as to occupy only at least one major group composed of sub-channels the number of which is equal to the reference value "4" corresponding to the burst group G4. For example, as shown in FIG. 31, the burst-region allocation section 216 allocates the object downlink burst region 301e so as to occupy only the major group of No. 1 composed of four sub-channels.

In a case where the object downlink burst region 301e belongs to the burst group G6, the burst-region allocation section 216 allocates the object downlink burst region 301e in the object downlink sub-frame 301 so as to occupy only one major group composed of sub-channels the number of which is equal to the reference value "6". For example, as shown in FIG. 32, the burst-region allocation section 216 allocates the object downlink burst region 301e so as to occupy only the major group of No. 0 composed of six sub-channels.

In a case where the object downlink burst region 301e belongs to the burst group G10, the burst-region allocation section 216 allocates the object downlink burst region 301e in the object downlink sub-frame 301 so as to occupy only at least one major group composed of sub-channels the number of which is equal to the reference value "10" corresponding to the burst group G10. For example, as shown in FIG. 33, the burst-region allocation section 216 allocates the object downlink burst region 301e so as to occupy only two major groups of Nos. 0 and 1 composed of ten sub-channels.

In a case where the object downlink burst region 301e extends over a plurality of burst groups, the object downlink burst region 301e is allocated so as to occupy only at least one major group composed of sub-channels the number of which is equal to the reference value corresponding to one of the plurality of burst groups having the greatest reference value. For example, in a case where both of the values r4 and r6 are zero, the downlink burst region 301e belongs to both of the burst groups G4 and G6. In this case, the object downlink burst region 301e is allocated so as to occupy only one major group composed of sub-channels the number of which is equal to the reference value corresponding to the burst group G6 which has a greater reference value.

The shape of the downlink burst region 301e is inevitably a rectangular shape. Therefore, in a case where the at least one major group composed of sub-channels the number of which is equal to the reference value comprises a plurality of major groups, the plurality of major groups comprise a plurality of major groups having sequential numbers.

After the allocation of the object downlink burst region 301e is completed in step s6, then in step s7, the burst-region allocation section 216 determines whether or not an unallocated downlink burst region 301e exists in the object downlink sub-frame 301. When it exists, one unallocated downlink burst region 301e is set to a new object downlink burst region 301e, and step s2 and subsequent steps are processed in sequence. When it is determined in step s7 that an unallocated downlink burst region 301e does not exist in the object downlink sub-frame 301, in other words, it is determined that all of the A downlink burst regions 301e determined in step s1 are allocated in the object downlink sub-frame 301, the burst-region allocation section 216 completes the process of allocating the downlink burst region 301e.

When the allocation of all the A downlink burst regions 301e in the object downlink sub-frame 301 is completed in the above-described manner, the allocation of radio resources to all the communication terminals 202 to which user data are to be transmitted in the object downlink sub-frame 301 is completed. A transmission section composed of the data processing section 214 and the wireless transmission section 212 transmits user data to a communication terminal 202 while performing beam-forming, by using a radio resource allocated to the communication terminal 202 to be communicated with in the object downlink sub-frame 301.

Figure 35:
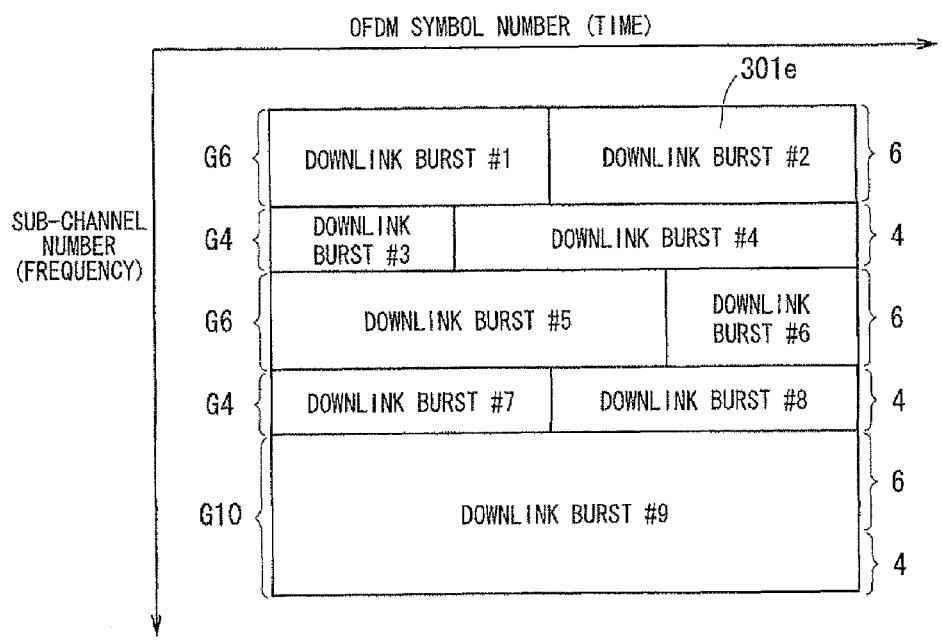
FIG. 35 is a diagram showing an example of the allocation of the nine downlink burst regions.

FIG. 34 is a diagram showing an example of the values of r4, r6, r10, "4-r4", "6-r6", and "10-r10" obtained when nine downlink burst regions 301e of #1 to #9 are allocated in the downlink sub-frame 301. FIG. 35 is a diagram showing an example of allocation of the downlink burst regions 301e of #1 to #9 in a case exemplified by FIG. 34. In the example shown in FIG. 34, the number of necessary slots Nslot for transmitting data in the downlink burst regions 301e of #1 to #9 is "41", "42", "26", "32", "53", "36", "27", "32", and "140", respectively.

In the downlink burst region 301e of #1, none of the values r4, r6, and r10 is zero, and the value "6-r6" is the smallest. Thus, the downlink burst region 301e of #1 belongs to the burst group G6. Accordingly, the downlink burst region 301e of #1 is allocated so as to occupy only a major group composed of six sub-channels, as shown in FIG. 35.

In the downlink burst region 301e of #2, r6=0 is established. Thus, the downlink burst region 301e of #2 belongs to the burst group G6. Accordingly, the downlink burst region 301e of #2 is allocated so as to occupy only a major group composed of six sub-channels.

In the downlink burst region 301e of #3, none of the values r4, r6, and r10 is zero, and the value "4-r4" is the smallest. Thus, the downlink burst region 301e of #3 belongs to the burst group G4. Accordingly, the downlink burst region 301e of #3 is allocated so as to occupy only a major group composed of four sub-channels, as shown in FIG. 35.

In the downlink burst region 301e of #4, r4=0 is established. Thus, the downlink burst region 301e of #4 belongs to the burst group G4. Accordingly, the downlink burst region 301e of #4 is allocated so as to occupy only a major group composed of four sub-channels, as shown in FIG. 35.

In the downlink burst region 301e of #5, none of the values r4, r6, and r10 is zero, and the value "6-r6" is the smallest. Thus, the downlink burst region 301e of #5 belongs to the burst group G6. Accordingly, the downlink burst region 301e of #5 is allocated so as to occupy only a major group composed of six sub-channels, as shown in FIG. 35.

In the downlink burst region 301e of #6, both of the values r4 and r6 are zero. Thus, the downlink burst region 301e of #6 belongs to the burst groups G4 and G6. The reference value corresponding to the burst group G6 is greater than that corresponding to the burst group G4. Accordingly, the downlink burst region 301e of #6 is allocated so as to occupy only a major group composed of six sub-channels, as shown in FIG. 35.

In the downlink burst region 301e of #7, none of the values r4, r6, and r10 is zero, and the value "4-r4" is the smallest. Thus, the downlink burst region 301e of #7 belongs to the burst group G4. Accordingly, the downlink burst region 301e of #7 is allocated so as to occupy only a major group composed of four sub-channels, as shown in FIG. 35.

In the downlink burst region 301e of #8, r4=0 is established. Thus, the downlink burst region 301e of #8 belongs to the burst group G4. Accordingly, the downlink burst region 301e of #8 is allocated so as to occupy only a major group composed of four sub-channels, as shown in FIG. 35.

In the downlink burst region 301e of #9, both of the values r4 and r10 are zero. Thus, the downlink burst region 301e of #9 belongs to the burst groups G4 and G10. The reference value corresponding to the burst group G10 is greater than that corresponding to the burst group G4. Accordingly, the downlink burst region 301e of #9 is allocated so as to occupy only two major groups composed of ten sub-channels, as shown in FIG. 35.

As described above, in this embodiment, in a case where any of the remainders r4, r6, and r10 is zero, that is, in a case where there is a certain reference value in the plurality of reference values ("4", "6", and "10") that leaves a remainder of zero as a result of dividing the number of necessary slots Nslot by the certain reference value, the downlink burst region 301e is allocated in the downlink sub-frame 301 so as to occupy, among the plurality of major groups, only at least one major group composed of sub-channels the number of which is equal to the certain reference value that leaves a remainder of zero. This enables user data to be transmitted by using all of the plurality of slots constituting the downlink burst region 301e.

Figure 36:
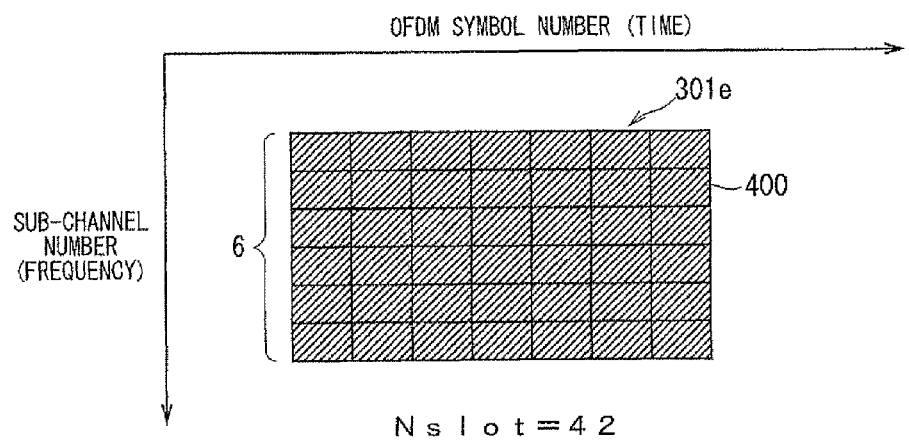
FIG. 36 is a diagram illustrating a state of slots included in the downlink burst region.

For example, in a case of Nslot=42, r6=0 is established, and therefore the downlink burst region 301e is allocated so as to occupy a major group composed of six sub-channels. In this case, the number of necessary slots Nslot can be made coincident with the number of the plurality of slots constituting the downlink burst region 301e. Accordingly, as shown in FIG. 36, all of a plurality of slots 400 constituting the downlink burst region 301e are used for the transmission of user data. In FIG. 36, the slot 400 used for the transmission of user data is represented by a hatched rectangle. The same applies to FIGS. 37 to 41 which will be described later.

Figure 37:
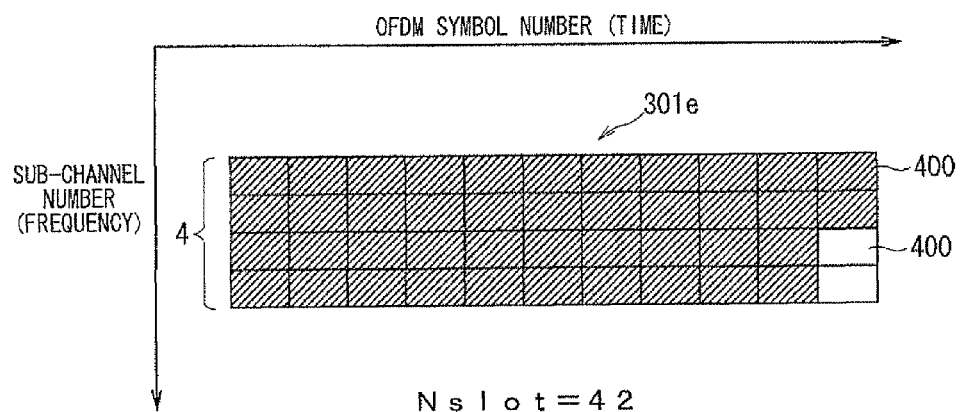
FIG. 37 is a diagram illustrating a state of slots included in the downlink burst region.
Figure 38:
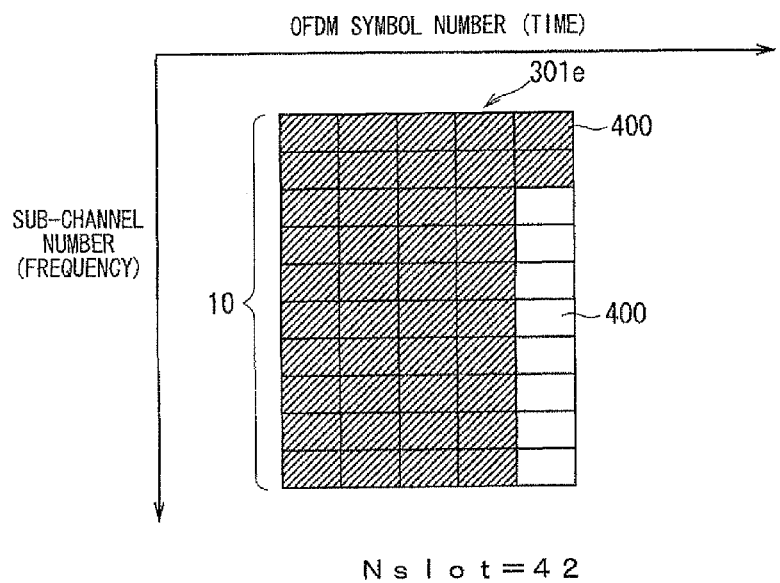
FIG. 38 is a diagram illustrating a state of slots included in the downlink burst region.

On the other hand, in a case where Nslot=42 and the downlink burst region 301e is allocated so as to occupy a major group composed of four sub-channels, two slots 400 (un-hatched rectangles) in the plurality of slots 400 constituting the downlink burst region 301e are not used for the transmission of user data, as shown in FIG. 37. In a case where Nslot=42 and the downlink burst region 301e is allocated so as to occupy two major groups composed of ten sub-channels, eight slots 400 in the plurality of slots 400 constituting the downlink burst region 301e are not used for the transmission of user data, as shown in FIG. 38.

In this manner, the downlink burst region 301e is allocated in the downlink sub-frame 301 so as to occupy only at least one major group composed of sub-channels the number of which is equal to the reference value that leaves no remainder when dividing the number of necessary slots Nslot by itself. Thereby, all of the plurality of slots constituting the downlink burst region 301e can be used for the transmission of user data. This consequently allows an efficient use of radio resources.

In this embodiment, in a case where none of the remainders r4, r6, and r10 is zero, the smallest one of the values "4-r4", "6-r6", and "10-r10" is identified, and the downlink burst region 301e is allocated in the downlink sub-frame 301 so as to occupy only at least one major group composed of sub-channels the number of which is equal to the reference value corresponding to the smallest one. In other words, in this embodiment, in a case where there is no reference value in the plurality of reference values that leaves a remainder of zero as a result of dividing the number of necessary slots Nslot by the reference value, the downlink burst region 301e is allocated in the downlink sub-frame 301 so as to occupy only at least one major group composed of sub-channels the number of which is equal to one of the plurality of reference values that provides the smallest value among values ("4-r4", "6-r6", and "10-r10") obtained by subtracting, from the plurality of reference values, the remainders (r4, r6, r10) left as a result of dividing the number of necessary slots Nslot by the plurality of reference values, respectively. This can reduce the number of slots not used for the transmission of user data in the plurality of slots constituting the downlink burst region 301e.

Figure 39:
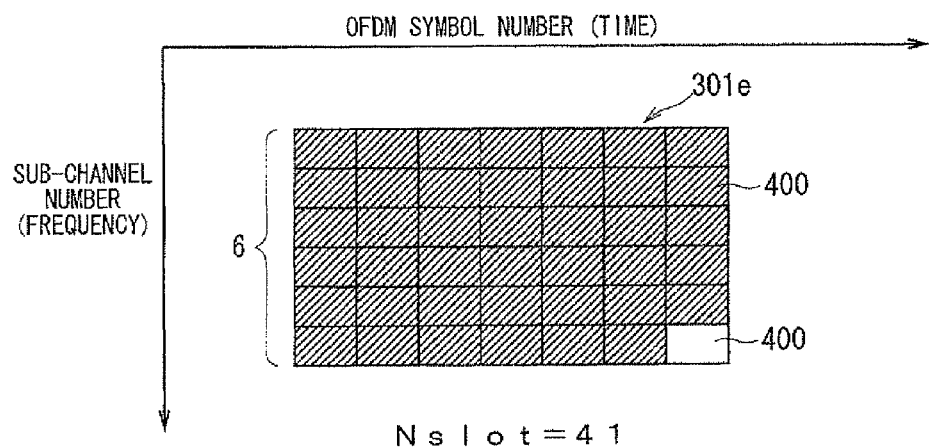
FIG. 39 is a diagram illustrating a state of slots included in the downlink burst region.

For example, in a case of Nslot=41, the value "6-r6" is the smallest among the values "4-r4", "6-r6", and "10-r10". Thus, the downlink burst region 301e is allocated so as to occupy a major group composed of six sub-channels. In this case, as shown in FIG. 39, the number of slots 400 not used for user data among the plurality of slots 400 constituting the downlink burst region 301e can be only one.

Figure 40:
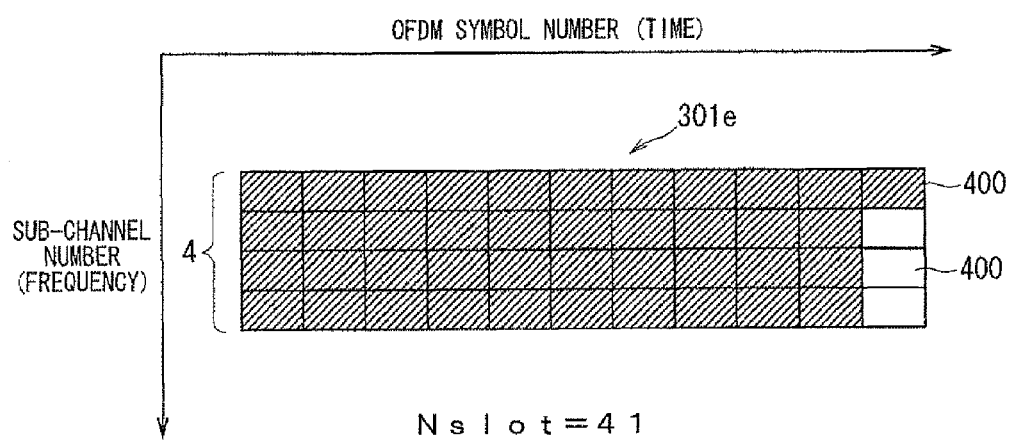
FIG. 40 is a diagram illustrating a state of slots included in the downlink burst region.

On the other hand, if, in a case of Nslot=41, the downlink burst region 301e is allocated so as to occupy a major group composed of four sub-channels, three slots 400 (unhatched rectangles) among the plurality of slots 400 constituting the downlink burst region 401e are not used for transmission of user data, as shown in FIG. 40. If, in a case of Nslot=41, the downlink burst region 301e is allocated so as to occupy two major group composed of ten sub-channels, as shown in FIG. 41, nine slots 400 among the plurality of slots 400 constituting the downlink burst region 301e are not used for transmission of user data.

In this manner, the downlink burst region 301e is allocated so as to occupy only at least one major group composed of sub-channels the number of which is equal to one of the plurality of reference values that provides the smallest one of the values obtained by subtracting, from themselves, the remainders left as a result of dividing the number of necessary slots Nslot by themselves, respectively. This can save the number of slots not used for transmission of user data among the plurality of slots constituting the downlink burst region 301e.

In this embodiment, in a case where more than one of the remainders r4, r6, and r10 are zero, the downlink burst region 301e is allocated so as to occupy only at least one major group composed of sub-channels the number of which is equal to the greatest one of the reference values corresponding to those remainders, respectively. This can save the length of the downlink burst region 301e in the time direction on the time/sub-channel plane.

In this embodiment, in a case where none of the remainders r4, r6, and r10 is zero, the smallest one of the values "4-r4", "6-r6", and "10-r10" is identified. In a case where there are a plurality of the smallest ones, the downlink burst region 301e is allocated so as to occupy only at least one major group composed of sub-channels the number of which is equal to the greatest one of the reference values corresponding to the respective smallest ones. This can save the length of the downlink burst region 301e in the time direction on the time/sub-channel plane.

FIG. 42 is a diagram showing a situation where one downlink burst region 301e is allocated so as to occupy the major group of No. 3 composed of sub-channels the number of which is equal to the reference value "4", and a situation where one downlink burst region 301e is allocated so as to occupy the major group of No. 0 composed of sub-channels the number of which is equal to the reference value "6". As shown in FIG. 42, in the case where the downlink burst region 301e is allocated so as to occupy the major group composed of sub-channels the number of which is equal to the reference value "6", the length of the downlink burst region 301e in the time direction is shortened, as compared with the case where the downlink burst region 301e is allocated so as to occupy the major group composed of sub-channels the number of which is equal to the reference value "4". This is because the number of slots 400 arranged in the sub-channel direction is larger in the case where the downlink burst region 301e is allocated so as to occupy the major group composed of sub-channels the number of which is equal to the reference value "6".

In this manner, saving the length of the downlink burst region 301e in the time direction makes it easy to allocate another downlink burst region 301e in a position adjacent to this downlink burst region 301e in the time direction. As a result, a plurality of downlink burst regions 301e can be efficiently allocated in one downlink sub-frame 301.

Here, the meaning of "a certain reference value in the plurality of reference values that leaves a remainder of zero as a result of dividing the number of necessary slots by the certain reference value" is the same as the meaning of "a certain reference value in the plurality of reference values whose multiple is equal to the number of necessary slots". For example, in a case of Nslot=42, "a certain reference value in the plurality of reference values that leaves a remainder of zero as a result of dividing the number of necessary slots by the certain reference value" is "6", and "a certain reference value in the plurality of reference values whose multiple is equal to the number of necessary slots" is also "6". Accordingly, the meaning of "a case where there is a certain reference value in the plurality of reference values that leaves a remainder of zero as a result of dividing the number of necessary slots by the certain reference value" is the same as the meaning of "a case where the plurality of reference values include a certain reference value whose multiple is equal to the number of necessary slots". Additionally, the meaning of "a case where there is no reference value in the plurality of reference values that leaves a remainder of zero as a result of dividing the number of necessary slots by the certain reference value" is the same as the meaning of "a case where the plurality of reference values do not include the certain reference value whose multiple is equal to the number of necessary slots". Moreover, the meaning of "a case where the plurality of reference values include a plurality of certain reference values that leave remainders of zero as a result of dividing the number of necessary slots by the certain reference values" is the same as the meaning of "a case where the plurality of reference values include a plurality of certain reference values whose multiples are equal to the number of necessary slots".

The meaning of "one of the plurality of reference values that provides the smallest value among values obtained by subtracting, from the plurality of reference values, the remainders left as a result of dividing the number of necessary slots by the plurality of reference values, respectively" is the same as the meaning of "one of the plurality of reference values that provides the smallest difference among differences between the number of necessary slots Nslot and multiples of the respective plurality of reference values closest to and greater than the number of necessary slots". For example, in a case of Nslot=41, the value "6-r6" is the smallest among the values "4-r4", "6-r6", and "10-r10", and "one of the plurality of reference values that provides the smallest value among values obtained by subtracting, from the plurality of reference values, the remainders left as a result of dividing the number of necessary slots by the plurality of reference values, respectively" is "6". Here, in the case of Nslot=41, the multiple of "4" closest to and greater than the number of necessary slots Nslot is "44", the multiple of "6" closest to and greater than the number of necessary slots Nslot is "42", and the multiple of "10" closest to and greater than the number of necessary slots Nslot is "50". The value obtained by subtracting the number of necessary slots Nslot from the multiple "44" of the reference value "4" is "3". The value obtained by subtracting the number of necessary slots Nslot from the multiple "42" of the reference value "6" is "1". The value obtained by subtracting the number of necessary slots Nslot from the multiple "50" of the reference value "10" is "9". Accordingly, in the case of Nslot=41, "one of the plurality of reference values that provides the smallest difference among differences between the number of necessary slots Nslot and multiples of the respective plurality of reference values closest to and greater than the number of necessary slots" is "6". Thus, the meaning of "a case where the plurality of reference values include a plurality of certain reference values that provide the smallest value among values obtained by subtracting, from the plurality of reference values, the remainders left as a result of dividing the number of necessary slots by the plurality of reference values, respectively," is the same as the meaning of "the plurality of reference values include a plurality of certain reference values that provide the smallest difference among differences between the number of necessary slots Nslot and multiples of the respective plurality of reference values closest to and greater than the number of necessary slots". In this embodiment, the burst-region allocation section 216 obtains the values "4-r4", "6-r6", and "10-r10". Instead, however, it may be also acceptable to obtain the multiple of each of the plurality of reference values closest to and greater than the number of necessary slots Nslot and then obtain a difference between the obtained multiple and the number of necessary slots Nslot. In this case, a reference value of the plurality of reference values that provides the smallest difference is identified, and the downlink burst region 301e is allocated so as to occupy at least one major group composed of sub-channels the number of which is equal to the identified reference value.

Although in this embodiment, the combination of values "4", "6", and "10" is adopted as the plurality of reference values, other combinations may be adopted as the plurality of reference values as long as they are a plurality of reference values set such that each of the plurality of reference values can be equal to the number of sub-channels constituting one major group or sub-channels constituting a plurality of major groups having sequential numbers and the plurality of reference values can be different from one another. Thus, in a case where the FFT size is 1024, a combination of any two or more of the values "4", "6", "10", "14", "16", "20", "24", "26", and "30" may be adopted as combination of the plurality of reference values.

While the invention has been described in detail, the foregoing description is in all aspects illustrative and not restrictive. It is to be understood that numerous modifications not illustrated herein may be possible without departing from the scope of the present invention.

DESCRIPTION OF THE REFERENCE NUMERALS 1, 101, 201 base station
2, 102, 202 communication terminal
3 adaptive array
4, 105 transmission section
5, 104 reception section
6 control section
10, 106 weight calculation section
13 first arrangement section
15 estimation section
16 determination section
17 second arrangement section
51, 301 downlink sub-frame
57 HARQ burst region
58 HARQ sub-burst region
58a first HARQ sub-burst region
58b second HARQ sub-burst region
59, 59a-59d, 400 slot
81 pilot signal
85 sub-carrier
86 good sub-carrier
103 array antenna
107 candidate determination section
108 transmission control section
109 communication-object determination section
212 wireless transmission section
214 data processing section
216 burst-region allocation section
301e downlink burst region

The invention claimed is:

1. A base station that collects a plurality of communication terminals, said base station comprising:
  at least one circuit that is configured to:
    receive a signal from a communication terminal of the plurality of communication terminals via an array antenna;
    calculate a weight to be applied to said array antenna with respect to the communication terminal, based on a known signal supplied from the communication terminal and received by the circuit;
    transmit a signal to said communication terminal via said array antenna;
    determine m (m>1) communication terminals among said plurality of communication terminals, based on a first communication quality between said base station and said plurality of communication terminals, as communication-object candidates;
    cause to transmit control information to said m communication terminals, said control information being configured to cause the communication terminal to transmit said known signal;
    determine, as communication objects, l (1≤l<m) communication terminals among said m communication terminals, based on a second communication quality between said base station and said m communication terminals, which is obtained after the m communication terminals are determined, wherein
      the causing to transmit data to the l communication terminals, is based on the calculated weight, and
      said first communication quality and said second communication quality are different from each other.

2. The base station according to claim 1, wherein the at least one circuit is further configured to select: said l communication terminals from said m communication terminals based on a value obtained by dividing a CINR (Carrier-to-Interference-plus-Noise Ratio) corresponding to one frame by an average value of CINRs corresponding to a plurality of previous frames, and determines said selected communication terminals as communication objects, said one frame being received by the circuit after said m communication terminals are determined.

3. A method for determining a communication object terminal, said method being performed in a base station that collects a plurality of communication terminals, said method comprising the steps of:

(a) receiving, by a circuit, a signal from a communication terminal of the plurality of communication terminals via an array antenna;

(b) calculating a weight to be applied to said array antenna with respect to said communication terminal, based on a known signal supplied from the communication terminal and received by said circuit;

(c) determining m (m>1) communication terminals among said plurality of communication terminals, based on a first communication quality between said base station and said plurality of communication terminals, as communication-object candidates;

(d) transmitting, by the circuit, control information to said m communication terminals via said array antenna, said control information being configured to cause the communication terminal to transmit said known signal;

(e) determining, as communication objects, l ($1 \leq l < m$) communication terminals from said m communication terminals, based on a second communication quality between said base station and said m communication terminals, after said step (c); and (f) transmitting data to said l communication terminals via said array antenna, based on the weight calculated in said step (b), wherein the first communication quality and the second communication quality are different from each other.

4. The method for determining a communication object terminal according to claim 3, wherein in said step (e), said l communication terminals are selected from said m communication terminals based on a value obtained by dividing a CINR (Carrier-to-Interference-plus-Noise Ratio) corresponding to one frame by an average value of CINRs corresponding to a plurality of previous frames, and said selected communication terminals are determined as communication objects, said one frame being received by said reception section after said step (c).

* * * * *